United States Patent
Lai et al.

(10) Patent No.: US 10,126,525 B2
(45) Date of Patent: *Nov. 13, 2018

(54) OPTICAL IMAGE CAPTURING SYSTEM

(71) Applicant: ABILITY OPTO-ELECTRONICS TECHNOLOGY CO.LTD., Taichung (TW)

(72) Inventors: Chien-Hsun Lai, Taichung (TW); Nai-Yuan Tang, Taichung (TW); Yao Wei Liu, Taichung (TW); Yeong-Ming Chang, Taichung (TW)

(73) Assignee: ABILITY OPTO-ELECTRONICS TECHNOLOGY CO. LTD., Taichung (TW)

(*) Notice: Subject to any disclaimer, the term of this patent is extended or adjusted under 35 U.S.C. 154(b) by 49 days.

This patent is subject to a terminal disclaimer.

(21) Appl. No.: 15/298,570

(22) Filed: Oct. 20, 2016

(65) Prior Publication Data

US 2017/0329104 A1 Nov. 16, 2017

(30) Foreign Application Priority Data

May 13, 2016 (TW) .............................. 105114975 A

(51) Int. Cl.
| | |
|---|---|
| G02B 9/62 | (2006.01) |
| G02B 7/02 | (2006.01) |
| G02B 13/00 | (2006.01) |
| G02B 5/20 | (2006.01) |
| G02B 7/00 | (2006.01) |
| G02B 7/04 | (2006.01) |
| G02B 27/00 | (2006.01) |
| G02B 27/64 | (2006.01) |

(52) U.S. Cl.
CPC ............ *G02B 13/0045* (2013.01); *G02B 5/20* (2013.01); *G02B 7/003* (2013.01); *G02B 7/021* (2013.01); *G02B 7/04* (2013.01); *G02B 9/62* (2013.01); *G02B 27/0025* (2013.01); *G02B 27/646* (2013.01)

(58) Field of Classification Search
CPC .......... G02B 7/02; G02B 7/021; G02B 7/022; G02B 9/62; G02B 9/64; G02B 13/0045
USPC .................. 359/713, 745, 749–752, 754–757
See application file for complete search history.

(56) References Cited

U.S. PATENT DOCUMENTS

2014/0133040 A1* 5/2014 Tsai ....................... G02B 7/02
359/819

FOREIGN PATENT DOCUMENTS

| TW | 201418818 A | 5/2014 |
|---|---|---|
| TW | M503575 | 6/2015 |

* cited by examiner

*Primary Examiner* — Darryl J Collins
(74) *Attorney, Agent, or Firm* — Muncy, Geissler, Olds & Lowe, P.C.

(57) ABSTRACT

A six-piece optical lens for capturing image and a six-piece optical module for capturing image are provided. In the order from an object side to an image side, the optical lens along the optical axis includes a first lens element with refractive power, a second lens element with refractive power, a third lens element with refractive power, a fourth lens element with refractive power, a fifth lens element with refractive power and a sixth element lens with refractive power. At least one of the image-side surface and object-side surface of each of the six lens elements is aspheric. The optical lens can increase aperture value and improve the imagining quality for use in compact cameras.

25 Claims, 24 Drawing Sheets

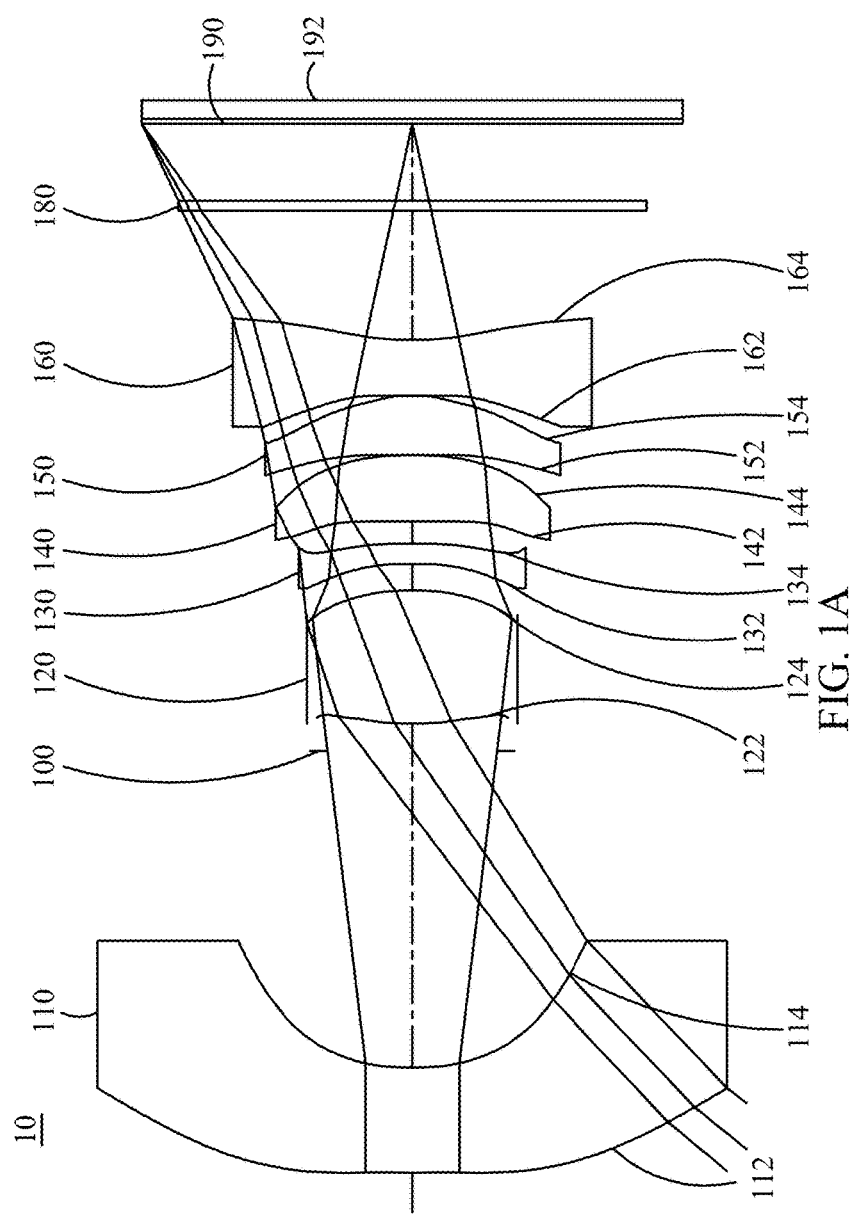

OPTICAL IMAGE CAPTURING SYSTEM

CROSS-REFERENCE TO RELATED APPLICATION

This application claims priority from Taiwan Patent Application No. 105114975, filed on May 13, 2016, in the Taiwan Intellectual Property Office, the content of which is hereby incorporated by reference in its entirety for all purposes.

BACKGROUND OF THE INVENTION

1. Field of the Invention

The present disclosure relates to an optical image capturing system, and more particularly to a compact optical image capturing system which can be applied to electronic products.

2. Description of the Related Art

In recent years, with the rise of portable electronic devices having camera functionalities, the demand for an optical image capturing system is raised gradually. The image sensing device of ordinary photographing camera is commonly selected from charge coupled device (CCD) or complementary metal-oxide semiconductor sensor (CMOS Sensor). In addition, as advanced semiconductor manufacturing technology enables the minimization of pixel size of the image sensing device, the development of the optical image capturing system directs towards the field of high pixels. Therefore, the requirement for high imaging quality is rapidly raised.

The traditional optical image capturing system of a portable electronic device comes with different designs, including a four-piece lens design or a five-piece lens design. However, because of the higher pixels in portable electronic devices with camera and the requirement for a large aperture of an end user, e.g. functionalities of micro filming and night view, the optical image capturing system in prior arts cannot meet the advanced requirement of photography and filming.

Therefore, it is important to find a way to effectively increase the amount of light admitted into the optical lenses and further improves the quality of the formed image.

SUMMARY OF THE INVENTION

The aspect of embodiment of the present disclosure directs to an optical image capturing system and an optical image capturing lens which use combination of refractive powers, convex and concave surfaces of six-piece optical lenses (the convex or concave surface in the disclosure denotes the change of geometrical shape of an object-side surface or an image-side surface of each lens element at different heights from an optical axis) to increase the amount of light admitted into the optical image capturing system, and to improve quality of image formation, so as to be applied to minimized electronic products.

The terminologies together with their numerals for the structural elements and parameters related to the embodiments of the present invention are given in the following paragraphs for reference in subsequent illustrations:

As shown in FIGS. 7A, 7B and 7C, the optical image capturing system may include an image sensing module (not illustrated), the image sensing module includes a substrate and an image sensor on the substrate. The optical image capturing system may further include a lens positioning element 794 which is hollow, in order to accommodate any lens element and to align the lens elements along the optical axis. The lens positioning element is disposed with an object-side end 796 and an image-side end 798. The object-side end 796 is adjacent to the object side and is disposed with a first opening 7962, whereas the image-side end 798 is adjacent to the image side and is disposed with a second opening 7982. The outer wall of the lens positioning element 794 includes two tangent planes 799, each of the tangent planes 799 has a sprue mark 7992. The inner diameter of the aforementioned first opening 7962 is denoted by OD and the inner diameter of the second opening 7982 is denoted by ID, the following condition is satisfied: $0.1 \leq OD/ID < 10$. The minimum thickness of the object-side end 796 is denoted by OT, whereas the minimum thickness of the image-side end 798 is denoted by IT, the following condition is satisfied: $0.1 \leq OT/IT \leq 10$.

As shown in FIGS. 8A, 8B and 8C, the optical image capturing system may include an image sensing module (not illustrated), the image sensing module includes a substrate and an image sensor on the substrate. The optical image capturing system may further include a lens positioning element 894 which is hollow, in order to accommodate any lens element and align the lens elements along the optical axis. The lens positioning element is disposed with an object-side end 896 and an image-side end 898. The object-side end 896 is adjacent to the object side and is disposed with a first opening 8962, whereas the image-side end 898 is adjacent to the image side and is disposed with a second opening 8982. The outer wall of the lens positioning element 894 includes three tangent planes 899, and each of the tangent planes 899 has a sprue mark 8992. The inner diameter of the aforementioned first opening 8962 is denoted by OD and the inner diameter of the second opening 8982 is denoted by ID, the following condition is satisfied: $0.1 \leq OD/ID < 10$. The minimum thickness of the object-side end 896 is denoted by OT, whereas the minimum thickness of the image-side end 898 is denoted by IT, the following condition is satisfied: $0.1 \leq OT/IT \leq 10$.

The term and its definition for the lens element parameter in the embodiment of the present invention are shown as below for further reference.

The Lens Element Parameter Related to the Length or the Height of the Lens Element The maximum height for image formation of the optical image capturing system is denoted by HOI. The height of the optical image capturing system is denoted by HOS. The distance from the object-side surface of the first lens element to the image-side surface of the sixth lens element is denoted by InTL. The distance from an aperture stop (aperture) of the optical image capturing system to the image plane is denoted by InS. The distance from the first lens element to the second lens element is denoted by In12 (example). The central thickness of the first lens element of the optical image capturing system on the optical axis is denoted by TP1 (example).

The Lens Element Parameter Related to the Material in the Lens Element

The Abbe number of the first lens element in the optical image capturing system is denoted by NA1 (example). The refractive index of the first lens element is denoted by Nd1 (example).

The Lens Element Parameter Related to the Angle of View

The angle of view is denoted by AF. Half of the angle of view is denoted by HAF. A major ray angle is denoted by MRA.

The Lens Element Parameter Related to the Exit/Entrance Pupil

The entrance pupil diameter of the optical image capturing system is denoted by HEP. The maximum effective half diameter (EHD) of any surface of a single lens element refers to a perpendicular height between the optical axis and an intersection point; the intersection point is where the incident ray with the maximum angle of view passes through the outermost edge of the entrance pupil, and intersects with the surface of the lens element. For example, the maximum effective half diameter of the object-side surface of the first lens element is denoted by EHD11. The maximum effective half diameter of the image-side surface of the first lens element is denoted by EHD12. The maximum effective half diameter of the object-side surface of the second lens element is denoted by EHD21. The maximum effective half diameter of the image-side surface of the second lens element is denoted by EHD22. The maximum effective half diameters of any surface of other lens elements in the optical image capturing system are denoted in the similar way.

The Lens Element Parameter Related to the Surface Depth of the Lens Element

The distance paralleling an optical axis, from an axial point on the object-side surface of the sixth lens element, to the intersection point that defines the maximum effective half diameter of the object-side surface of the sixth lens element, is denoted by InRS61 (depth of the EHD). The distance paralleling an optical axis, from an axial point on the image-side surface of the sixth lens element, to the intersection point that defines the maximum effective half diameter of the image-side surface of the sixth lens element, is denoted by InRS62 (depth of the EHD). The depths (sinkage values) of the EHD of the object-side or image-side surface of other lens elements are denoted in the similar manner.

The Lens Element Parameter Related to the Shape of the Lens Element

The critical point C is a point on a surface of a specific lens element, and the tangent plane to the surface at that point is perpendicular to the optical axis, wherein the point cannot be the axial point on that specific surface of the lens element. Therefore, the perpendicular distance between the critical point C51 on the object-side surface of the fifth lens element and the optical axis is HVT51 (example). The perpendicular distance between a critical point C52 on the image-side surface of the fifth lens element and the optical axis is HVT52 (example). The perpendicular distance between the critical point C61 on the object-side surface of the sixth lens element and the optical axis is HVT61 (example). The perpendicular distance between a critical point C62 on the image-side surface of the sixth lens element and the optical axis is HVT62 (example). The perpendicular distances between the critical point on the image-side surface or object-side surface of other lens elements and the optical axis are denoted in similar fashion.

The inflection point on object-side surface of the sixth lens element that is nearest to the optical axis is denoted by IF611, and the sinkage value of that inflection point IF611 is denoted by SGI611 (example). The sinkage value SGI611 is a horizontal distance paralleling the optical axis, which is from an axial point on the object-side surface of the sixth lens element to the inflection point nearest to the optical axis on the object-side surface of the sixth lens element. The distance perpendicular to the optical axis between the inflection point IF611 and the optical axis is HIF611 (example). The inflection point on image-side surface of the sixth lens element that is nearest to the optical axis is denoted by IF621, and the sinkage value of that inflection point IF621 is denoted by SGI621 (example). The sinkage value SGI621 is a horizontal distance paralleling the optical axis, which is from the axial point on the image-side surface of the sixth lens element to the inflection point nearest to the optical axis on the image-side surface of the sixth lens element. The distance perpendicular to the optical axis between the inflection point IF621 and the optical axis is HIF621 (example).

The inflection point on object-side surface of the sixth lens element that is second nearest to the optical axis is denoted by IF612, and the sinkage value of that inflection point IF612 is denoted by SGI612 (example). The sinkage value SGI612 is a horizontal distance paralleling the optical axis, which is from an axial point on the object-side surface of the sixth lens element to the inflection point nearest to the optical axis on the object-side surface of the sixth lens element. The distance perpendicular to the optical axis between the inflection point IF612 and the optical axis is HIF612 (example). The inflection point on image-side surface of the sixth lens element that is second nearest to the optical axis is denoted by IF622, and the sinkage value of that inflection point IF622 is denoted by SGI622 (example). The sinkage value SGI622 is a horizontal distance paralleling the optical axis, which is from the axial point on the image-side surface of the sixth lens element to the inflection point second nearest to the optical axis on the image-side surface of the sixth lens element. The distance perpendicular to the optical axis between the inflection point IF622 and the optical axis is HIF622 (example).

The inflection point on object-side surface of the sixth lens element that is third nearest to the optical axis is denoted by IF613, and the sinkage value of that inflection point IF613 is denoted by SGI613 (example). The sinkage value SGI613 is a horizontal distance paralleling the optical axis, which is from an axial point on the object-side surface of the sixth lens element to the inflection point third nearest to the optical axis on the object-side surface of the sixth lens element. The distance perpendicular to the optical axis between the inflection point IF613 and the optical axis is HIF613 (example). The inflection point on image-side surface of the sixth lens element that is third nearest to the optical axis is denoted by IF623, and the sinkage value of that inflection point IF623 is denoted by SGI623 (example). The sinkage value SGI623 is a horizontal distance paralleling the optical axis, which is from the axial point on the image-side surface of the sixth lens element to the inflection point third nearest to the optical axis on the image-side surface of the sixth lens element. The distance perpendicular to the optical axis between the inflection point IF623 and the optical axis is HIF623 (example).

The inflection point on object-side surface of the sixth lens element that is fourth nearest to the optical axis is denoted by IF614, and the sinkage value of that inflection point IF614 is denoted by SGI614 (example). The sinkage value SGI614 is a horizontal distance paralleling the optical axis, which is from an axial point on the object-side surface of the sixth lens element to the inflection point fourth nearest to the optical axis on the object-side surface of the sixth lens element. The distance perpendicular to the optical axis between the inflection point IF614 and the optical axis is HIF614 (example). The inflection point on image-side surface of the sixth lens element that is fourth nearest to the optical axis is denoted by IF624, and the sinkage value of that inflection point IF624 is denoted by SGI624 (example). The sinkage value SGI624 is a horizontal distance paralleling the optical axis, which is from the axial point on the image-side surface of the sixth lens element to the inflection point fourth nearest to the optical axis on the image-side surface of the sixth lens element. The distance perpendicular to the optical axis between the inflection point IF624 and the optical axis is HIF624 (example).

The inflection points on the object-side surface or the image-side surface of the other lens elements and the perpendicular distances between them and the optical axis, or the sinkage values thereof are denoted in the similar way described above.

The Lens Element Parameter Related to the Aberration

Optical distortion for image formation in the optical image capturing system is denoted by ODT. TV distortion for image formation in the optical image capturing system is denoted by TDT. Furthermore, the degree of aberration offset within the range of 50% to 100% field of view of the formed image can be further illustrated. The offset of the spherical aberration is denoted by DFS. The offset of the coma aberration is denoted by DFC.

The purpose of the characteristic diagram of Modulation Transfer Function (MTF) of the optical image capturing system is to test and assess the contrast and sharpness of the image formed by the system. The vertical coordinate axis of the characteristic diagram of modulation transfer function represents a contrast transfer rate (values are from 0 to 1). The horizontal coordinate axis represents a spatial frequency (cycles/mm; lp/mm; line pairs per mm). Theoretically, an ideal optical image capturing system can present 100% of the line contrast of a photographed object. However, the values of the contrast transfer rate at the vertical coordinate axis are less than 1 in the actual image capturing system. In addition, comparing to the central region, it is generally more difficult to achieve fine recovery in the peripheral region of formed image. The contrast transfer rates (values of MTF) of spatial frequency of 55 cycles/mm at positions of the optical axis, 0.3 field of view and 0.7 field of view of a visible light spectrum on the image plane are respectively denoted by MTFE0, MTFE3 and MTFE7. The contrast transfer rates (values of MTF) of spatial frequency of 110 cycles/mm at the optical axis, 0.3 field of view and 0.7 field of view on the image plane are respectively denoted by MTFQ0, MTFQ3 and MTFQ7. The contrast transfer rates (values of MTF) of spatial frequency of 220 cycles/mm at the optical axis, 0.3 field of view and 0.7 field of view on the image plane are respectively denoted by MTFH0, MTFH3 and MTFH7. The contrast transfer rates (values of MTF) of spatial frequency of 440 cycles/mm at the optical axis, 0.3 field of view and 0.7 field of view on the image plane are respectively denoted by MTF0, MTF3 and MTF7. The three fields of view described above represent the center, the inner field of view and the outer field of view of the lens elements. Thus, they may be used to evaluate whether the performance of a specific optical image capturing system is excellent. The design of the optical image capturing system of the present invention mainly corresponds to a sensing device with pixel size of less than or equal to 1.12 micrometers. Therefore, the quarter spatial frequency, the half spatial frequency (half frequencies) and the full spatial frequency (full frequencies) of the characteristic diagram of modulation transfer function respectively are at least 110 cycles/mm, 220 cycles/mm and 440 cycles/mm.

If an optical image capturing system is to capture image with infrared spectrum, such as meeting the requirement for night vision in low light condition, it might apply operation wavelength of 850 nm or 800 nm. As the main function of night vision is to recognize silhouette of an object formed in monochrome and shade, the high resolution is unnecessary, and thus, a spatial frequency, which is less than 110 cycles/mm, is used to evaluate the functionality of the optical image capturing system, when the optical image capturing system is applied to the infrared spectrum. When the foregoing wavelength of 850 nm is to be focused on the image plane, the contrast transfer rates (values of MTF) with a spatial frequency of 55 cycles/mm at the optical axis, 0.3 field of view and 0.7 field of view on the image plane are respectively denoted by MTFI0, MTFI3 and MTFI7. However, as the difference between infrared wavelength of 850 nm or 800 nm and that of visible light is huge, it is hard to design an optical image capturing system which is capable of focusing on the visible light and the infrared light (dual-mode) simultaneously while achieving certain performance respectively.

The disclosure provides an optical image capturing system, the object-side surface or the image-side surface of the sixth lens element may have inflection points, such that the angle of incident light from each field of view to the sixth lens element can be adjusted effectively and the optical distortion and the TV distortion can be corrected as well. Besides, the surfaces of the sixth lens element will be endowed with better capability in adjusting the optical path, which yields better image quality.

The disclosure provides an optical image capturing system, in the order from an object side to an image side, including a first lens element, a second lens element, a third lens element, a fourth lens element, a fifth lens element, a sixth lens element, a lens positioning element and an image plane. The lens positioning element is hollow to accommodate any lens elements and align the lens elements along the optical axis. The lens positioning element includes an object-side end and an image-side end. The object-side end is adjacent to the object side and is disposed with a first opening. The image-side end is adjacent to the image side and is disposed with a second opening. An outer wall of the lens positioning element includes at least two tangent planes which respectively have at least one sprue mark. The first lens element had refractive power. Focal lengths of the first through sixth lens elements are f1, f2, f3, f4, f5 and f6 respectively. The focal length of the optical image capturing system is f. The entrance pupil diameter of the optical image capturing system is HEP. A distance from an object-side surface of the first lens element to the image plane is HOS. The distance on the optical axis from the object-side surface of first lens element to the image-side surface of sixth lens element is denoted by InTL. Half of the maximum viewable angle of the optical image capturing system is denoted by HAF. Thicknesses of the first to sixth lens elements at the height of ½ HEP paralleling the optical axis are respectively ETP1, ETP2, ETP3, ETP4, ETP5 and ETP6. The sum of ETP1 to ETP6 described above is SETP. Central thicknesses of the first to sixth lens elements on the optical axis are respectively TP1, TP2, TP3, TP4, TP5 and TP6. The sum of TP1 to TP6 described above is STP. The following conditions are satisfied: $1.0 \leq f/HEP \leq 10.0$, $0 \deg < HAF \leq 150 \deg$ and $0.5 \leq SETP/STP < 1$.

The disclosure further provides another optical image capturing system, in the order from an object side to an image side, including a first lens element, a second lens element, a third lens element, a fourth lens element, a fifth lens element, a sixth lens element, a lens positioning element and an image plane. The lens positioning element is hollow in order to accommodate any lens elements and align the lens elements along the optical axis. The lens positioning element includes an object-side end and an image-side end. The object-side end is adjacent to the object side and has a first opening. The image-side end is adjacent to the image side and has a second opening. The outer wall of the lens positioning element includes at least two tangent planes which respectively have at least one sprue mark. The first lens element has refractive power. The second lens element has refractive power. The third lens element has refractive power. The fourth lens element has refractive power. The fifth lens element has refractive power. The sixth lens element has refractive power. At least one lens element among the first through the sixth lens elements has at least one inflection point on at least one surface thereof. At least one lens element among the first lens element through the third lens element has positive refractive power. At least one lens element among the fourth lens element through the sixth lens element has positive refractive power. Focal lengths of the first through sixth lens elements are f1, f2, f3, f4, f5 and f6 respectively. The focal length of the optical image capturing system is f. The entrance pupil diameter of the optical image capturing system is HEP. The distance on the optical axis from an object-side surface of the first lens element to the image plane is HOS. The distance on the optical axis from the object-side surface of the first lens element to the image-side surface of the sixth lens element is InTL. Half of a maximum angle of view of the optical image capturing system is HAF. The horizontal distance paralleling the optical axis from a coordinate point on the object-side surface of the first lens element at height of ½ HEP to the image plane is ETL. The horizontal distance paralleling the optical axis from a coordinate point on the object-side surface of the first lens element at height of ½ HEP to a coordinate point on the image-side surface of the sixth lens element at height of ½ HEP is EIN. The following conditions are satisfied: 1.0≤f/HEP≤10, 0 deg<HAF≤150 deg and 0.2≤EIN/ETL<1.

The disclosure provides yet another optical image capturing system, in the order from an object side to an image side, including a first lens element, a second lens element, a third lens element, a fourth lens element, a fifth lens element, a sixth lens element, a lens positioning element and an image plane. The lens positioning element is hollow to accommodate any lens elements and align the lens elements on the optical axis. The lens positioning element includes an object-side end and an image-side end. The object-side end is adjacent to the object side and has a first opening. The image-side end is adjacent to the image side and has a second opening. The outer wall of the lens positioning element includes at least three tangent planes which respectively have at least one sprue mark. There are six lens elements with refractive power in the optical image capturing system. The first lens element has refractive power. The second lens element has refractive power. The third lens element has refractive power. The fourth lens element has refractive power. The fifth lens element has refractive power. The sixth lens element has refractive power. At least one lens element among the first lens element through the sixth lens element has positive refractive power. At least one lens element among the first through the sixth lens elements has at least one inflection point on at least one surface thereof. The focal lengths of the first through sixth lens elements are f1, f2, f3, f4, f5 and f6 respectively. The focal length of the optical image capturing system is f. The entrance pupil diameter of the optical image capturing system is HEP. The distance on the optical axis from an object-side surface of the first lens element to the image plane is HOS. The distance on the optical axis from the object-side surface of the first lens element to the image-side surface of the sixth lens element is InTL. Half of a maximum angle of view of the optical image capturing system is HAF. The horizontal distance paralleling the optical axis from a coordinate point on the object-side surface of the first lens element at height of ½ HEP to the image plane is ETL. The horizontal distance paralleling the optical axis from a coordinate point on the object-side surface of the first lens element at height of ½ HEP to a coordinate point on the image-side surface of the sixth lens element at height of ½ HEP is EIN. The following conditions are satisfied: 1.0≤f/HEP≤10.0, 0 deg<HAF≤150 deg and 0.2≤EIN/ETL<1.

The thickness of a single lens element at height of ½ entrance pupil diameter (HEP) particularly affects the performance in correcting the optical path difference between the rays in each field of view and in correcting aberration for the shared region among the fields of view within the range of ½ entrance pupil diameter (HEP). The capability of aberration correction is enhanced when the thickness is greater, but the difficulty in manufacturing such lens also increases at the same time. Therefore, it is necessary to control the thickness of a single lens element at height of ½ entrance pupil diameter (HEP), in particular to control the proportional relationship (ETP/TP) of the thickness (ETP) of the lens element at height of ½ entrance pupil diameter (HEP) to the thickness (TP) of the corresponding lens element on the optical axis. For example, the thickness of the first lens element at height of ½ entrance pupil diameter (HEP) is denoted by ETP1. The thickness of the second lens element at height of ½ entrance pupil diameter (HEP) is denoted by ETP2. The thicknesses of other lens elements are denoted in similar way. A sum of ETP1 to ETP4 described above is SETP. The embodiments of the present invention may satisfy the following condition: 0.3≤ETP/EIN≤1.

In order to enhance the capability of aberration correction and reduce the difficulty in manufacturing at the same time, it is particularly necessary to control the proportional relationship (ETP/TP) of the thickness (ETP) of the lens element at height of ½ entrance pupil diameter (HEP) to the thickness (TP) of the lens element on the optical axis. For example, the thickness of the first lens element at height of ½ entrance pupil diameter (HEP) is denoted by ETP1. The thickness of the first lens element on the optical axis is TP1. The ratio between both of them is ETP1/TP1. The thickness of the second lens element at height of ½ entrance pupil diameter (HEP) is denoted by ETP2. The thickness of the second lens element on the optical axis is TP2. The ratio between both of them is ETP2/TP2. The proportional relationships of the thicknesses of other lens element in the optical image capturing system at height of ½ entrance pupil diameter (HEP) to the thicknesses (TP) of the lens elements on the optical axis lens are denoted in the similar way. The embodiments of the present invention may satisfy the following condition: 0<ETP/TP≤5.

The horizontal distance between two adjacent lens elements at height of ½ entrance pupil diameter (HEP) is denoted by ED. The horizontal distance (ED) described above is in parallel with the optical axis of the optical image capturing system and particularly affects the performance in correcting the optical path difference between the rays in each field of view and in correcting aberration for the shared region among the fields of view within the range of ½ entrance pupil diameter (HEP). The capability of aberration correction may be enhanced when the horizontal distance becomes greater, but the difficulty in manufacturing the lens is also increased and the degree of 'minimization' to the length of the optical image capturing system is restricted. Thus, it is essential to control the horizontal distance (ED) between two specific adjacent lens elements at height of ½ entrance pupil diameter (HEP).

In order to enhance the capability of aberration correction and reduce the difficulty to 'minimize' the length of the optical image capturing system at the same time, it is particularly necessary to control the proportional relationship (ED/IN) of the horizontal distance (ED) between the two adjacent lens elements at height of ½ entrance pupil diameter (HEP) to the horizontal distance (IN) between the two adjacent lens elements on the optical axis. For example, the horizontal distance between the first lens element and the second lens element at height of ½ entrance pupil diameter (HEP) is denoted by ED12. The horizontal distance between the first lens element and the second lens element on the optical axis is IN12. The ratio between both of them is ED12/IN12. The horizontal distance between the second lens element and the third lens element at height of ½ entrance pupil diameter (HEP) is denoted by ED23. The horizontal distance between the second lens element and the third lens element on the optical axis is IN23. The ratio between both of them is ED23/IN23. The proportional relationships of the horizontal distances between other two adjacent lens elements in the optical image capturing system at height of ½ entrance pupil diameter (HEP) to the horizontal distances between the two adjacent lens elements on the optical axis are denoted in the similar way.

The horizontal distance paralleling the optical axis from a coordinate point on the image-side surface of the sixth lens element at the height of ½ HEP to the image plane is EBL. The horizontal distance paralleling the optical axis from the axial point on the image-side surface of the sixth lens element to the image plane is BL. In order to enhance the ability of aberration correction and reserve accommodation space for other optical elements, the embodiment of the present invention may satisfy the following conditions: $0.1 \leq EBL/BL \leq 1.5$.

The optical image capturing system may further include a light filter. The light filter is located between the sixth lens element and the image plane. The distance paralleling the optical axis from a coordinate point on the image-side surface of the sixth lens element at the height of ½ HEP to the light filter is EIR. The distance paralleling the optical axis from the axial point on the image-side surface of the sixth lens element to the light filter is PIR. The embodiments of the present invention may satisfy the following condition: $0.1 \leq EIR/PIR \leq 1.1$.

The height of optical system (HOS) may be reduced to achieve the minimization of the optical image capturing system when $|f1|>|f6|$.

When $|f2|+|f3|+|f4|+|f5|$ and $|f1|+|f6|$ satisfy the aforementioned conditions, at least one of the second through fifth lens elements may have a weak positive refractive power or a weak negative refractive power. The weak refractive power indicates that an absolute value of the focal length of a specific lens element is greater than 10. When at least one of the second through fifth lens elements has the weak positive refractive power, the positive refractive power of the first lens element can be shared by it, such that the unnecessary aberration will not appear too early. On the contrary, when at least one of the second and third lens elements has the weak negative refractive power, the aberration of the optical image capturing system can be slightly corrected.

The sixth lens element may have negative refractive power, and the image-side surface thereof may be a concave surface. With this configuration, the back focal distance of the optical image capturing system may be shortened and the system may be minimized. Besides, at least one surface of the sixth lens element may possess at least one inflection point, which is capable of effectively reducing the incident angle of the off-axis rays, thereby further correcting the off-axis aberration.

BRIEF DESCRIPTION OF THE DRAWINGS

The detailed structure, operating principle and effects of the present disclosure will now be described in more details hereinafter with reference to the accompanying drawings that show various embodiments of the present disclosure as follows.

FIG. 1A is a schematic view of the optical image capturing system according to the first embodiment of the present invention.

DESCRIPTION OF THE PREFERRED EMBODIMENTS

Figure 1B:
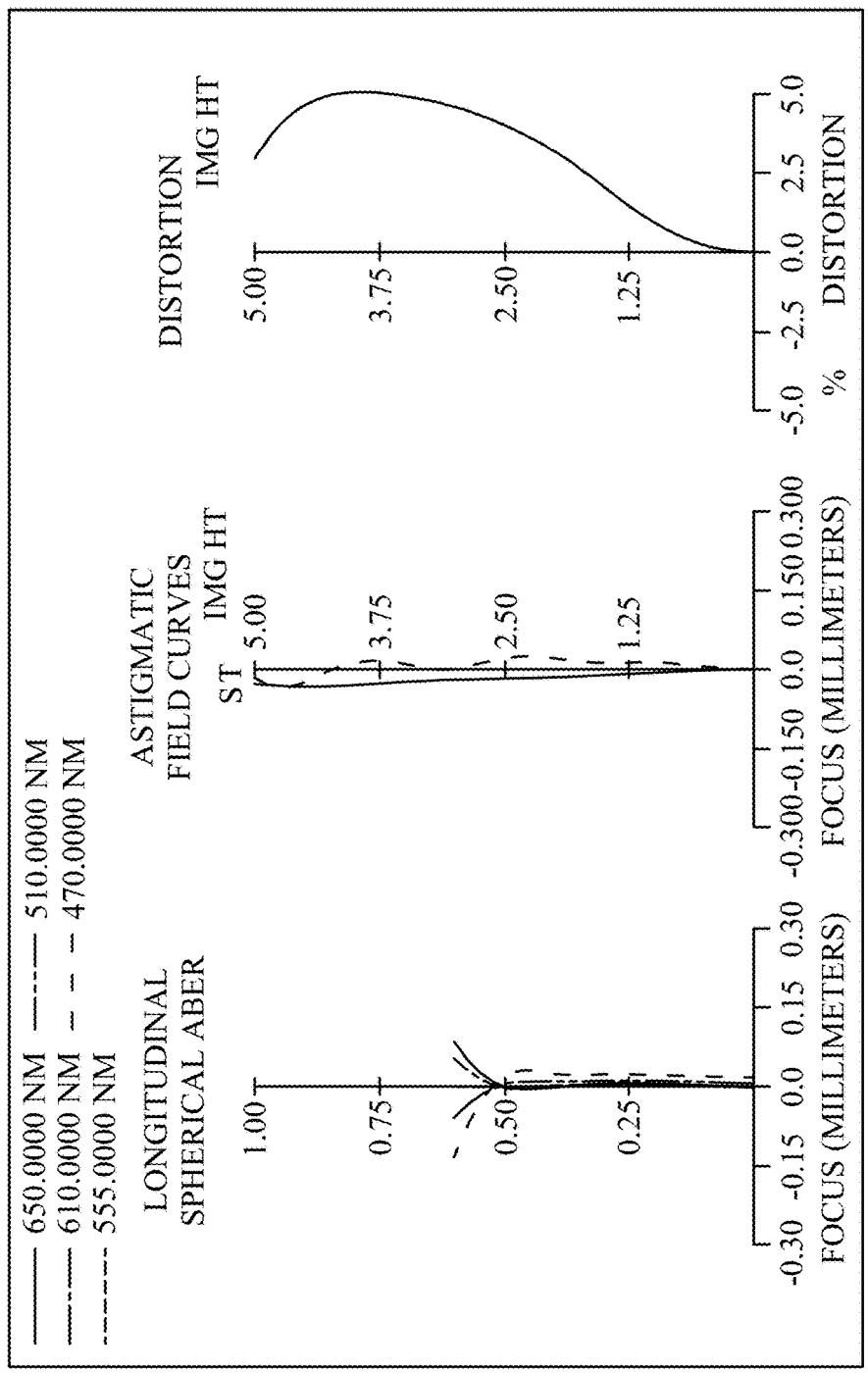
FIG. 1B shows the longitudinal spherical aberration curves, astigmatic field curves, and the optical distortion curve of the optical image capturing system in the order from left to right according to the first embodiment of the present invention.

Reference will now be made in detail to the exemplary embodiments of the present disclosure, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this disclosure will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way. The same reference numbers are used in the drawings and the description to refer to the same or like parts.

It will be understood that, although the terms 'first', 'second', 'third', etc., may be used herein to describe various elements, these elements should not be limited by these terms. The terms are used only for the purpose of distinguishing one component from another component. Thus, a first element discussed below could be termed a second element without departing from the teachings of embodiments. As used herein, the term "or" includes any and all combinations of one or more of the associated listed items.

The optical image capturing system, in the order from an object side to an image side, includes a first, second, third, fourth, fifth and sixth lens elements with refractive powers and an image plane. The optical image capturing system may further include an image sensing device which is disposed on the image plane.

The optical image capturing system may use three sets of operation wavelengths, which are 486.1 nm, 587.5 nm and 656.2 nm, respectively, wherein 587.5 nm is served as the primary reference wavelength in order to obtain technical features of the optical system. The optical image capturing system may also use five sets of wavelengths which are 470 nm, 510 nm, 555 nm, 610 nm and 650 nm, respectively, wherein 555 nm is served as the primary reference wavelength in order to to obtain technical features of the optical system.

The ratio of the focal length f of the optical image capturing system to a focal length fp of each lens element with positive refractive power is PPR. The ratio of the focal length f of the optical image capturing system to a focal length fn of each lens element with negative refractive power is NPR. A sum of the PPR of all lens elements with positive refractive powers is ΣPPR. The sum of the NPR of all lens elements with negative refractive powers is ΣNPR. The total refractive power and the total length of the optical image capturing system can be controlled easily when following conditions are satisfied: 0.5≤ΣPPR/|ΣNPR|≤15. Preferably, the following condition may be satisfied: 1≤ΣPPR/|ΣNPR|≤3.0.

The optical image capturing system may further include an image sensing device that is disposed on an image plane. Half of a diagonal of an effective detection field of the image sensing device (imaging height or the maximum image height of the optical image capturing system) is HOI. A distance on the optical axis from the object-side surface of the first lens element to the image plane is HOS. The following conditions are satisfied: HOS/HOI≤10 and 0.5≤HOS/f≤10. Preferably, the following conditions may be satisfied: 1≤HOS/HOI≤5 and 1≤HOS/f≤7. With this configuration, the size of the optical image capturing system can be kept small, such that a lightweight electronic product is able to accommodate it.

In addition, in the optical image capturing system of the disclosure, according to different requirements, at least one aperture stop may be arranged for reducing stray light and improving the imaging quality.

In the optical image capturing system of the disclosure, the aperture stop may be a front or middle aperture. The front aperture is the aperture stop between a photographed object and the first lens element. The middle aperture is the aperture stop between the first lens element and the image plane. If the aperture stop is the front aperture, a longer distance between the exit pupil and the image plane of the optical image capturing system can be formed, such that more optical elements can be disposed in the optical image capturing system and the efficiency of the image sensing device in receiving image can be improved. If the aperture stop is the middle aperture, the angle of view of the optical image capturing system can be expended, such that the optical image capturing system has the same advantage that is owned by wide angle cameras. The distance from the aperture stop to the image plane is InS. The following condition is satisfied: $0.2 \leq InS/HOS \leq 1.1$. Hereby, the size of the optical image capturing system can be kept small without sacrificing the feature of wide angle of view.

In the optical image capturing system of the disclosure, a distance from the object-side surface of the first lens element to the image-side surface of the sixth lens element is InTL. The sum of central thicknesses of all lens elements with refractive power on the optical axis is ΣTP. The following condition is satisfied: $0.1 \leq \Sigma TP/InTL \leq 0.9$. Hereby, the contrast ratio for the image formation in the optical image capturing system can be improved without sacrificing the defect-free rate during the manufacturing of the lens element, and a proper back focal length is provided to accommodate other optical components in the optical image capturing system.

The curvature radius of the object-side surface of the first lens element is R1. The curvature radius of the image-side surface of the first lens element is R2. The following condition is satisfied: $0.001 \leq |R1/R2| \leq 20$. Hereby, the first lens element may have a suitable magnitude of positive refractive power, so as to prevent the longitudinal spherical aberration from increasing too fast. Preferably, the following condition may be satisfied: $0.01 \leq |R1/R2| < 10$.

The curvature radius of the object-side surface of the sixth lens element is R11. The curvature radius of the image-side surface of the sixth lens element is R12. The following condition is satisfied: $-7 < (R11-R12)/(R11+R12) < 50$. This configuration is beneficial to the correction of the astigmatism generated by the optical image capturing system.

The distance between the first lens element and the second lens element on the optical axis is IN12. The following condition is satisfied: $IN12/f \leq 3.0$. Hereby, the chromatic aberration of the lens elements can be mitigated, such that their performance is improved.

The distance between the fifth lens element and the sixth lens element on the optical axis is IN56. The following condition is satisfied: $IN56/f \leq 0.8$. Hereby, the chromatic aberration of the lens elements can be mitigated, such that their performance is improved.

Central thicknesses of the first lens element and the second lens element on the optical axis are TP1 and TP2, respectively. The following condition is satisfied: $0.1 \leq (TP1+IN12)/TP2 \leq 10$. Hereby, the sensitivity of the optical image capturing system can be controlled, and its performance can be improved.

Central thicknesses of the fifth lens element and the sixth lens element on the optical axis are TP5 and TP6, respectively, and a distance between those two lens elements on the optical axis is IN56. The following condition is satisfied: $0.1 \leq (TP6+IN56)/TP5 \leq 10$. Hereby, the sensitivity of the optical image capturing system can be controlled and the total height of the optical image capturing system can be reduced.

The central thicknesses of the second, third and fourth lens elements on the optical axis are TP2, TP3 and TP4, respectively. The distance between the second lens element and the third lens element on the optical axis is IN23; the distance between the third lens element and the fourth lens element on the optical axis is IN34; the distance between the fourth lens element and the fifth lens element on the optical axis is IN45. The distance between the object-side surface of the first lens element and the image-side surface of the sixth lens element is denoted by InTL. The following condition is satisfied: $0.1 \leq TP4/(IN34+TP4+IN45) < 1$. Hereby, the aberration generated when the incident light is travelling inside the optical system can be corrected slightly layer upon layer, and the total height of the optical image capturing system can be reduced.

In the optical image capturing system of the first embodiment, a distance perpendicular to the optical axis between a critical point C61 on an object-side surface of the sixth lens element and the optical axis is HVT61. A distance perpendicular to the optical axis between a critical point C62 on an image-side surface of the sixth lens element and the optical axis is HVT62. A distance in parallel with the optical axis from an axial point on the object-side surface of the sixth lens element to the critical point C61 is SGC61. A distance in parallel with the optical axis from an axial point on the image-side surface of the sixth lens element to the critical point C62 is SGC62. The following conditions may be satisfied: $0 \text{ mm} \leq HVT61 \leq 3 \text{ mm}$, $0 \text{ mm} < HVT62 \leq 6 \text{ mm}$, $0 \leq HVT61/HVT62$, $0 \text{ mm} \leq |SGC61| \leq 0.5 \text{ mm}$; $0 \text{ mm} \leq |SGC62| \leq 2 \text{ mm}$, and $0 < |SGC62|/(|SGC62|+TP6) \leq 0.9$. Hereby, the off-axis aberration can be corrected effectively.

The following condition is satisfied for the optical image capturing system of the present disclosure: $0.2 \leq HVT62/HOI \leq 0.9$. Preferably, the following condition may be satisfied: $0.3 \leq HVT62/HOI \leq 0.8$. Hereby, the aberration of surrounding field of view for the optical image capturing system can be corrected.

The following condition is satisfied for the optical image capturing system of the present disclosure: $0 \leq HVT62/HOS \leq 0.5$. Preferably, the following condition is satisfied: $0.2 \leq HVT62/HOS \leq 0.45$. Hereby, the aberration of surrounding field of view for the optical image capturing system can be corrected.

In the optical image capturing system of the disclosure, the distance in parallel with an optical axis from an inflection point on the object-side surface of the sixth lens element that is nearest to the optical axis to an axial point on the object-side surface of the sixth lens element is denoted by SGI611. A distance in parallel with an optical axis from an inflection point on the image-side surface of the sixth lens element that is nearest to the optical axis to an axial point on the image-side surface of the sixth lens element is denoted by SGI621. The following conditions are satisfied: $0 < SGI611/(SGI611+TP6) \leq 0.9$ and $0 < SGI621/(SGI621+TP6) \leq 0.9$. Preferably, the following conditions may be satisfied: $0.1 \leq SGI611/(SGI611+TP6) \leq 0.6$ and $0.1 \leq SGI621/(SGI621+TP6) \leq 0.6$.

The distance in parallel with the optical axis from the inflection point on the object-side surface of the sixth lens element that is second nearest to the optical axis to an axial point on the object-side surface of the sixth lens element is denoted by SGI612. The distance in parallel with an optical axis from an inflection point on the image-side surface of the sixth lens element that is second nearest to the optical axis to an axial point on the image-side surface of the sixth lens element is denoted by SGI622. The following conditions are satisfied: $0 < SGI612/(SGI612+TP6) \leq 0.9$ and $0 < SGI622/(SGI622+TP6) \leq 0.9$. Preferably, the following conditions may be satisfied: $0.1 \leq SGI612/(SGI612+TP6) \leq 0.6$ and $0.1 \leq SGI622/(SGI622+TP6) \leq 0.6$.

The distance perpendicular to the optical axis between the inflection point on the object-side surface of the sixth lens element that is the nearest to the optical axis and the optical axis is denoted by HIF611. The distance perpendicular to the optical axis between an axial point on the image-side surface of the sixth lens element and an inflection point on the image-side surface of the sixth lens element that is the nearest to the optical axis is denoted by HIF621. The following conditions are satisfied: $0.001 \text{ mm} \leq |HIF611| \leq 5$ mm and 0.001 mm≤|HIF621|≤5 mm. Preferably, the following conditions may be satisfied: 0.1 mm≤|HIF611|≤3.5 mm and 1.5 mm≤|HIF621|≤3.5 mm.

The distance perpendicular to the optical axis between the inflection point on the object-side surface of the sixth lens element that is second nearest to the optical axis and the optical axis is denoted by HIF612. A distance perpendicular to the optical axis between an axial point on the image-side surface of the sixth lens element and an inflection point on the image-side surface of the sixth lens element that is second nearest to the optical axis is denoted by HIF622. The following conditions are satisfied: 0.001 mm≤|HIF612|≤5 mm and 0.001 mm≤|HIF622|≤5 mm. Preferably, the following conditions may be satisfied: 0.1 mm≤|HIF622|≤3.5 mm and 0.1 mm≤|HIF612|≤3.5 mm.

The distance perpendicular to the optical axis between the inflection point on the object-side surface of the sixth lens element that is third nearest to the optical axis and the optical axis is denoted by HIF613. The distance perpendicular to the optical axis between an axial point on the image-side surface of the sixth lens element and an inflection point on the image-side surface of the sixth lens element that is third nearest to the optical axis is denoted by HIF623. The following conditions are satisfied: 0.001 mm≤|HIF613|≤5 mm and 0.001 mm≤|HIF623|≤5 mm. Preferably, the following conditions may be satisfied: 0.1 mm≤|HIF623|≤3.5 mm and 0.1 mm≤|HIF613|≤3.5 mm.

The distance perpendicular to the optical axis between the inflection point on the object-side surface of the sixth lens element that is fourth nearest to the optical axis and the optical axis is denoted by HIF614. The distance perpendicular to the optical axis between an axial point on the image-side surface of the sixth lens element and an inflection point on the image-side surface of the sixth lens element that is fourth nearest to the optical axis is denoted by HIF624. The following conditions are satisfied: 0.001 mm≤|HIF614|≤5 mm and 0.001 mm≤|HIF624|≤5 mm. Preferably, the following conditions may be satisfied: 0.1 mm≤|HIF624|≤3.5 mm and 0.1 mm≤|HIF614|≤3.5 mm.

In one embodiment of the optical image capturing system of the present disclosure, the chromatic aberration of the optical image capturing system can be corrected by alternatively arranging the lens elements with large Abbe number and small Abbe number.

The Aspheric equation for the lens element can be represented by:

$$z=ch^2/[1+[1-(k+1)c^2h^2]^{0.5}]+A_4h^4+A_6h^6+A_8h^8+A_{10}h^{10}+A_{12}h^{12}+A_{14}h^{14}+A_{16}h^{16}+A_{18}h^{18}+A_{20}h^{20}+\ldots \quad (1),$$

where z is a position value of the position along the optical axis and at the height h which reference to the surface apex; k is the conic coefficient, c is the reciprocal of curvature radius, and $A_4$, $A_6$, $A_5$, $A_{10}$, $A_{12}$, $A_{14}$, $A_{16}$, $A_{18}$, and $A_{20}$ are high order aspheric coefficients.

In the optical image capturing system provided by the disclosure, the lens elements may be made of glass or plastic material. If plastic material is adopted to produce the lens elements, the production cost and the weight thereof can be reduced significantly. If lens elements are made of glass, the heat effect can be controlled, and there will be more options to allocation the refractive powers of the lens elements in the optical image capturing system. Besides, the object-side surface and the image-side surface of the first through sixth lens elements may be aspheric, which provides more control variables, such that the number of lens elements used can be reduced in contrast to traditional glass lens element, and the aberration can be reduced too. Thus, the total height of the optical image capturing system can be reduced effectively.

In addition, in the optical image capturing system provided by the disclosure, if the lens element has a convex surface, the surface of the lens element adjacent to the optical axis is convex in principle. If the lens element has a concave surface, the surface of the lens element adjacent to the optical axis is concave in principle.

The optical image capturing system of the disclosure can be adapted to the optical image capturing system with automatic focus if required. With the features of a good aberration correction and a high quality of image formation, the optical image capturing system can be used in various applications.

The optical image capturing system of the disclosure can include a driving module according to the actual requirements. The driving module may be coupled with the lens elements and enables the movement of the lens elements. The driving module described above may be the voice coil motor (VCM) which is applied to move the lens to focus, or may be the optical image stabilization (OIS) which is applied to reduce the frequency the optical system is out of focus owing to the vibration of the lens during photo or video shooting.

At least one lens element among the first, second, third, fourth, fifth and the sixth lens elements of the optical image capturing system of the present disclosure may be a filtering element of light with wavelength of less than 500 nm according to the actual requirements. The filtering element of light may be made by coating film on at least one surface of that lens element to impart it with certain filtering function, or forming the lens element with material that can filter light with short wavelength.

The image plane of the optical image capturing system of the present disclosure may be a plane or a curved surface, depending on the design requirement. When the image plane is a curved surface (e.g. a spherical surface with curvature radius), the incident angle required such that the rays are focused on the image plane can be reduced. As such, the total track length (TTL) of the optical image capturing system can be minimized, and the relative illumination may be improved as well.

One aspect of the present invention is to provide a plastic lens positioning element. The plastic lens positioning element may be formed integrally, and may be used for accommodating and positioning the lens elements of the present invention. The outer wall of the lens positioning element may further include at least two sprue marks. Those sprue marks may be symmetrically disposed around an axis (e.g. the optical axis), such that the thickness of the plastic lens positioning element is more uniform, and the structural strength thereof is improved. When the outer wall of the plastic lens positioning element is disposed with two sprue marks, the angles between the sprue marks may be 180 degrees. When the outer wall of the plastic lens positioning element is disposed with three sprue marks, the angles between the sprue marks may be 120 degrees. The aforementioned sprue marks may be disposed at the outer wall of the object-side end or the outer wall of the image-side end.

According to the above embodiments, the specific embodiments are presented in detail and accompanied by the drawings in the paragraphs hereinafter.

The First Embodiment (Embodiment 1)

Figure 1C:
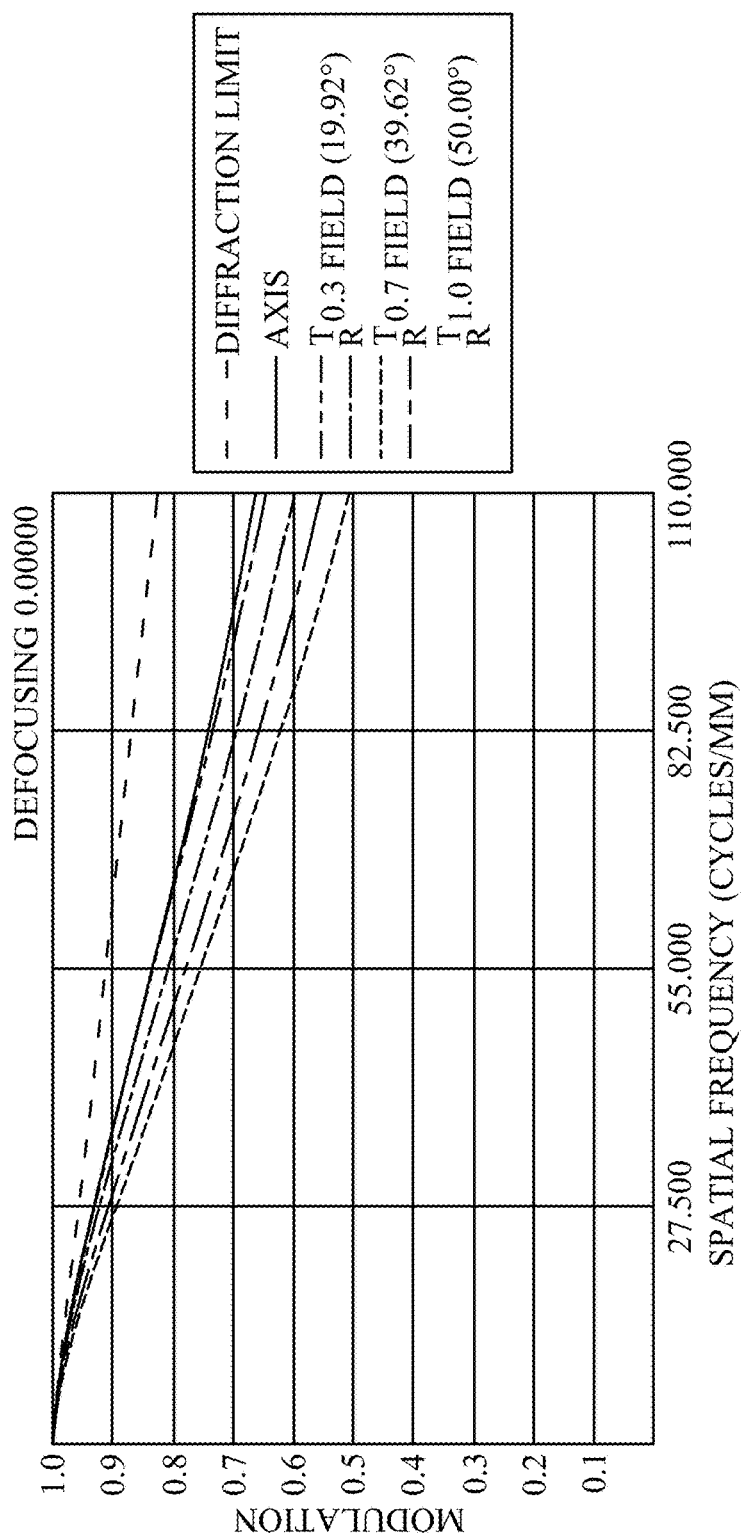
FIG. 1C is a characteristic diagram of modulation transfer of the visible light according to the first embodiment of the present application.

Please refer to FIG. 1A and FIG. 1B. FIG. 1A is a schematic view of the optical image capturing system according to the first embodiment of the present application, FIG. 1B is longitudinal spherical aberration curves, astigmatic field curves, and an optical distortion curve of the optical image capturing system in the order from left to right according to the first embodiment of the present application. FIG. 1C is a characteristic diagram of modulation transfer of visible light for the optical image capturing system of the first embodiment of the present invention. As shown in FIG. 1A, in the order from an object side to an image side, the optical image capturing system includes a first lens element 110, an aperture stop 100, a second lens element 120, a third lens element 130, a fourth lens element 140, a fifth lens element 150, a sixth lens element 160, an IR-bandstop filter 180, an image plane 190, and an image sensing device 192.

The first lens element 110 has negative refractive power and it is made of plastic material. The first lens element 110 has a concave object-side surface 112 and a concave image-side surface 114, both of the object-side surface 112 and the image-side surface 114 are aspheric, and the object-side surface 112 has two inflection points. The central thickness of the first lens element on the optical axis is TP1. The thickness of the first lens element at the height of ½ HEP is denoted by ETP1.

The distance in parallel with an optical axis from an inflection point on the object-side surface of the first lens element that is nearest to the optical axis to an axial point on the object-side surface of the first lens element is denoted by SGI111. The distance in parallel with an optical axis from an inflection point on the image-side surface of the first lens element that is nearest to the optical axis to an axial point on the image-side surface of the first lens element is denoted by SGI121. The following conditions are satisfied: SGI111=−0.0031 mm and |SGI111|/(|SGI111|+TP1)=0.0016.

The distance in parallel with an optical axis from an inflection point on the object-side surface of the first lens element that is second nearest to the optical axis to an axial point on the object-side surface of the first lens element is denoted by SGI112. The distance in parallel with an optical axis from an inflection point on the image-side surface of the first lens element that is second nearest to the optical axis to an axial point on the image-side surface of the first lens element is denoted by SGI122. The following conditions are satisfied: SGI112=1.3178 mm and |SGI112|/(|SGI112|+TP1)=0.4052.

The distance perpendicular to the optical axis from the inflection point on the object-side surface of the first lens element that is nearest to the optical axis to an axial point on the object-side surface of the first lens element is denoted by HIF111. The distance perpendicular to the optical axis from the inflection point on the image-side surface of the first lens element that is nearest to the optical axis to an axial point on the image-side surface of the first lens element is denoted by HIF121. The following conditions are satisfied: HIFI11=0.5557 mm and HIF111/HOI=0.1111.

The perpendicular distance to the optical axis from the inflection point on the object-side surface of the first lens element that is second nearest to the optical axis to an axial point on the object-side surface of the first lens element is denoted by HIF112. The distance perpendicular to the optical axis from the inflection point on the image-side surface of the first lens element that is second nearest to the optical axis to an axial point on the image-side surface of the first lens element is denoted by HIF122. The following conditions are satisfied: HIF112=5.3732 mm and HIF112/HOI=1.0746.

The second lens element 120 has positive refractive power and it is made of plastic material. The second lens element 120 has a convex object-side surface 122 and a convex image-side surface 124, and both of the object-side surface 122 and the image-side surface 124 are aspheric. The object-side surface 122 has one inflection point. The central thickness of the second lens element on the optical axis is TP2. The thickness of the second lens element at the height of ½ HEP is denoted by ETP2.

The distance in parallel with an optical axis from an inflection point on the object-side surface of the second lens element that is nearest to the optical axis to the axial point on the object-side surface of the second lens element is denoted by SGI211. The distance in parallel with an optical axis from an inflection point on the image-side surface of the second lens element that is nearest to the optical axis to the axial point on the image-side surface of the second lens element is denoted by SGI221. The following conditions are satisfied: SGI211=0.1069 mm, |SGI211|/(|SGI211|+TP2)=0.0412, SGI221=0 mm and |SGI221|/(|SGI221|+TP2)=0.

The distance perpendicular to the optical axis from the inflection point on the object-side surface of the second lens element that is nearest to the optical axis to the axial point on the object-side surface of the second lens element is denoted by HIF211. The distance perpendicular to the optical axis from the inflection point on the image-side surface of the second lens element that is nearest to the optical axis to the axial point on the image-side surface of the second lens element is denoted by HIF221. The following conditions are satisfied: HIF211=1.1264 mm, HIF211/HOI=0.2253, HIF221=0 mm and HIF221/HOI=0.

The third lens element 130 has negative refractive power and it is made of plastic material. The third lens element 130 has a concave object-side surface 132 and a convex image-side surface 134, and both of the object-side surface 132 and the image-side surface 134 are aspheric. The object-side surface 132 and the image-side surface 134 both have an inflection point. The central thickness of the third lens element on the optical axis is TP3. The thickness of the third lens element at the height of ½ HEP is denoted by ETP3.

The distance in parallel with an optical axis from an inflection point on the object-side surface of the third lens element that is nearest to the optical axis to an axial point on the object-side surface of the third lens element is denoted by SGI311. The distance in parallel with an optical axis from an inflection point on the image-side surface of the third lens element that is nearest to the optical axis to an axial point on the image-side surface of the third lens element is denoted by SGI321. The following conditions are satisfied: SGI311=−0.3041 mm, |SGI311|/(|SGI311|+TP3)=0.4445, SGI321=−0.1172 mm and |SGI321|/(|SGI321|+TP3)=0.2357.

The distance perpendicular to the optical axis between the inflection point on the object-side surface of the third lens element that is nearest to the optical axis and the axial point on the object-side surface of the third lens element is denoted by HIF311. The distance perpendicular to the optical axis between the inflection point on the image-side surface of the third lens element that is nearest to the optical axis and the axial point on the image-side surface of the third lens element is denoted by HIF321. The following conditions are satisfied: HIF311=1.5907 mm, HIF311/HOI=0.3181, HIF321=1.3380 mm and HIF321/HOI=0.2676.

The fourth lens element 140 has positive refractive power and it is made of plastic material. The fourth lens element 140 has a convex object-side surface 142 and a concave image-side surface 144; both of the object-side surface 142 and the image-side surface 144 are aspheric. The object-side surface 142 thereof has two inflection points, and the image-side surface 144 has one inflection point. The central thickness of the fourth lens element on the optical axis is TP4. The thickness of the fourth lens element at the height of ½ HEP is denoted by ETP4.

The distance in parallel with an optical axis from an inflection point on the object-side surface of the fourth lens element that is nearest to the optical axis to the axial point on the object-side surface of the fourth lens element is denoted by SGI411. The distance in parallel with an optical axis from an inflection point on the image-side surface of the fourth lens element that is nearest to the optical axis to the axial point on the image-side surface of the fourth lens element is denoted by SGI421. The following conditions are satisfied: SGI411=0.0070 mm, |SGI411|/(|SGI411|+TP4)=0.0056, SGI421=0.0006 mm and |SGI421|/(|SGI421|+TP4)=0.0005.

The distance in parallel with an optical axis from an inflection point on the object-side surface of the fourth lens element that is second nearest to the optical axis to the axial point on the object-side surface of the fourth lens element is denoted by SGI412. The distance in parallel with an optical axis from an inflection point on the image-side surface of the fourth lens element that is second nearest to the optical axis to the axial point on the image-side surface of the fourth lens element is denoted by SGI422. The following conditions are satisfied: SGI412=−0.2078 mm and |SGI412|/(|SGI412|+TP4)=0.1439.

The perpendicular distance between the inflection point on the object-side surface of the fourth lens element that is nearest to the optical axis and the optical axis is denoted by HIF411. The perpendicular distance between the inflection point on the image-side surface of the fourth lens element that is nearest to the optical axis and the optical axis is denoted by HIF421. The following conditions are satisfied: HIF411=0.4706 mm, HIF411/HOI=0.0941, HIF421=0.1721 mm and HIF421/HOI=0.0344.

The distance perpendicular to the optical axis between the inflection point on the object-side surface of the fourth lens element that is second nearest to the optical axis and the optical axis is denoted by HIF412. The distance perpendicular to the optical axis between the inflection point on the image-side surface of the fourth lens element that is second nearest to the optical axis and the optical axis is denoted by HIF422. The following conditions are satisfied: HIF412=2.0421 mm and HIF412/HOI=0.4084.

The fifth lens element 150 has positive refractive power and it is made of plastic material. The fifth lens element 150 has a convex object-side surface 152 and a convex image-side surface 154, and both of the object-side surface 152 and the image-side surface 154 are aspheric. The object-side surface 152 has two inflection points and the image-side surface 154 has one inflection point. The central thickness of the fifth lens element on the optical axis is TP5. The thickness of the fifth lens element at the height of ½ HEP is denoted by ETP5.

The distance in parallel with an optical axis from an inflection point on the object-side surface of the fifth lens element that is nearest to the optical axis to the axial point on the object-side surface of the fifth lens element is denoted by SGI511. The distance in parallel with an optical axis from an inflection point on the image-side surface of the fifth lens element that is nearest to the optical axis to the axial point on the image-side surface of the fifth lens element is denoted by SGI521. The following conditions are satisfied: SGI511=0.00364 mm, |SGI511|/(|SGI511|+TP5)=0.00338, SGI521=−0.63365 mm and |SGI521|/(|SGI521|+TP5)=0.37154.

The distance in parallel with an optical axis from an inflection point on the object-side surface of the fifth lens element that is second nearest to the optical axis to the axial point on the object-side surface of the fifth lens element is denoted by SGI512. The distance in parallel with an optical axis from an inflection point on the image-side surface of the fifth lens element that is second nearest to the optical axis to the axial point on the image-side surface of the fifth lens element is denoted by SGI522. The following conditions are satisfied: SGI512=−0.32032 mm and |SGI512|/(|SGI512|+TP5)=0.23009.

The distance in parallel with an optical axis from an inflection point on the object-side surface of the fifth lens element that is third nearest to the optical axis to the axial point on the object-side surface of the fifth lens element is denoted by SGI513. The distance in parallel with an optical axis from an inflection point on the image-side surface of the fifth lens element that is third nearest to the optical axis to the axial point on the image-side surface of the fifth lens element is denoted by SGI523. The following conditions are satisfied: SGI513=0 mm, |SGI513|/(|SGI513|+TP5)=0, SGI523=0 mm and |SGI523|/(|SGI523|+TP5)=0.

The distance in parallel with an optical axis from an inflection point on the object-side surface of the fifth lens element that is fourth nearest to the optical axis to the axial point on the object-side surface of the fifth lens element is denoted by SGI514. The distance in parallel with an optical axis from an inflection point on the image-side surface of the fifth lens element that is fourth nearest to the optical axis to the axial point on the image-side surface of the fifth lens element is denoted by SGI524. The following conditions are satisfied: SGI514=0 mm, |SGI514|/(|SGI514|+TP5)=0, SGI524=0 mm and |SGI524|/(|SGI524|+TP5)=0.

The perpendicular distance between the optical axis and the inflection point on the object-side surface of the fifth lens element that is nearest to the optical axis is denoted by HIF511. The perpendicular distance between the optical axis and the inflection point on the image-side surface of the fifth lens element that is nearest to the optical axis is denoted by HIF521. The following conditions are satisfied: HIF511=0.28212 mm, HIF511/HOI=0.05642, HIF521=2.13850 mm and HIF521/HOI=0.42770.

The distance perpendicular to the optical axis between the inflection point on the object-side surface of the fifth lens element that is second nearest to the optical axis and the optical axis is denoted by HIF512. The distance perpendicular to the optical axis between the inflection point on the image-side surface of the fifth lens element that is second nearest to the optical axis and the optical axis is denoted by HIF522. The following conditions are satisfied: HIF512=2.51384 mm and HIF512/HOI=0.50277.

The distance perpendicular to the optical axis between the inflection point on the object-side surface of the fifth lens element that is third nearest to the optical axis and the optical axis is denoted by HIF513. The distance perpendicular to the optical axis between the inflection point on the image-side surface of the fifth lens element that is third nearest to the optical axis and the optical axis is denoted by HIF523. The following conditions are satisfied: HIF513=0 mm, HIF513/HOI=0, HIF523=0 mm and HIF523/HOI=0.

The distance perpendicular to the optical axis between the inflection point on the object-side surface of the fifth lens element that is fourth nearest to the optical axis and the optical axis is denoted by HIF514. The distance perpendicular to the optical axis between the inflection point on the image-side surface of the fifth lens element that is fourth nearest to the optical axis and the optical axis is denoted by HIF524. The following conditions are satisfied: HIF514=0 mm, HIF514/HOI=0, HIF524=0 mm and HIF524/HOI=0.

The sixth lens element 160 has negative refractive power and it is made of plastic material. The sixth lens element 160 has a concave object-side surface 162 and a concave image-side surface 164, and the object-side surface 162 has two inflection points and the image-side surface 164 has one inflection point. Hereby, the incident angle of each field of view on the sixth lens element can be effectively adjusted and the spherical aberration can thus be mitigated. The central thickness of the sixth lens element on the optical axis is TP6. The thickness of the sixth lens element at the height of ½ HEP is denoted by ETP6.

The distance in parallel with an optical axis from an inflection point on the object-side surface of the sixth lens element that is nearest to the optical axis to the axial point on the object-side surface of the sixth lens element is denoted by SGI611. The distance in parallel with an optical axis from an inflection point on the image-side surface of the sixth lens element that is nearest to the optical axis to the axial point on the image-side surface of the sixth lens element is denoted by SGI621. The following conditions are satisfied: SGI611=−0.38558 mm, |SGI611|/(|SGI611|+TP6)=0.27212, SGI621=0.12386 mm and |SGI621|/(|SGI621|+TP6)=0.10722.

The distance in parallel with an optical axis from an inflection point on the object-side surface of the sixth lens element that is second nearest to the optical axis to an axial point on the object-side surface of the sixth lens element is denoted by SGI612. The distance in parallel with an optical axis from an inflection point on the image-side surface of the sixth lens element that is second nearest to the optical axis to the axial point on the image-side surface of the sixth lens element is denoted by SGI622. The following conditions are satisfied: SGI612=−0.47400 mm, |SGI612|/(|SGI612|+TP6)=0.31488, SGI622=0 mm and |SGI622|/(|SGI622|+TP6)=0.

The distance perpendicular to the optical axis between the inflection point on the object-side surface of the sixth lens element that is nearest to the optical axis and the optical axis is denoted by HIF611. The distance perpendicular to the optical axis between the inflection point on the image-side surface of the sixth lens element that is nearest to the optical axis and the optical axis is denoted by HIF621. The following conditions are satisfied: HIF611=2.24283 mm, HIF611/HOI=0.44857, HIF621=1.07376 mm and HIF621/HOI=0.21475.

The distance perpendicular to the optical axis between the inflection point on the object-side surface of the sixth lens element that is second nearest to the optical axis and the optical axis is denoted by HIF612. The distance perpendicular to the optical axis between the inflection point on the image-side surface of the sixth lens element that is second nearest to the optical axis and the optical axis is denoted by HIF622. The following conditions are satisfied: HIF612=2.48895 mm and HIF612/HOI=0.49779.

The distance perpendicular to the optical axis between the inflection point on the object-side surface of the sixth lens element that is third nearest to the optical axis and the optical axis is denoted by HIF613. The distance perpendicular to the optical axis between the inflection point on the image-side surface of the sixth lens element that is third nearest to the optical axis and the optical axis is denoted by HIF623. The following conditions are satisfied: HIF613=0 mm, HIF613/HOI=0, HIF623=0 mm and HIF623/HOI=0.

The distance perpendicular to the optical axis between the inflection point on the object-side surface of the sixth lens element that is fourth nearest to the optical axis and the optical axis is denoted by HIF614. The distance perpendicular to the optical axis between the inflection point on the image-side surface of the sixth lens element that is fourth nearest to the optical axis and the optical axis is denoted by HIF624. The following conditions are satisfied: HIF614=0 mm, HIF614/HOI=0, HIF624=0 mm and HIF624/HOI=0.

The horizontal distance paralleling the optical axis from a coordinate point on the object-side surface of the first lens element at the height of ½ HEP to the image plane is ETL. The horizontal distance paralleling the optical axis from a coordinate point on the object-side surface of the first lens element at the height of ½ HEP to a coordinate point on the image-side surface of the sixth lens element at the height of ½ HEP is EIN. The following conditions are satisfied: ETL=19.304 mm, EIN=15.733 mm and EIN/ETL=0.815.

The present embodiment satisfies the following conditions: ETP1=2.371 mm, ETP2=2.134 mm, ETP3=0.497 mm, ETP4=1.111 mm, ETP5=1.783 mm, and ETP6=1.404 mm; the sum of the aforementioned values ETP1 to ETP6 is SETP, and SETP=9.300 mm; TP1=2.064 mm, TP2=2.500 mm, TP3=0.380 mm, TP4=1.186 mm, TP5=2.184 mm, and TP6=1.105 mm; the sum of the aforementioned values TP1 to TP6 is STP, and STP=9.419 mm; SETP/STP=0.987 and SETP/EIN=0.5911.

In the present embodiment, the ratio (ETP/TP) of the thickness (ETP) of each lens element at the height of ½ entrance pupil diameter (HEP) to the central thickness (TP) of that lens element on the optical axis is specifically manipulated, in order to achieve a balance between the ease of manufacturing the lens elements and its capability of aberration correction. The following conditions are satisfied: ETP1/TP1=1.149, ETP2/TP2=0.854, ETP3/TP3=1.308, ETP4/TP4=0.936, ETP5/TP5=0.817 and ETP6/TP6=1.271.

In the present embodiment, the horizontal distance between each pair of adjacent lens elements at the height of ½ entrance pupil diameter (HEP) is manipulated as well, in order to achieve a balance among the degree of miniaturization for the length of the optical image capturing system HOS, the ease of manufacturing the lens elements, and its capability of aberration correction. In particular, the ratio (ED/IN) of the horizontal distance (ED) between the pair of adjacent lens elements at the height of ½ entrance pupil diameter (HEP) to the horizontal distance (IN) between the pair of adjacent lens elements on the optical axis is controlled. The following conditions are satisfied: the horizontal distance paralleling the optical axis between the first and second lens elements at the height of ½ HEP is ED12, and ED12=5.285 mm; the horizontal distance paralleling the optical axis between the second and third lens elements at the height of ½ HEP is ED23, and ED23=0.283 mm; the horizontal distance paralleling the optical axis between the third and fourth lens elements at the height of ½ HEP is ED34, and ED34=0.330 mm; the horizontal distance paralleling the optical axis between the fourth and fifth lens elements at the height of ½ HEP is ED45, and ED45=0.348 mm; the horizontal distance paralleling the optical axis between the fifth and sixth lens elements at the height of ½ HEP is ED56, and ED56=0.187 mm. The sum of the values of ED12 to ED56 described above is denoted as SED, and SED=6.433 mm.

The horizontal distance between the first and second lens elements on the optical axis is denoted by IN12, where IN12=5.470 mm and ED12/IN12=0.966. The horizontal distance between the second and third lens elements on the optical axis is denoted by IN23, where IN23=0.178 mm and ED23/IN23=1.590. The horizontal distance between the third and fourth lens elements on the optical axis is denoted by IN34, where IN34=0.259 mm and ED34/IN34=1.273. The horizontal distance between the fourth and fifth lens elements on the optical axis is denoted by IN45, where IN45=0.209 mm and ED45/IN45=1.664. The horizontal distance between the fifth and sixth lens elements on the optical axis is denoted by IN56, where IN56=0.034 mm and ED56/IN56=5.557. The sum of the values of IN12 to IN56 described above is denoted as SIN, wherein SIN=6.150 mm and SED/SIN=1.046.

The first embodiment also satisfies the following conditions: ED12/ED23=18.685, ED23/ED34=0.857, ED34, ED45=0.947, ED45/ED56=1.859, IN12/IN23=30.746, IN23/IN34=0.686, IN34/IN45=1.239 and IN45/IN56=6.207.

The horizontal distance paralleling the optical axis from a coordinate point on the image-side surface of the sixth lens element at the height of ½ HEP to the image plane is denoted by EBL, and EBL=3.570 mm. The horizontal distance paralleling the optical axis from the axial point on the image-side surface of the sixth lens element to the image plane is BL, and BL=4.032 mm. The embodiment of the present invention may satisfy the following condition: EBL/BL=0.8854. In the present invention, the distance paralleling the optical axis from a coordinate point on the image-side surface of the sixth lens element at the height of ½ HEP to the IR-bandstop filter is EIR, and EIR=1.950 mm. The distance paralleling the optical axis from the axial point on the image-side surface of the sixth lens element to the IR-bandstop filter is denoted by PIR, and PIR=2.121 mm. The following condition is satisfied: EIR/PIR=0.920.

The IR-bandstop filter 180 is made of glass material. The IR-bandstop filter 180 is disposed between the sixth lens element 160 and the image plane 190, and it does not affect the focal length of the optical image capturing system.

In the optical image capturing system of the first embodiment, the focal length of the optical image capturing system is f, the entrance pupil diameter of the optical image capturing system is HEP, and half of a maximum view angle of the optical image capturing system is HAF. The detailed parameters are shown as below: f=4.075 mm, f/HEP=1.4, HAF=50.001° and tan(HAF)=1.1918.

In the optical image capturing system of the first embodiment, the focal length of the first lens element 110 is f1 and the focal length of the sixth lens element 160 is f6. The following conditions are satisfied: f1=−7.828 mm, |f/f1|=0.52060, f6=−4.886 and |f1|>|f6|.

In the optical image capturing system of the first embodiment, focal lengths of the second lens element 120 to the fifth lens element 150 are f2, f3, f4 and f5, respectively. The following conditions are satisfied: |f2|+|f3|+|f4|+|f5|=95.50815 mm, |f1|+|f6|=12.71352 mm and |f2|+|f3|+|f4|+|f5|>|f1|+|f6|.

The ratio of the focal length f of the optical image capturing system to the focal length fp of each of lens elements with positive refractive power is PPR. The ratio of the focal length f of the optical image capturing system to a focal length fn of each of lens elements with negative refractive power is NPR. In the optical image capturing system of the first embodiment, a sum of the PPR of all lens elements with positive refractive power is ΣPPR=f/f2+f/f4+f/f5=1.63290. The sum of the NPR of all lens elements with negative refractive powers is ΣNPR=|f/f1|+|f/f3|+|f/f6|=1.51305, ΣPPR/|ΣNPR|=1.07921. The following conditions are also satisfied: |f/f2|=0.69101,|f/f3|=0.15834, |f/f4|=0.06883, |f/f5|=0.87305 and |f/f6|=0.83412.

In the optical image capturing system of the first embodiment, the distance from the object-side surface 112 of the first lens element to the image-side surface 164 of the sixth lens element is InTL. The distance from the object-side surface 112 of the first lens element to the image plane 190 is HOS. The distance from an aperture 100 to an image plane 190 is InS. Half of a diagonal length of an effective detection field of the image sensing device 192 is HOI. The distance from the image-side surface 164 of the sixth lens element to the image plane 190 is BFL. The following conditions are satisfied: InTL+BFL=HOS, HOS=19.54120 mm, HOI=5.0 mm, HOS/HOI=3.90824, HOS/f=4.7952, InS=11.685 mm and InS/HOS=0.59794.

In the optical image capturing system of the first embodiment, a total central thickness of all lens elements with refractive power on the optical axis is ΣTP. The following conditions are satisfied: ΣTP=8.13899 mm and ΣTP/InTL=0.52477. Hereby, the contrast ratio for the image formation in the optical image capturing system can be improved without sacrificing the defect-free rate during the manufacturing of the lens element, and a proper back focal length is provided to accommodate other optical components in the optical image capturing system.

In the optical image capturing system of the first embodiment, the curvature radius of the object-side surface 112 of the first lens element is R1. The curvature radius of the image-side surface 114 of the first lens element is R2. The following condition is satisfied: |R1/R2|=8.99987. Hereby, the first lens element may have a suitable magnitude of positive refractive power, so as to prevent the longitudinal spherical aberration from increasing too fast.

In the optical image capturing system of the first embodiment, the curvature radius of the object-side surface 162 of the sixth lens element is R11. The curvature radius of the image-side surface 164 of the sixth lens element is R12. The following condition is satisfied: (R11−R12)/(R11+R12)=1.27780. Hereby, the astigmatism generated by the optical image capturing system can be corrected.

In the optical image capturing system of the first embodiment, a sum of focal lengths of all lens elements with positive refractive power is ΣPP. The following conditions are satisfied: ΣPP=f2+f4+f5=69.770 mm and f5/(f2+f4+f5)=0.067. With this configuration, the positive refractive power of a single lens element can be distributed to other lens elements with positive refractive powers in an appropriate way, so as to suppress the generation of noticeable aberrations when the incident light is propagating in the optical system.

In the optical image capturing system of the first embodiment, a sum of focal lengths of all lens elements with negative refractive power is ΣNP. The following conditions are satisfied: ΣNP=f1+f3+f6=−38.451 mm and f6/(f1+f3+f6)=0.127. With this configuration, the negative refractive power of the sixth lens element may be distributed to other lens elements with negative refractive power in an appropriate way, so as to suppress the generation of noticeable aberrations when the incident light is propagating in the optical system.

In the optical image capturing system of the first embodiment, the distance between the first lens element 110 and the second lens element 120 on the optical axis is IN12. The following conditions are satisfied: IN12=6.418 mm and IN12/f=1.57491. Hereby, the chromatic aberration of the lens elements can be reduced, such that the performance can be improved.

In the optical image capturing system of the first embodiment, the distance between the fifth lens element 150 and the sixth lens element 160 on the optical axis is IN56. The following conditions are satisfied: IN56=0.025 mm and IN56/f=0.00613. Hereby, the chromatic aberration of the lens elements can be reduced, such that their performance can be improved.

In the optical image capturing system of the first embodiment, central thicknesses of the first lens element 110 and the second lens element 120 on the optical axis are TP1 and TP2, respectively. The following conditions are satisfied: TP1=1.934 mm, TP2=2.486 mm and (TP1+IN12)/TP2=3.36005. Hereby, the sensitivity of the optical image capturing system can be controlled, and the performance can be improved.

In the optical image capturing system of the first embodiment, central thicknesses of the fifth lens element 150 and the sixth lens element 160 on the optical axis are TP5 and TP6, respectively, and the distance between the aforementioned two lens elements on the optical axis is IN56. The following conditions are satisfied: TP5=1.072 mm, TP6=1.031 mm and (TP6+IN56)/TP5=0.98555. Hereby, the sensitivity of the optical image capturing system can be controlled and the total height of the optical image capturing system can be reduced.

In the optical image capturing system of the first embodiment, the distance between the third lens element 130 and the fourth lens element 140 on the optical axis is IN34. The distance between the fourth lens element 140 and the fifth lens element 150 on the optical axis is IN45. The following conditions are satisfied: IN34=0.401 mm, IN45=0.025 mm and TP4/(IN34+TP4+IN45)=0.74376. Hereby, the aberration generated when the incident light is propagating inside the optical system can be corrected slightly layer upon layer, and the total height of the optical image capturing system can be reduced.

In the optical image capturing system of the first embodiment, the distance paralleling the optical axis from a maximum effective half diameter position on the object-side surface 152 of the fifth lens element to the axial point on the object-side surface 152 of the fifth lens element is InRS51. The distance paralleling the optical axis from a maximum effective half diameter position on the image-side surface 154 of the fifth lens element to the axial point on the image-side surface 154 of the fifth lens element is InRS52. The central thickness of the fifth lens element 150 is TP5. The following conditions are satisfied: InRS51=−0.34789 mm, InRS52=−0.88185 mm, |InRS51|/TP5=0.32458 and |InRS52|/TP5=0.82276. This configuration is favorable to the manufacturing and forming of lens elements, as well as the minimization of the optical image capturing system.

In the optical image capturing system of the first embodiment, the distance perpendicular to the optical axis between a critical point C51 on the object-side surface 152 of the fifth lens element and the optical axis is HVT51. The distance perpendicular to the optical axis between a critical point C52 on the image-side surface 154 of the fifth lens element and the optical axis is HVT52. The following conditions are satisfied: HVT51=0.515349 mm and HVT52=0 mm.

In the optical image capturing system of the first embodiment, the distance paralleling the optical axis from a maximum effective half diameter position on the object-side surface 162 of the sixth lens element to the axial point on the object-side surface 162 of the sixth lens element is InRS61. The distance paralleling the optical axis from a maximum effective half diameter position on the image-side surface 164 of the sixth lens element to the axial point on the image-side surface 164 of the sixth lens element is InRS62. The central thickness of the sixth lens element 160 on the optical axis is TP6. The following conditions are satisfied: InRS61=−0.58390 mm, InRS62=0.41976 mm, |InRS61|/TP6=0.56616 and |InRS62|/TP6=0.40700. This configuration is favorable to the manufacturing and forming of lens elements, as well as the minimization of the optical image capturing system.

In the optical image capturing system of the first embodiment, the distance perpendicular to the optical axis between a critical point C61 on the object-side surface 162 of the sixth lens element and the optical axis is HVT61. The distance perpendicular to the optical axis between a critical point C62 on the image-side surface 164 of the sixth lens element and the optical axis is HVT62. The following conditions are satisfied: HVT61=0 mm and HVT62=0 mm.

In the optical image capturing system of the first embodiment, the following condition is satisfied: HVT51/HOI=0.1031. Hereby, the aberration of surrounding field of view can be corrected.

In the optical image capturing system of the first embodiment, the following condition is satisfied: HVT51/HOS=0.02634. Hereby, the aberration of surrounding field of view can be corrected.

In the optical image capturing system of the first embodiment, the second lens element 120, the third lens element 130 and the sixth lens element 160 have negative refractive powers. The Abbe number of the second lens element is NA2. The Abbe number of the third lens element is NA3. The Abbe number of the sixth lens element is NA6. The following condition is satisfied: NA6/NA2≤1. Hereby, the chromatic aberration of the optical image capturing system can be corrected.

In the optical image capturing system of the first embodiment, TV distortion and optical distortion for image formation in the optical image capturing system are TDT and ODT, respectively. The following conditions are satisfied: |TDT|=2.124% and |ODT|=5.076%.

In the optical image capturing system of the present embodiment, the modulation transfer rates (values of MTF) of the visible light at the spatial frequency of 55 cycles/mm at the positions of the optical axis, 0.3 HOI and 0.7 HOI on the image plane are respectively denoted by MTFE0, MTFE3 and MTFE7. The following conditions are satisfied: MTFE0 is about 0.84, MTFE3 is about 0.84 and MTFE7 is about 0.75. The modulation transfer rates (values of MTF) of the visible light at the spatial frequency of 110 cycles/mm at the positions of the optical axis, 0.3 HOI and 0.7 HOI on the image plane are respectively denoted by MTFQ0, MTFQ3 and MTFQ7. The following conditions are satisfied: MTFQ0 is about 0.66, MTFQ3 is about 0.65 and MTFQ7 is about 0.51. The modulation transfer rates (values of MTF) at spatial frequency of 220 cycles/mm at the positions of the optical axis, 0.3 HOI and 0.7 HOI on the image plane are respectively denoted by MTFH0, MTFH3 and MTFH7. The following conditions are satisfied: MTFH0 is about 0.17, MTFH3 is about 0.07 and MTFH7 is about 0.14.

In the optical image capturing system of the present embodiment, when the infrared light with operational wavelength of 850 nm is focused on the image plane, the modulation transfer rates (values of MTF) for a spatial frequency of 55 cycles/mm at the positions of the optical axis, 0.3 HOI and 0.7 HOI on the image plane are respectively denoted by MTFI0, MTFI3 and MTFI7. The following conditions are satisfied: MTFI0 is about 0.81, MTFI3 is about 0.8 and MTFI7 is about 0.15.

Figure 7A:
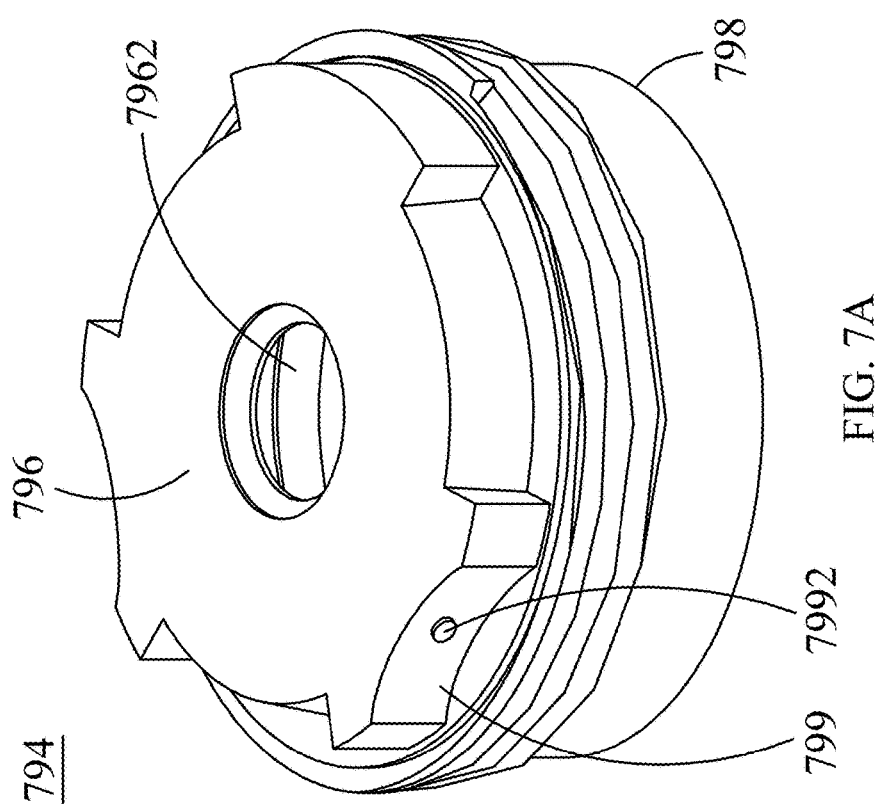
FIG. 7A is the perspective side view of the lens positioning element of the first embodiment of the present invention.
Figure 7B:
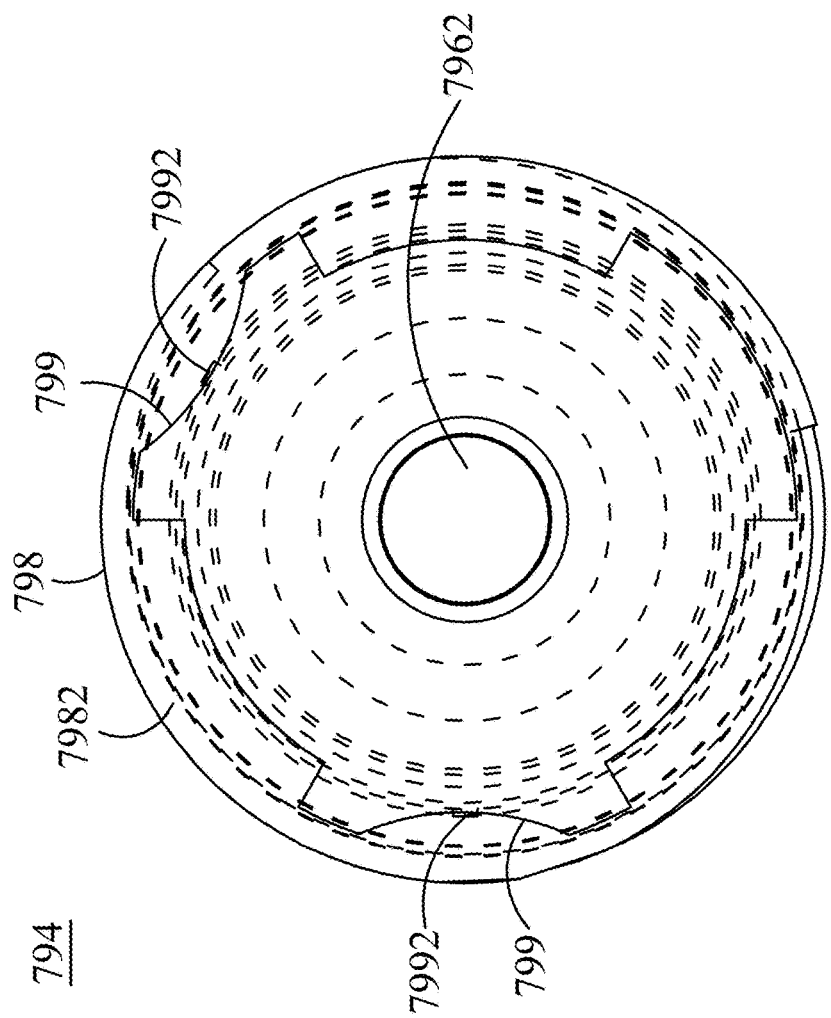
FIG. 7B is the plan view of the lens positioning element of the first embodiment of the present invention, which is taken in the direction from the second opening at the image-side end to the first opening of the object-side end. The outer wall of the lens positioning element is disposed with two tangent planes, and each tangent plane has a sprue mark.
Figure 7C:
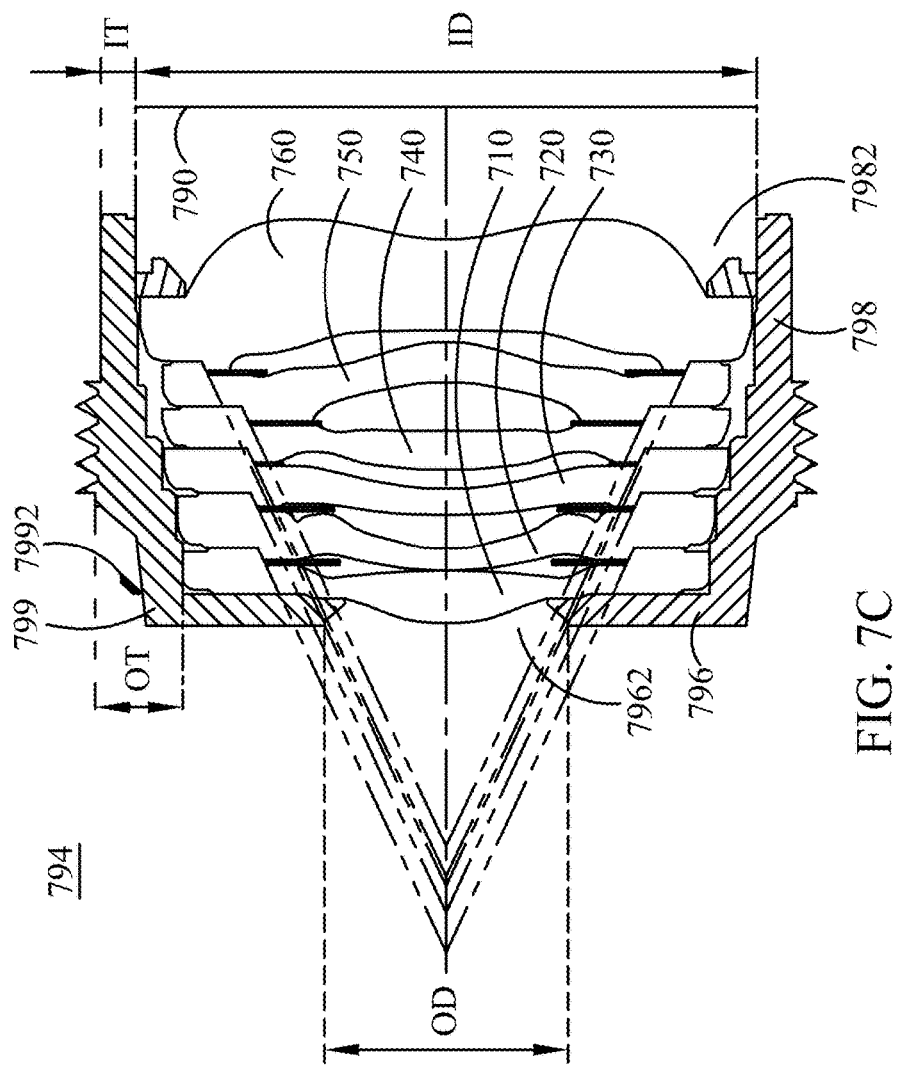
FIG. 7C is the sectional view of the lens positioning element of the first embodiment of the present invention.
Figure 8A:
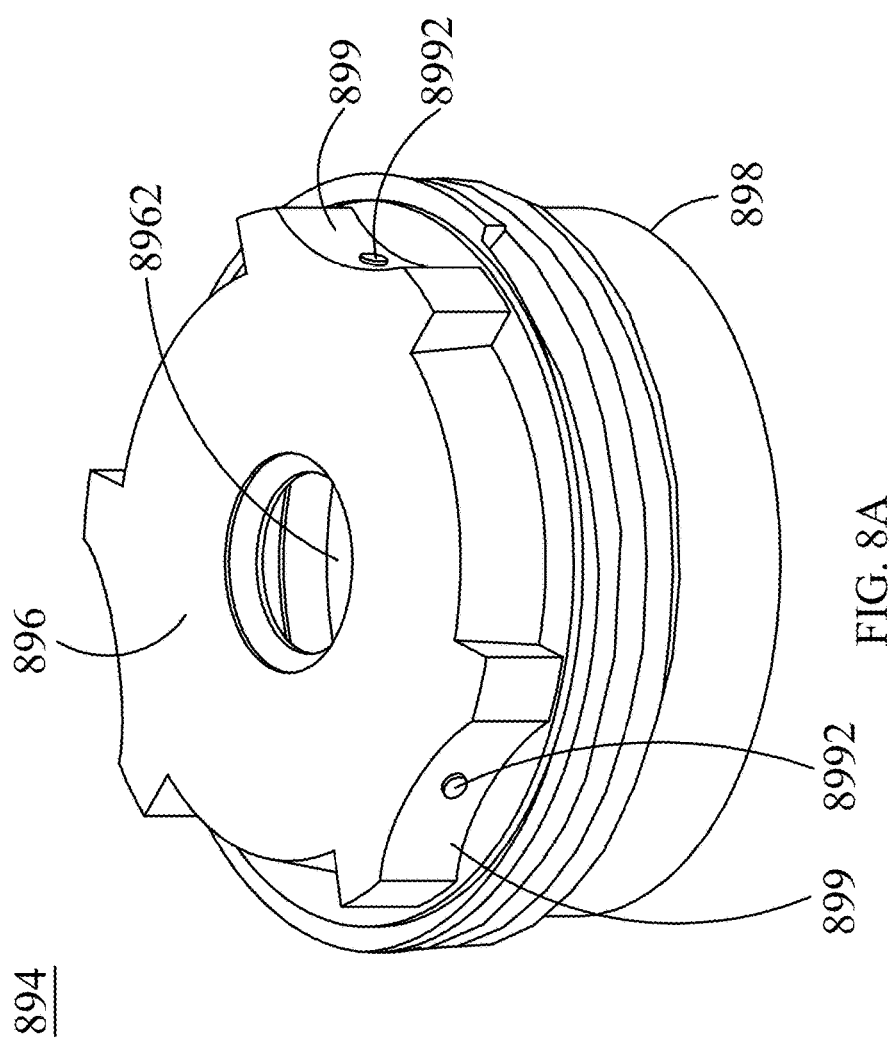
FIG. 8A is the perspective side view illustrating the lens positioning elements of the second to sixth embodiments of the present invention.
Figure 8B:
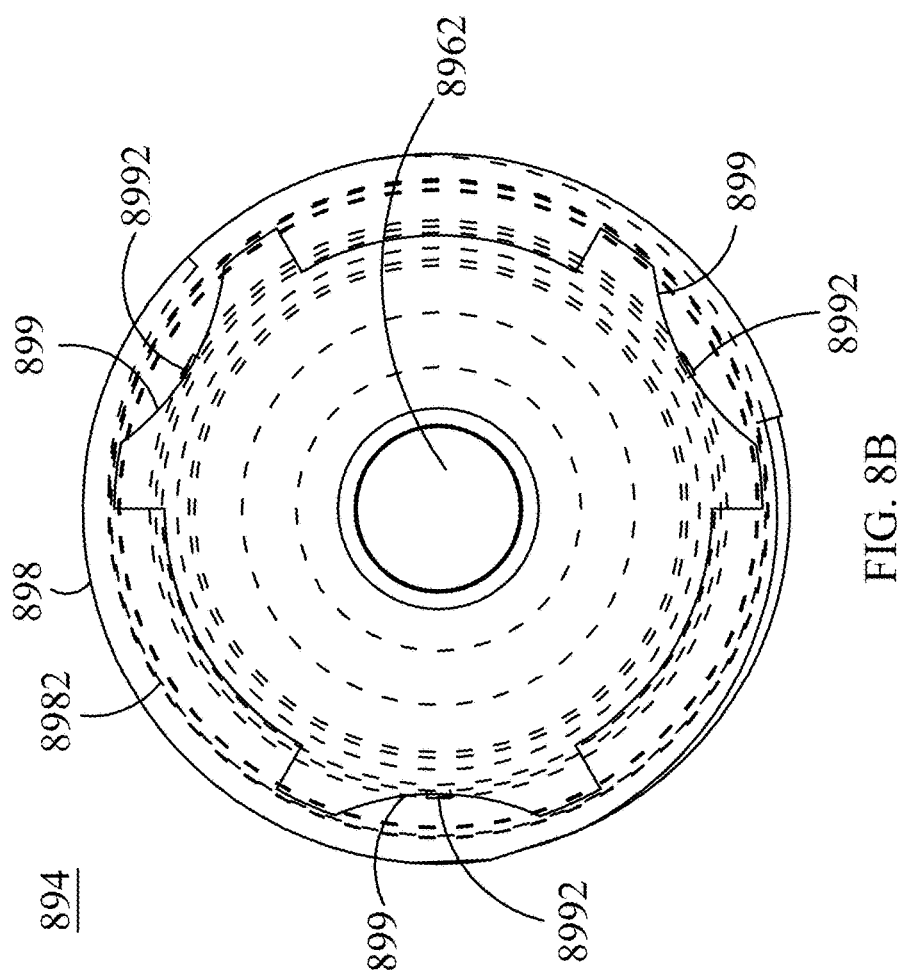
FIG. 8B is the plan view illustrating the lens positioning elements of the second to sixth embodiments of the present invention, which is taken in the direction from the second opening at the image-side end to the first opening of the object-side end. The outer wall of the lens positioning element is disposed with three tangent planes, and each tangent plane has a sprue mark.
Figure 8C:
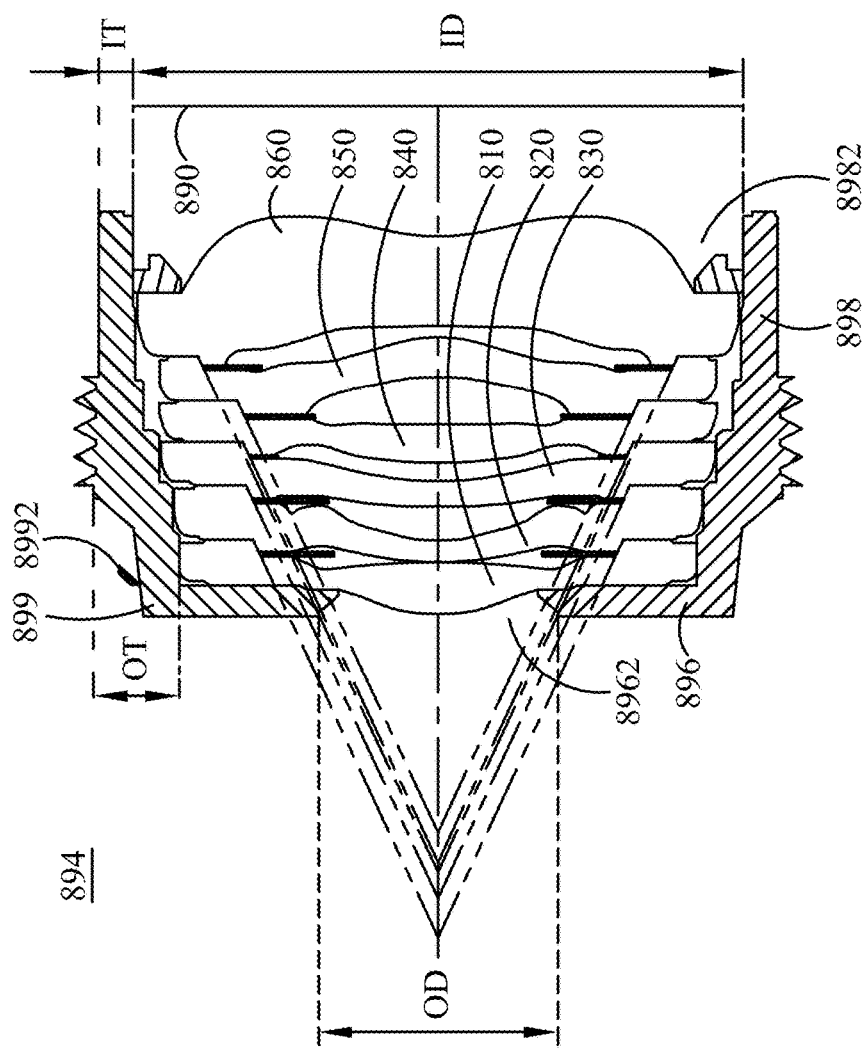
FIG. 8C is the sectional view of the lens positioning elements of the second to sixth embodiments of the present invention.

As shown in FIGS. 7A, 7B and 7C, the lens positioning element 794 of the present invention may be hollow, in order to accommodate any lens element and align the lens elements along the optical axis. The lens positioning element is disposed with an object-side end 796 and an image-side end 798. The object-side end 796 is adjacent to the object side and is disposed with a first opening 7962, whereas the image-side end 798 is adjacent to the image side and is disposed with a second opening 7982. The outer wall of the lens positioning element 794 includes two tangent planes 799; each of the tangent planes 799 has a sprue mark 7992. The inner diameter of the aforementioned first opening 7962 is denoted by OD and the inner diameter of the second opening 7982 is denoted by ID, the following conditions are satisfied: OD=5.8 mm, ID=3.863 mm, and OD/ID=1.5014. The minimum thickness of the object-side end 796 is denoted by OT, whereas the minimum thickness of the image-side end 798 is denoted by IT, the following conditions are satisfied: OT=0.1 mm, IT=0.3 mm, and OT/IT=0.33.

The contents in Tables 1 and 2 below should be incorporated into the reference of the present embodiment.

TABLE 1

Lens Parameters for the First Embodiment
f(focal length), 5.709 mm; f/HEP = 1.9; HAF(half angle of view) = 52.5 deg

| Surface No. | | Curvature Radius | Central Thickness (mm) | Material | Refractive Index | Abbe Number | Focal Length |
|---|---|---|---|---|---|---|---|
| 0 | Object | Plane | Plane | | | | |
| 1 | Lens 1 | −40.99625704 | 1.934 | Plastic | 1.515 | 56.55 | −7.828 |
| 2 | | 4.555209289 | 5.923 | | | | |
| 3 | Aperture Stop | Plane | 0.495 | | | | |
| 4 | Lens 2 | 5.333427366 | 2.486 | Plastic | 1.544 | 55.96 | 5.897 |
| 5 | | −6.781659971 | 0.502 | | | | |
| 6 | Lens 3 | −5.697794287 | 0.380 | Plastic | 1.642 | 22.46 | −25.738 |
| 7 | | −8.883957518 | 0.401 | | | | |
| 8 | Lens 4 | 13.19225664 | 1.236 | Plastic | 1.544 | 55.96 | 59.205 |
| 9 | | 21.55681832 | 0.025 | | | | |
| 10 | Lens 5 | 8.987806345 | 1.072 | Plastic | 1.515 | 56.55 | 4.668 |
| 11 | | −3.158875374 | 0.025 | | | | |
| 12 | Lens 6 | −29.46491425 | 1.031 | Plastic | 1.642 | 22.46 | −4.886 |
| 13 | | 3.593484273 | 2.412 | | | | |
| 14 | IR-bandstop Filter | Plane | 0.200 | | 1.517 | 64.13 | |
| 15 | | Plane | 1.420 | | | | |
| 16 | Image Plane | Plane | | | | | |

Reference wavelength (d-line) = 555 nm;
Shield Position: The $1^{st}$ surface with a clear aperture of 5.800 mm, the $3^{rd}$ surface with a clear aperture of 1.570 mm and the $5^{th}$ surface with a clear aperture of 1.950 mm

TABLE 2

Aspheric Coefficients in the First Embodiment
Table 2: Aspheric Coefficients

| | Surface No. | | | | | | |
|---|---|---|---|---|---|---|---|
| | 1 | 2 | 4 | 5 | 6 | 7 | 8 |
| k | 4.310876E+01 | −4.707622E+00 | 2.616025E+00 | 2.445397E+00 | 5.645686E+00 | −2.117147E+01 | −5.287220E+00 |
| $A_4$ | 7.054243E−03 | 1.714312E−02 | −8.377541E−03 | −1.789549E−02 | −3.379055E−03 | −1.370959E−02 | −2.937377E−02 |
| $A_6$ | −5.233264E−04 | −1.502232E−04 | −1.838068E−03 | −3.657520E−03 | −1.225453E−03 | 6.250200E−03 | 2.743532E−03 |
| $A_8$ | 3.077890E−05 | −1.359611E−04 | 1.233332E−03 | −1.131622E−03 | −5.979572E−03 | −5.854426E−03 | −2.457574E−03 |
| $A_{10}$ | −1.260650E−06 | 2.680747E−05 | −2.390895E−03 | 1.390351E−03 | 4.556449E−03 | 4.049451E−03 | 1.874319E−03 |
| $A_{12}$ | 3.319093E−08 | −2.017491E−06 | 1.998555E−03 | −4.152857E−04 | −1.177175E−03 | −1.314592E−03 | −6.013661E−04 |
| $A_{14}$ | −5.051600E−10 | 6.604615E−08 | −9.734019E−04 | 5.487286E−05 | 1.370522E−04 | 2.143097E−04 | 8.792480E−05 |
| $A_{16}$ | 3.380000E−12 | −1.301630E−09 | 2.478373E−04 | −2.919339E−06 | −5.974015E−06 | −1.399894E−05 | −4.770527E−06 |

| | Surface No. | | | | |
|---|---|---|---|---|---|
| | 9 | 10 | 11 | 12 | 13 |
| k | 6.200000E+01 | −2.114008E+01 | −7.699904E+00 | −6.155476E+01 | −3.120467E−01 |
| $A_4$ | −1.359965E−01 | −1.263831E−01 | −1.927804E−02 | −2.492467E−02 | −3.521844E−02 |
| $A_6$ | 6.628518E−02 | 6.965399E−02 | 2.478376E−03 | −1.835360E−03 | 5.629654E−03 |
| $A_8$ | −2.129167E−02 | −2.116027E−02 | 1.438785E−03 | 3.201343E−03 | −5.466925E−04 |
| $A_{10}$ | 4.396344E−03 | 3.819371E−03 | −7.013749E−04 | −8.990757E−04 | 2.231154E−05 |
| $A_{12}$ | −5.542899E−04 | −4.040283E−04 | 1.253214E−04 | 1.245343E−04 | 5.548990E−07 |

TABLE 2-continued

Aspheric Coefficients in the First Embodiment
Table 2: Aspheric Coefficients

| $A_{14}$ | 3.768879E−05 | 2.280473E−05 | −9.943196E−06 | −8.788363E−06 | −9.396920E−08 |
|---|---|---|---|---|---|
| $A_{16}$ | −1.052467E−06 | −5.165452E−07 | 2.898397E−07 | 2.494302E−07 | 2.728360E−09 |

Table 1 is the detailed structural data for the first embodiment in FIG. 1A, wherein the unit for the curvature radius, the central thickness, the distance, and the focal length is millimeters (mm). Surfaces 0-16 illustrate the surfaces from the object side to the image plane in the optical image capturing system. Table 2 shows the aspheric coefficients of the first embodiment, wherein k is the conic coefficient in the aspheric surface equation, and $A_1$-$A_{20}$ are respectively the first to the twentieth order aspheric coefficients. In addition, the tables in the following embodiments correspond to the schematic view and the aberration graphs of their respective embodiments, and the definitions of parameters in these tables are similar to those in the Tables 1 and 2, so the repetitive details will not be given here.

Second Embodiment

Figure 2A:
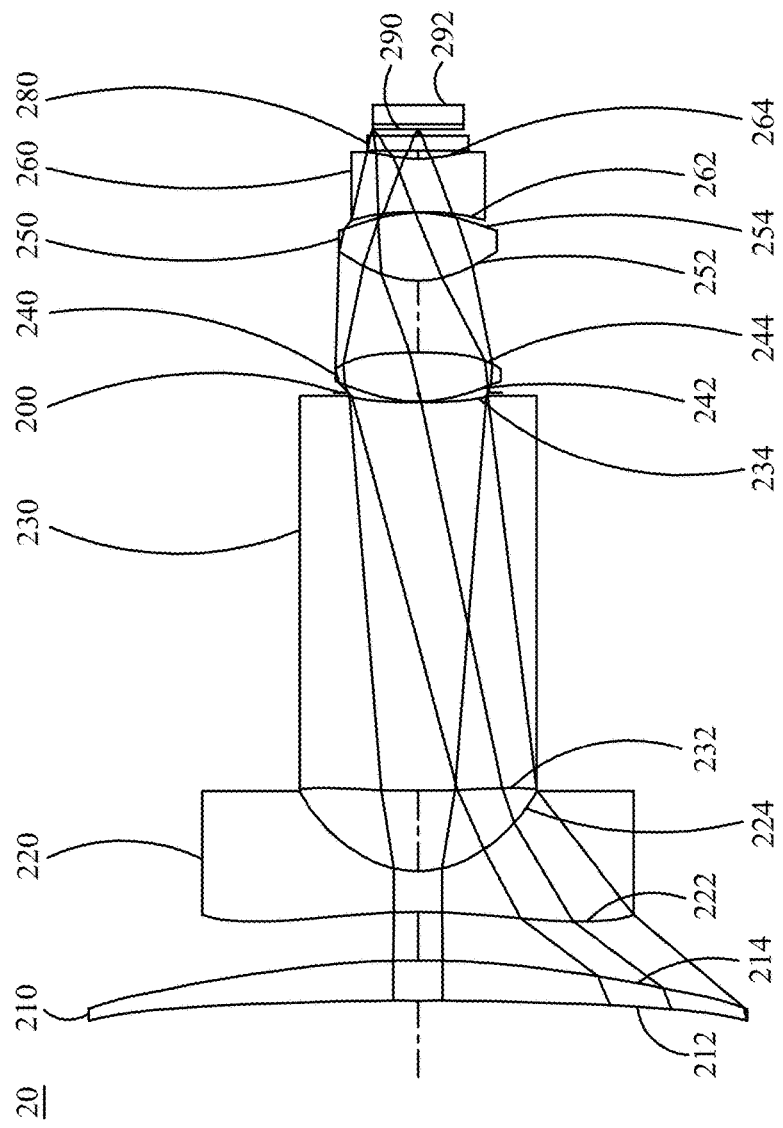
FIG. 2A is a schematic view of the optical image capturing system according to the second embodiment of the present invention.
Figure 2B:
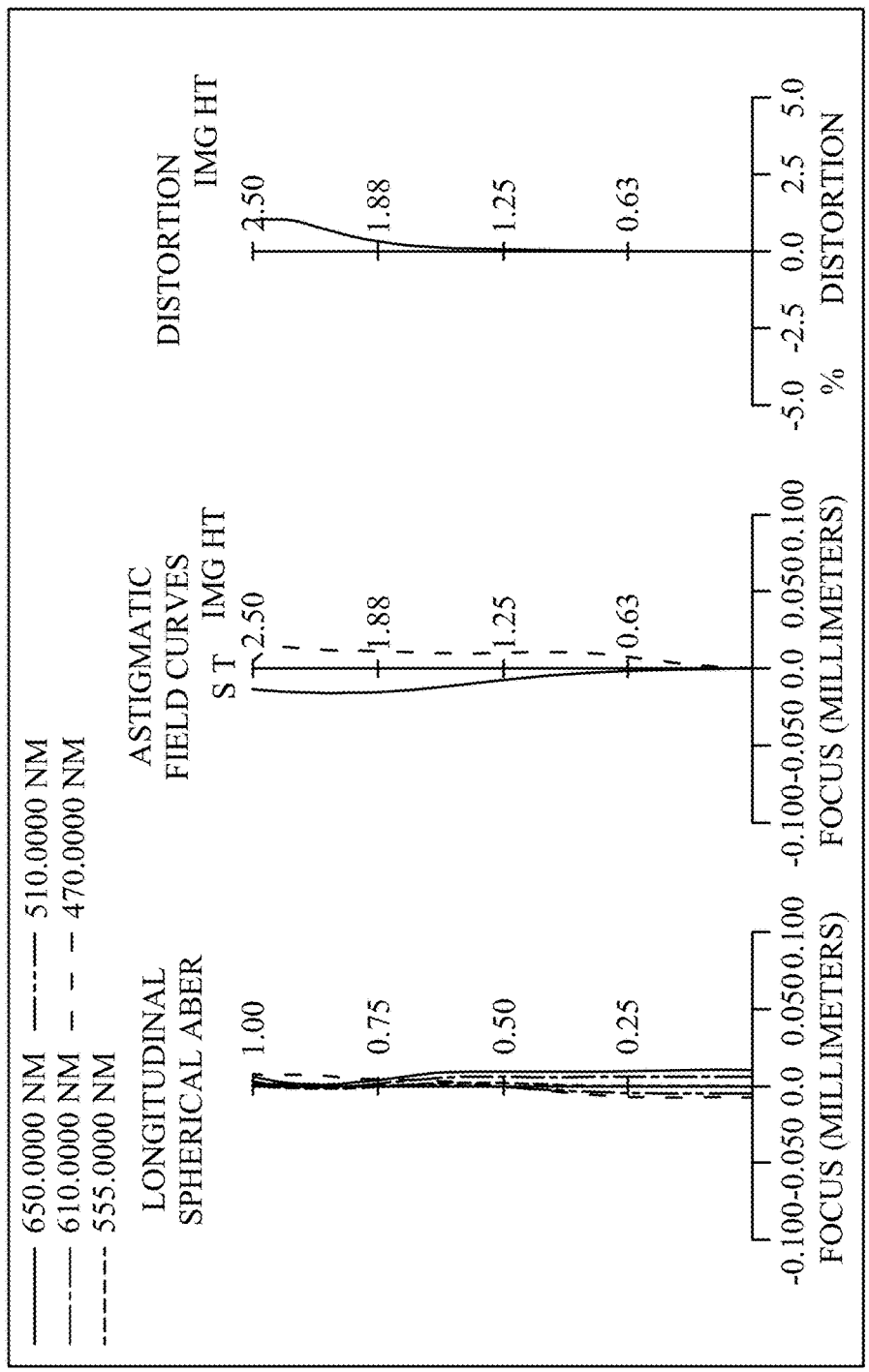
FIG. 2B shows the longitudinal spherical aberration curves, astigmatic field curves, and the optical distortion curve of the optical image capturing system in the order from left to right according to the second embodiment of the present invention.
Figure 2C:
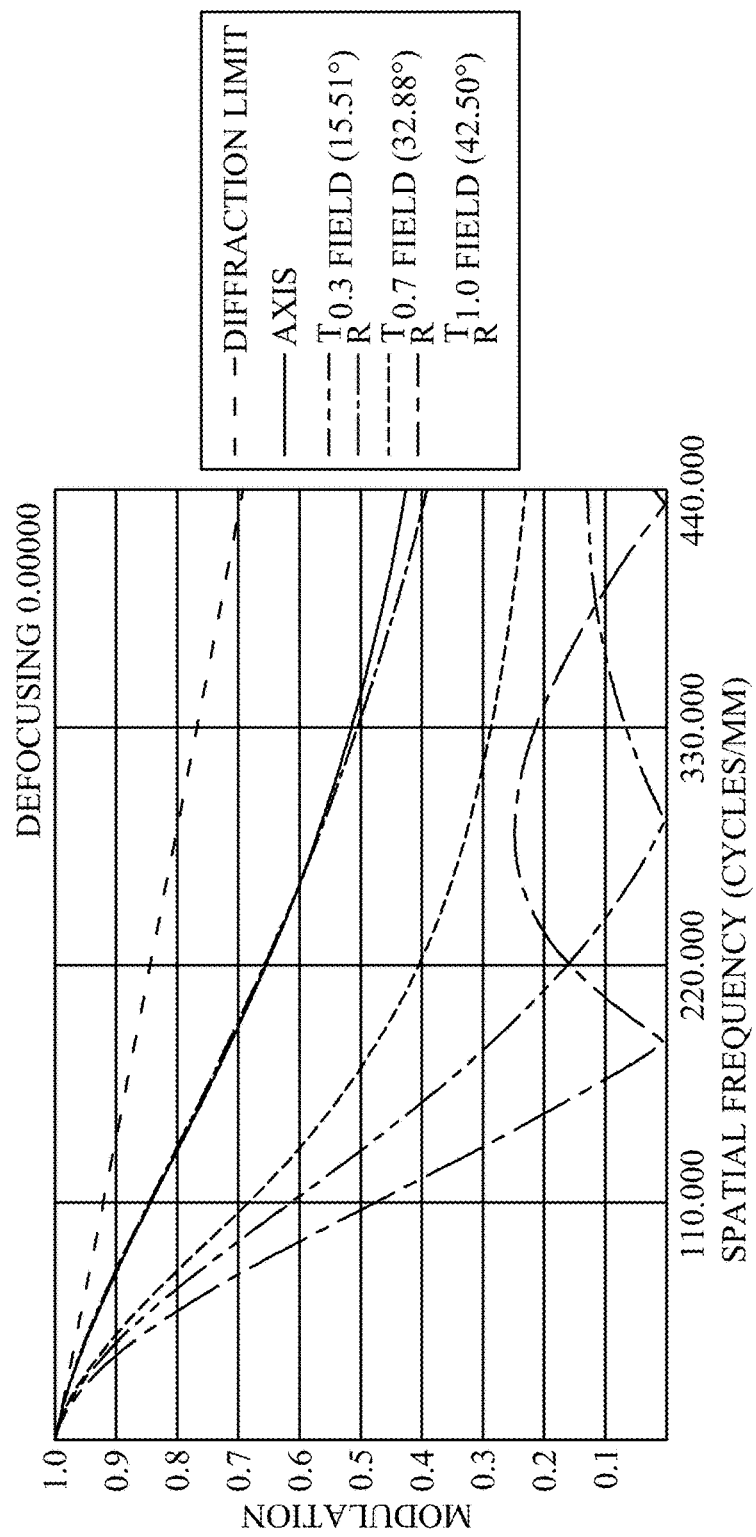
FIG. 2C is a characteristic diagram of modulation transfer of the visible light according to the second embodiment of the present application.

Please refer to FIG. 2A, FIG. 2B and FIG. 2C. FIG. 2A is a schematic view of the optical image capturing system according to the second embodiment of the present invention. FIG. 2B shows the longitudinal spherical aberration curves, astigmatic field curves, and optical distortion curve of the optical image capturing system of the second embodiment, in the order from left to right. FIG. 2C is a characteristic diagram of the modulation transfer of visible light for the optical image capturing system of the second embodiment of the present invention. As shown in FIG. 2A, in the order from an object side to an image side, the optical image capturing system includes a first lens element 210, a second lens element 220, a third lens element 230, an aperture stop 200, a fourth lens element 240, a fifth lens element 250, a sixth lens element 260, an IR-bandstop filter 280, an image plane 290, and an image sensing device 292.

The first lens element 210 has positive refractive power and is made of plastic material. The first lens element 210 has a concave object-side surface 212 and a convex image-side surface 214, and both object-side surface 212 and image-side surface 214 are aspheric.

The second lens element 220 has negative refractive power and is made of plastic material. The second lens element 220 has a concave object-side surface 222 and a concave image-side surface 224, and both object-side surface 222 and image-side surface 224 are aspheric. The object-side surface 222 has one inflection point.

The third lens element 230 has negative refractive power and is made of plastic material. The third lens element 230 has a convex object-side surface 232 and a concave image-side surface 234, and both object-side surface 232 and image-side surface 234 are aspheric. The object-side surface 232 has one inflection point.

The fourth lens element 240 has positive refractive power and is made of plastic material. The fourth lens element 240 has a convex object-side surface 242 and a convex image-side surface 244, and both object-side surface 242 and image-side surface 244 are aspheric. The object-side surface 242 thereof has one inflection point.

The fifth lens element 250 has positive refractive power and is made of plastic material. The fifth lens element 250 has a convex object-side surface 252 and a convex image-side surface 254, and both object-side surface 252 and image-side surface 254 are aspheric. Both of the object-side surface 252 and the image-side surface 254 have one inflection point.

The sixth lens element 260 has negative refractive power and is made of plastic material. The sixth lens element 260 has a concave object-side surface 262 and a concave image-side surface 264. As a result, the back focal length thereof can be reduced, such that the size of the optical image capturing system can be kept small. In addition, the image-side surface 264 of the sixth lens element 260 has one inflection point, which can reduce the incident angle of the off-axis rays. Therefore, the off-axis aberration can be mitigated.

The IR-bandstop filter 280 is made of glass material and is disposed between the sixth lens element 260 and the image plane 290. The IR-bandstop filter 280 does not affect the focal length of the optical image capturing system.

The contents in Tables 3 and 4 below should be incorporated into the reference of the present embodiment.

TABLE 3

Lens Parameters for the Second Embodiment
f(focal length) = 2.701 mm; f/HEP = 1.0; HAF(half angle of view) = 42.501 deg

| Surface No. | | Curvature Radius | Central Thickness (mm) | Material | Refractive Index | Abbe Number | Focal Length |
|---|---|---|---|---|---|---|---|
| 0 | Object | 1E+18 | 1E+18 | | | | |
| 1 | Lens 1 | −202.3770793 | 2.297 | Plastic | 1.661 | 20.40 | 97.665642 |
| 2 | | −49.49282256 | 2.767 | | | | |
| 3 | Lens 2 | −32.31026372 | 2.347 | Plastic | 1.565 | 58.00 | −7.929842 |
| 4 | | 5.357861455 | 4.598 | | | | |
| 5 | Lens 3 | 49.90646908 | 22.266 | Plastic | 1.661 | 20.40 | −498.147795 |
| 6 | | 35.6436857 | 0.536 | | | | |
| 7 | Aperture Stop | 1E+18 | −0.472 | | | | |
| 8 | Lens 4 | 7.906829547 | 2.797 | Plastic | 1.565 | 58.00 | 10.760618 |
| 9 | | −23.25960987 | 4.099 | | | | |

TABLE 3-continued

Lens Parameters for the Second Embodiment
f(focal length) = 2.701 mm; f/HEP = 1.0; HAF(half angle of view) = 42.501 deg

| Surface No. | | Curvature Radius | Central Thickness (mm) | Material | Refractive Index | Abbe Number | Focal Length |
|---|---|---|---|---|---|---|---|
| 10 | Lens 5 | 5.393567096 | 3.869 | Plastic | 1.565 | 58.00 | 6.24233 |
| 11 | | −7.615665631 | 0.050 | | | | |
| 12 | Lens 6 | −33.66483347 | 3.092 | Plastic | 1.661 | 20.40 | −9.050711 |
| 13 | | 7.623433955 | 0.450 | | | | |
| 14 | IR-bandstop Filter | 1E+18 | 0.850 | BK_7 | NBK7 | | |
| 15 | | 1E+18 | 0.368 | | | | |
| 16 | Image Plane | 1E+18 | 0.000 | | | | |

Reference wavelength = 555 nm;
Shield position: none

TABLE 4

The Aspheric Coefficients of the Second Embodiment
Table 4: Aspheric Coefficients

| Surface No. | 1 | 2 | 3 | 4 | 5 | 6 | 8 |
|---|---|---|---|---|---|---|---|
| k | −1.951016E+01 | −8.619604E+00 | −4.772274E+01 | −4.379204E−01 | −3.914847E+01 | −4.366101E+01 | −1.504581E+00 |
| $A_4$ | 1.940711E−06 | 1.763995E−06 | 2.882186E−05 | −3.661126E−04 | −1.305356E−04 | 5.406608E−04 | −5.183979E−05 |
| $A_6$ | −7.301925E−09 | 7.522714E−09 | 5.802768E−08 | −6.765057E−06 | −1.538468E−09 | 1.694893E−05 | −4.194824E−06 |
| $A_8$ | −8.781851E−12 | −1.676527E−11 | 6.924292E−10 | 1.804782E−07 | 1.462736E−08 | −8.413505E−07 | −3.312006E−07 |
| $A_{10}$ | −5.088882E−14 | −6.502336E−14 | −3.088678E−13 | −3.778262E−09 | −8.355873E−10 | 6.575658E−08 | −7.163798E−10 |
| $A_{12}$ | 0.000000E+00 | 0.000000E+00 | 0.000000E+00 | 0.000000E+00 | 0.000000E+00 | 0.000000E+00 | 0.000000E+00 |

| Surface No. | 9 | 10 | 11 | 12 | 13 |
|---|---|---|---|---|---|
| k | 1.883632E+01 | −4.824914E−01 | −1.969608E+00 | 2.253498E+01 | −1.272832E+00 |
| $A_4$ | −7.316380E−04 | −5.149543E−04 | −1.590071E−05 | −2.671636E−03 | −8.415967E−04 |
| $A_6$ | 6.626297E−06 | 7.809073E−06 | 6.386542E−05 | 6.062965E−05 | −5.015786E−04 |
| $A_8$ | −4.356537E−07 | −8.768441E−07 | −3.685586E−06 | 5.838420E−06 | 8.153122E−05 |
| $A_{10}$ | −2.110816E−09 | −1.038289E−08 | 8.053618E−08 | −2.572257E−07 | −5.374200E−06 |
| $A_{12}$ | 0.000000E+00 | 0.000000E+00 | 0.000000E+00 | 0.000000E+00 | 0.000000E+00 |

In the second embodiment, the presentation of the aspheric surface equation is similar to that in the first embodiment. Besides, the definitions of parameters in following tables are similar to those in the first embodiment, so the repetitive details will not be given here.

The following values for the parameters of the optical image capturing system can be obtained from the data in Table 3 and Table 4.

Second Embodiment (Primary reference wavelength = 555 nm)

| ETP1 | ETP2 | ETP3 | ETP4 | ETP5 | ETP6 |
|---|---|---|---|---|---|
| 2.284 | 2.545 | 22.275 | 2.640 | 3.581 | 3.243 |

| ETP1/TP1 | ETP2/TP2 | ETP3/TP3 | ETP4/TP4 | ETP5/TP5 | ETP6/TP6 |
|---|---|---|---|---|---|
| 0.994 | 1.084 | 1.000 | 0.944 | 0.926 | 1.049 |

| ETL | EBL | EIN | EIR | PIR | EIN/ETL |
|---|---|---|---|---|---|
| 49.918 | 1.553 | 48.365 | 0.336 | 0.450 | 0.969 |

| SETP/EIN | EIR/PIR | SETP | STP | SETP/STP | BL |
|---|---|---|---|---|---|
| 0.756 | 0.746 | 36.558 | 36.669 | 0.997 | 1.668 |

| ED12 | ED23 | ED34 | ED45 | ED56 | EBL/BL |
|---|---|---|---|---|---|
| 2.758 | 4.445 | 0.151 | 4.310 | 0.133 | 0.9311 |

Second Embodiment (Primary reference wavelength = 555 nm)

| SED | SIN | SED/SIN | ED12/ED23 | ED23/ED34 | ED34/ED45 |
|---|---|---|---|---|---|
| 11.797 | 11.578 | 1.09 | 0.620 | 29.347 | 0.035 |

| ED12/IN12 | ED23/IN23 | ED34/IN34 | ED45/IN45 | ED56/IN56 | ED45/ED56 |
|---|---|---|---|---|---|
| 0.997 | 0.967 | 2.373 | 1.052 | 2.655 | 32.468 |

| |f/f1| | |f/f2| | |f/f3| | |f/f4| | |f/f5| | |f/f6| |
|---|---|---|---|---|---|
| 0.02766 | 0.34065 | 0.00542 | 0.25103 | 0.43273 | 0.29846 |

| ΣPPR | ΣNPR | ΣPPR/ΣNPR| | IN12/f | IN56/f | TP4/(IN34 + TP4 + IN45) |
|---|---|---|---|---|---|
| 0.71685 | 0.63911 | 1.12164 | 1.02428 | 0.01851 | 0.40188 |

| |f1/f2| | |f2/f3| | (TP1 + IN12)/TP2 | | (TP6 + IN56)/TP5 | |
|---|---|---|---|---|---|
| 12.31621 | 0.01592 | 2.15806 | | 0.81229 | |

| HOS | InTL | HOS/HOI | InS/HOS | ODT % | TDT % |
|---|---|---|---|---|---|
| 49.91370 | 48.24610 | 19.96548 | 0.30257 | 1.06526 | 0.94771 |

-continued

Second Embodiment (Primary reference wavelength = 555 nm)

| HVT51 | HVT52 | HVT61 | HVT62 | HVT62/HOI | HVT62/HOS |
|---|---|---|---|---|---|
| 0 | 0 | 0.00000 | 0.00000 | 0.00000 | 0.00000 |

| HVT21 | HVT22 | HVT31 | HVT32 | HVT41 | HVT42 |
|---|---|---|---|---|---|
| 8.993 | 0.000 | 5.253 | 0.000 | 0.000 | 0.000 |

| TP2/TP3 | TP3/TP4 | InRS61 | InRS62 | |InRS61|/TP6 | |InRS62|/TP6 |
|---|---|---|---|---|---|
| 0.10539 | 7.96016 | −0.47746 | 0.36603 | 0.15439 | 0.11836 |

| MTFE0 | MTFE3 | MTFE7 | MTFQ0 | MTFQ3 | MTFQ7 |
|---|---|---|---|---|---|
| 0.94 | 0.87 | 0.89 | 0.84 | 0.62 | 0.68 |

| OD | ID | OD/ID | OT | IT | OT/IT |
|---|---|---|---|---|---|
| 18.4 mm | 3.324 mm | 5.5355 | 0.9 mm | 0.1 mm | 9 |

The values as follows can be obtained from the data in Tables 3 and 4 above.

Values Related to Inflection Points of Second Embodiment
(Primary Reference Wavelength = 555 nm)

| HIF211 | 4.9639 | HIF211/HOI | 1.9856 | SGI211 | −0.2926 | |SGI211|/(|SGI211| + TP2) | 0.1109 |
|---|---|---|---|---|---|---|---|
| HIF311 | 3.2089 | HIF311/HOI | 1.2836 | SGI311 | 0.0856 | |SGI311|/(|SGI311| + TP3) | 0.0038 |
| HIF411 | 3.8936 | HIF411/HOI | 1.5575 | SGI411 | 0.8864 | |SGI411|/(|SGI411| + TP4) | 0.2406 |
| HIF511 | 4.0159 | HIF511/HOI | 1.6064 | SGI511 | 1.4493 | |SGI511|/(|SGI511| + TP5) | 0.2725 |
| HIF521 | 3.8370 | HIF521/HOI | 1.5348 | SGI521 | −0.8306 | |SGI521|/(|SGI521| + TP5) | 0.1767 |
| HIF621 | 2.0925 | HIF621/HOI | 0.8370 | SGI621 | 0.2488 | |SGI621|/(|SGI621| + TP6) | 0.0745 |

Third Embodiment

Figure 3A:
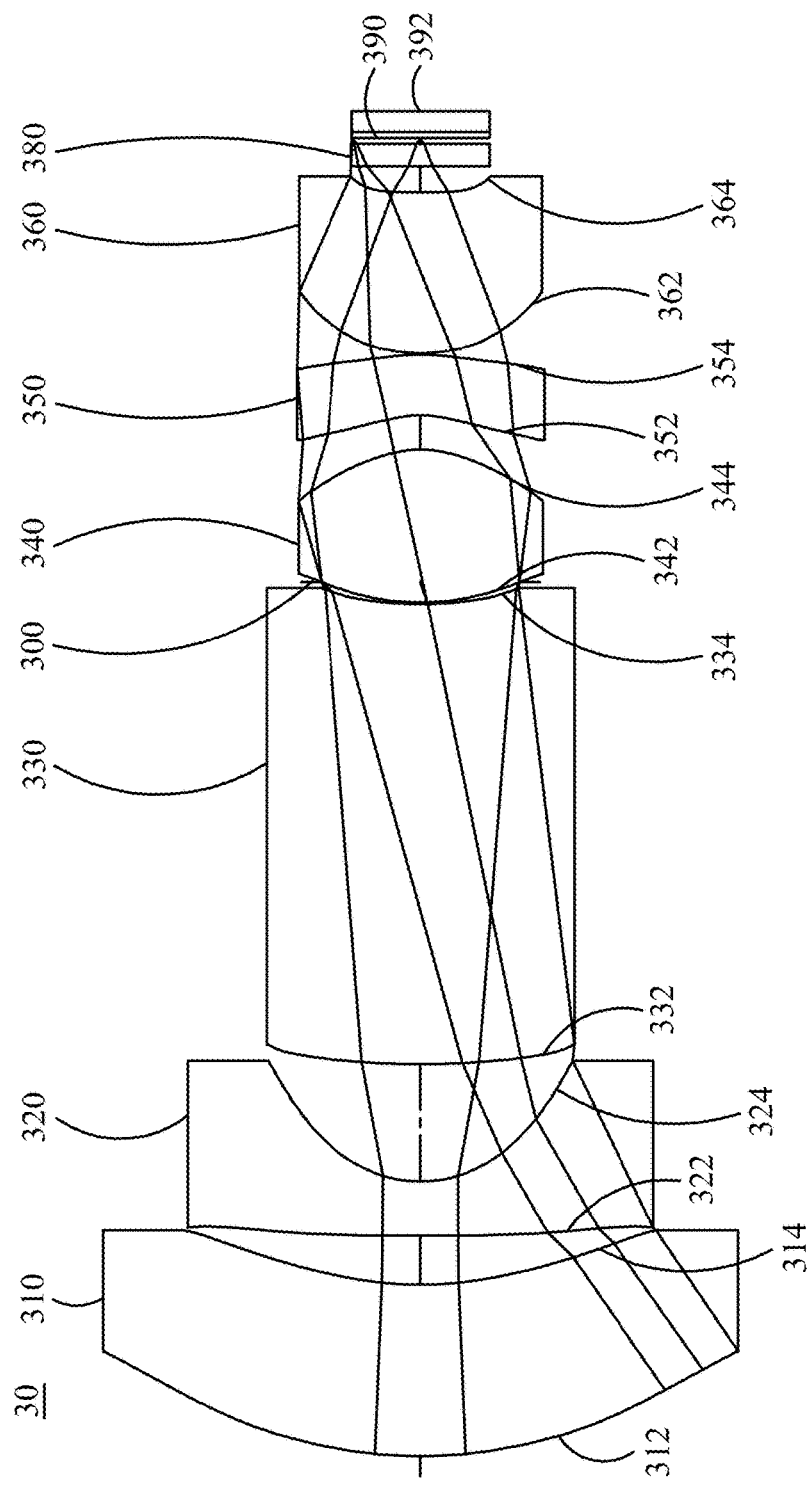
FIG. 3A is a schematic view of the optical image capturing system according to the third embodiment of the present invention.
Figure 3B:
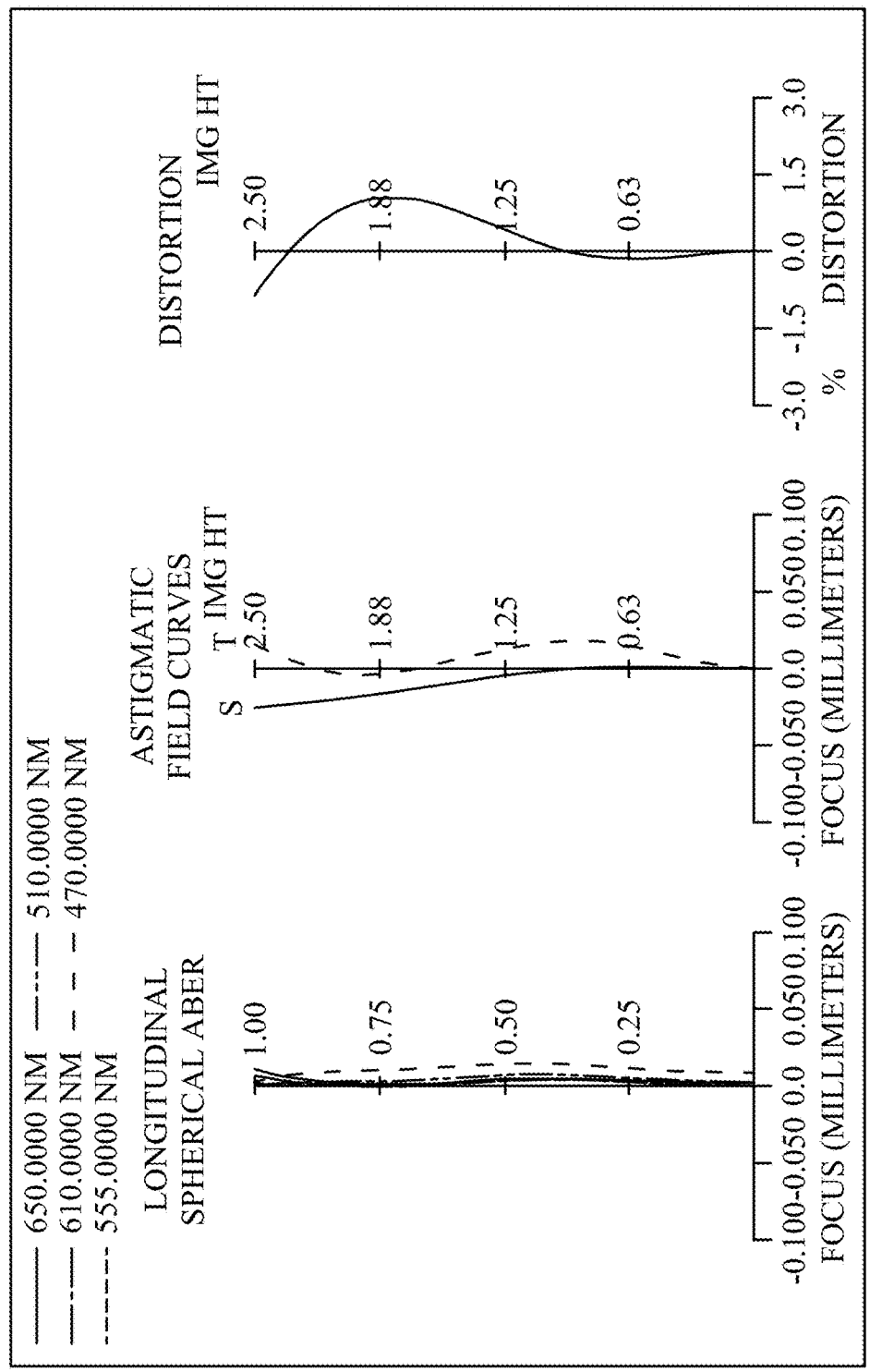
FIG. 3B shows the longitudinal spherical aberration curves, astigmatic field curves, and the optical distortion curve of the optical image capturing system in the order from left to right according to the third embodiment of the present invention.
Figure 3C:
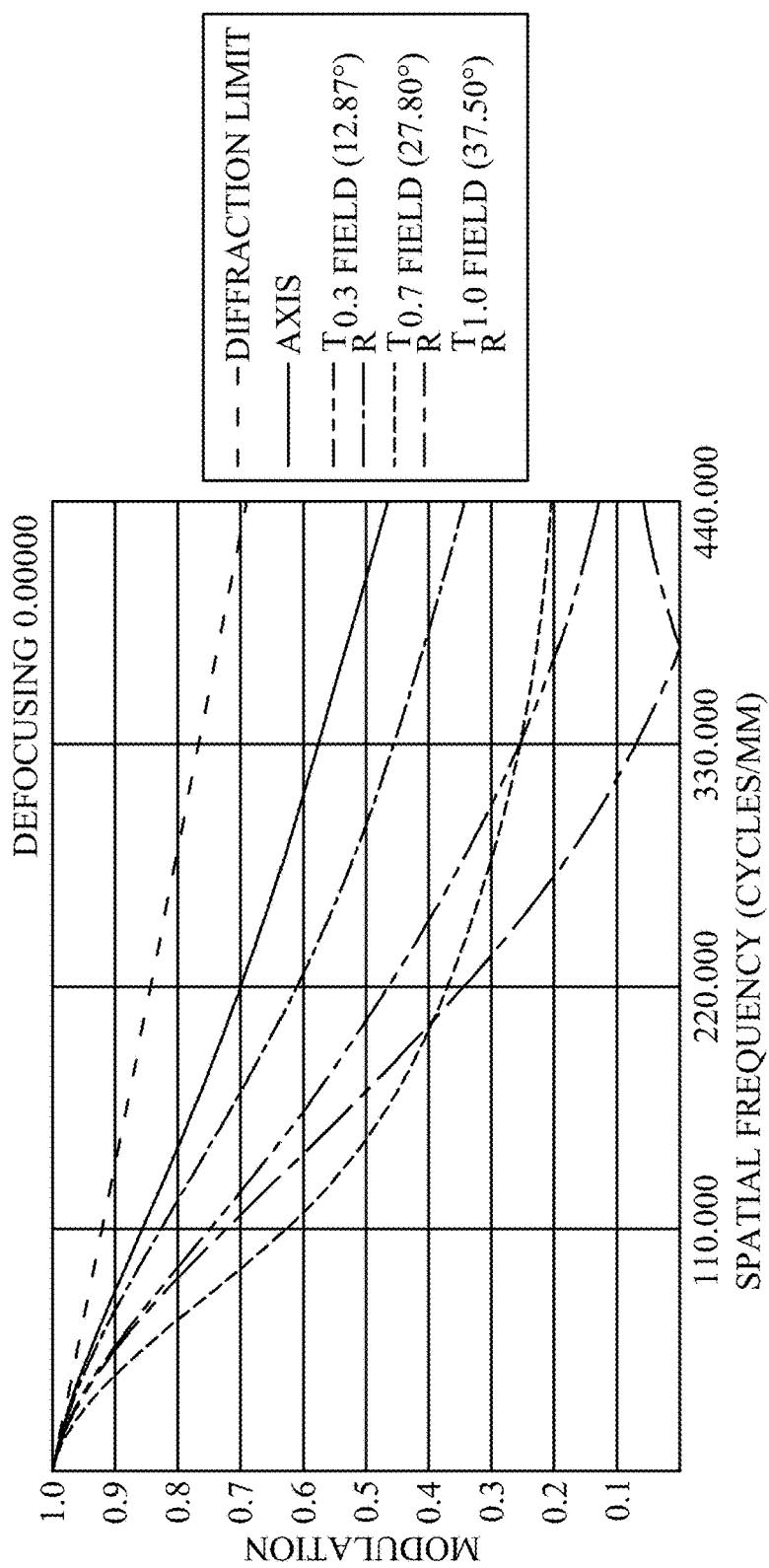
FIG. 3C is a characteristic diagram of modulation transfer of the visible light according to the third embodiment of the present application.

Please refer to FIG. 3A, FIG. 3B and FIG. 3C. FIG. 3A is a schematic view of the optical image capturing system according to the third embodiment of the present invention. FIG. 3B shows the longitudinal spherical aberration curves, astigmatic field curves, and optical distortion curve of the optical image capturing system of the third embodiment, in the order from left to right. FIG. 3C is a characteristic diagram of the modulation transfer of visible light for the optical image capturing system of the third embodiment of the present invention. As shown in FIG. 3A, in the order from an object side to an image side, the optical image capturing system includes a first lens element 310, a second lens element 320, a third lens element 330, an aperture stop 300, a fourth lens element 340, a fifth lens element 350, a sixth lens element 360, an IR-bandstop filter 380, an image plane 390, and an image sensing device 392.

The first lens element 310 has positive refractive power and is made of plastic material. The first lens element 310 has a convex object-side surface 312 and a concave image-side surface 314, and both object-side surface 312 and image-side surface 314 are aspheric. The object-side surface 312 and image-side surface 314 both have one inflection point.

The second lens element 320 has negative refractive power and is made of plastic material. The second lens element 320 has a convex object-side surface 322 and a concave image-side surface 324, and both object-side surface 322 and image-side surface 324 are aspheric. The object-side surface 322 has one inflection point.

The third lens element 330 has negative refractive power and is made of plastic material. The third lens element 330 has a convex object-side surface 332 and a concave image-side surface 334, and both object-side surface 332 and image-side surface 334 are aspheric.

The fourth lens element 340 has positive refractive power and is made of plastic material. The fourth lens element 340 has a convex object-side surface 342 and a convex image-side surface 344, and both object-side surface 342 and image-side surface 344 are aspheric.

The fifth lens element 350 has negative refractive power and is made of plastic material. The fifth lens element 350 has a concave object-side surface 352 and a convex image-side surface 354, and both object-side surface 352 and image-side surface 354 are aspheric. The object-side surface 352 and the image-side surface 354 both have two inflection points.

The sixth lens element 360 has positive refractive power and is made of plastic material. The sixth lens element 360 has a convex object-side surface 362 and a concave image-side surface 364. As a result, the back focal length thereof can be reduced, such that the size of the optical image capturing system can be kept small. In addition, the incident angle of the off-axis rays can be reduced. Therefore, the off-axis aberration can be mitigated.

The IR-bandstop filter 380 is made of glass material and is disposed between the sixth lens element 360 and the image plane 390. The IR-bandstop filter 380 does not affect the focal length of the optical image capturing system.

The contents in Tables 5 and 6 below should be incorporated into the reference of the present embodiment.

TABLE 5

Lens Parameters for the Third Embodiment
f(focal length) = 3.285 mm; f/HEP = 1.0; HAF(half angle of view) = 37.501 deg

| Surface No. | | Curvature Radius | Central Thickness (mm) | Material | Refractive Index | Abbe Number | Focal Length |
|---|---|---|---|---|---|---|---|
| 0 | Object | 1E+18 | 1E+18 | | | | |
| 1 | Lens 1 | 16.2248133 | 6.493 | Plastic | 1.661 | 20.40 | 4420.53 |
| 2 | | 13.70277531 | 1.851 | | | | |
| 3 | Lens 2 | 122.1376327 | 2.086 | Plastic | 1.565 | 58.00 | −8.19 |

TABLE 5-continued

Lens Parameters for the Third Embodiment
f(focal length) = 3.285 mm; f/HEP = 1.0; HAF(half angle of view) = 37.501 deg

| Surface No. | | Curvature Radius | Central Thickness (mm) | Material | Refractive Index | Abbe Number | Focal Length |
|---|---|---|---|---|---|---|---|
| 4 | | 4.445520549 | 4.426 | | | | |
| 5 | Lens 3 | 29.65036634 | 17.472 | Plastic | 1.661 | 20.40 | −86.32 |
| 6 | | 14.95620523 | 0.817 | | | | |
| 7 | Aperture Stop | 1E+18 | −0.767 | | | | |
| 8 | Lens 4 | 8.851165069 | 5.792 | Plastic | 1.565 | 58.00 | 5.59 |
| 9 | | −3.766109143 | 1.295 | | | | |
| 10 | Lens 5 | −3.919508955 | 2.291 | Plastic | 1.607 | 26.60 | −16.23 |
| 11 | | −7.918367707 | 0.074 | | | | |
| 12 | Lens 6 | 6.167029625 | 6.095 | Plastic | 1.565 | 58.00 | 12.59 |
| 13 | | 29.17989341 | 1.000 | | | | |
| 14 | IR-bandstop Filter | 1E+18 | 0.850 | BK_7 | | | |
| 15 | | 1E+18 | 0.224 | | | | |
| 16 | Image Plane | 1E+18 | 0.001 | | | | |

Reference wavelength = 555 nm;
Shield position: none

TABLE 6

The Aspheric Coefficients of the Third Embodiment
Table 6: Aspheric Coefficients

| Surface No. | 1 | 2 | 3 | 4 | 5 | 6 | 8 |
|---|---|---|---|---|---|---|---|
| k | −4.644874E−01 | −7.656826E−01 | 1.994609E+01 | −5.544916E−01 | 5.221559E+00 | 1.062948E+01 | 1.058456E+00 |
| $A_4$ | −1.186730E−05 | −6.934116E−05 | 7.206447E−05 | 1.737770E−05 | −3.588857E−05 | 6.317027E−04 | 1.359967E−04 |
| $A_6$ | 1.437344E−07 | −3.000997E−06 | −1.080543E−07 | 2.748411E−05 | 7.427686E−06 | −2.181388E−05 | −3.018249E−05 |
| $A_8$ | −1.978024E−09 | 6.283186E−08 | −8.330034E−09 | −1.237192E−07 | −1.597349E−07 | −4.657776E−07 | −2.936910E−07 |
| $A_{10}$ | 1.104820E−14 | −4.506016E−10 | −5.065421E−11 | −2.318518E−08 | 4.298305E−09 | 7.380038E−09 | −1.570598E−09 |
| $A_{12}$ | 0.000000E+00 | 0.000000E+00 | 0.000000E+00 | 0.000000E+00 | 0.000000E+00 | 0.000000E+00 | 0.000000E+00 |

| Surface No. | 9 | 10 | 11 | 12 | 13 |
|---|---|---|---|---|---|
| K | −3.700856E+00 | −6.953806E+00 | −2.047117E+01 | −2.379250E−01 | −5.000000E+01 |
| $A_4$ | −5.002806E−04 | 2.191706E−03 | 8.916651E−04 | 1.757080E−03 | 4.822263E−03 |
| $A_6$ | 5.087876E−06 | −7.062901E−05 | 4.953918E−05 | −1.619706E−05 | 1.203976E−03 |
| $A_8$ | −8.041839E−07 | 4.953869E−07 | −6.679286E−06 | −4.947824E−07 | −1.002323E−04 |
| $A_{10}$ | −7.866626E−09 | −2.891528E−08 | 1.406346E−07 | 1.536953E−08 | 1.495913E−05 |
| $A_{12}$ | 0.000000E+00 | 0.000000E+00 | 0.000000E+00 | 0.000000E+00 | 0.000000E+00 |

In the third embodiment, the presentation of the aspheric surface equation is similar to that in the first embodiment. Besides, the definitions of parameters in following tables are similar to those in the first embodiment, so the repetitive details will not be given here.

The following values for the parameters of the optical image capturing system can be obtained from the data in Table 5 and Table 6.

Third Embodiment (Primary Reference Wavelength = 555 nm)

| ETP1 | ETP2 | ETP3 | ETP4 | ETP5 | ETP6 |
|---|---|---|---|---|---|
| 6.508 | 2.383 | 17.524 | 5.311 | 2.422 | 5.961 |

| ETP1/TP1 | ETP2/TP2 | ETP3/TP3 | ETP4/TP4 | ETP5/TP5 | ETP6/TP6 |
|---|---|---|---|---|---|
| 1.002 | 1.143 | 1.003 | 0.917 | 1.057 | 0.978 |

| ETL | EBL | EIN | EIR | PIR | EIN/ETL |
|---|---|---|---|---|---|
| 49.917 | 1.975 | 47.942 | 0.900 | 1.000 | 0.960 |

Third Embodiment (Primary Reference Wavelength = 555 nm)

| SETP/EIN | EIR/PIR | SETP | STP | SETP/STP | BL |
|---|---|---|---|---|---|
| 0.837 | 0.900 | 40.109 | 40.228 | 0.997 | 2.075 |

| ED12 | ED23 | ED34 | ED45 | ED56 | EBL/BL |
|---|---|---|---|---|---|
| 1.765 | 4.162 | 0.108 | 1.352 | 0.446 | 0.9518 |

| SED | SIN | SED/SIN | ED12/ED23 | ED23/ED34 | ED34/ED45 |
|---|---|---|---|---|---|
| 7.833 | 7.697 | 1.018 | 0.424 | 38.592 | 0.080 |

| ED12/IN12 | ED23/IN23 | ED34/IN34 | ED45/IN45 | ED56/IN56 | ED45/ED56 |
|---|---|---|---|---|---|
| 0.953 | 0.940 | 2.157 | 1.043 | 6.003 | 3.030 |

| |f/f1| | |f/f2| | |f/f3| | |f/f4| | |f/f5| | |f/f6| |
|---|---|---|---|---|---|
| 0.00074 | 0.40105 | 0.03806 | 0.58779 | 0.20249 | 0.26095 |

-continued

Third Embodiment (Primary Reference Wavelength = 555 nm)

| ΣPPR | ΣNPR | ΣPPR/<br>ΣNPR\| | IN12/f | IN56/f | TP4/<br>(IN34 + TP4 + IN45) |
|---|---|---|---|---|---|
| 0.82909 | 0.66200 | 1.25240 | 0.56353 | 0.02262 | 0.81149 |

| \|f1/f2\| | \|f2/f3\| | (TP1 + IN12)/TP2 | (TP6 + IN56)/TP5 |
|---|---|---|---|
| 539.59835 | 0.09491 | 3.99994 | 2.69330 |

| HOS | InTL | HOS/HOI | InS/<br>HOS | ODT % | TDT % |
|---|---|---|---|---|---|
| 50.00000 | 47.92490 | 20.00000 | 0.33711 | 1.04280 | 1.90057 |

| HVT51 | HVT52 | HVT61 | HVT62 | HVT62/HOI | HVT62/HOS |
|---|---|---|---|---|---|
| 0 | 0 | 0.00000 | 0.00000 | 0.00000 | 0.00000 |

| HVT21 | HVT22 | HVT31 | HVT32 | HVT41 | HVT42 |
|---|---|---|---|---|---|
| 7.909 | 0.000 | 0.000 | 0.000 | 0.000 | 0.000 |

| TP2/<br>TP3 | TP3/TP4 | InRS61 | InRS62 | \|InRS61\|/TP6 | \|InRS62\|/TP6 |
|---|---|---|---|---|---|
| 0.11940 | 3.01661 | 2.31724 | 0.62602 | 0.38021 | 0.10272 |

| MTFE0 | MTFE3 | MTFE7 | MTFQ0 | MTFQ3 | MTFQ7 |
|---|---|---|---|---|---|
| 0.94 | 0.9 | 0.85 | 0.86 | 0.75 | 0.63 |

| OD | ID | OD/ID | OT | IT | OT/IT |
|---|---|---|---|---|---|
| 11.7 mm | 3.048 mm | 3.8386 | 0.8 mm | 0.1 mm | 8 |

The following values for the parameters of the optical image capturing system can be obtained from the data in Table 5 and Table 6.

Values Related to Inflection Points of Third Embodiment
(Primary Reference Wavelength = 555 nm)

| HIF111 | 10.1044 | HIF111/HOI | 4.0418 | SGI111 | 3.1438 | \|SGI111\|/(\|SGI111\| + TP1) | 0.3262 |
|---|---|---|---|---|---|---|---|
| HIF121 | 7.0720 | HIF121/HOI | 2.8288 | SGI121 | 1.5576 | \|SGI121\|/(\|SGI121\| + TP1) | 0.1935 |
| HIF211 | 6.2286 | HIF211/HOI | 2.4914 | SGI211 | 0.2399 | \|SGI211\|/(\|SGI211\| + TP2) | 0.1031 |
| HIF511 | 1.9045 | HIF511/HOI | 0.7618 | SGI511 | −0.3372 | \|SGI511\|/(\|SGI511\| + TP5) | 0.1283 |
| HIF512 | 3.3848 | HIF512/HOI | 1.3539 | SGI512 | −0.6928 | \|SGI512\|/(\|SGI512\| + TP5) | 0.2322 |
| HIF521 | 1.8761 | HIF521/HOI | 0.7504 | SGI521 | −0.1694 | \|SGI521\|/(\|SGI521\| + TP5) | 0.0689 |
| HIF522 | 3.1016 | HIF522/HOI | 1.2406 | SGI522 | −0.3244 | \|SGI522\|/(\|SGI522\| + TP5) | 0.1241 |

Fourth Embodiment

Figure 4A:
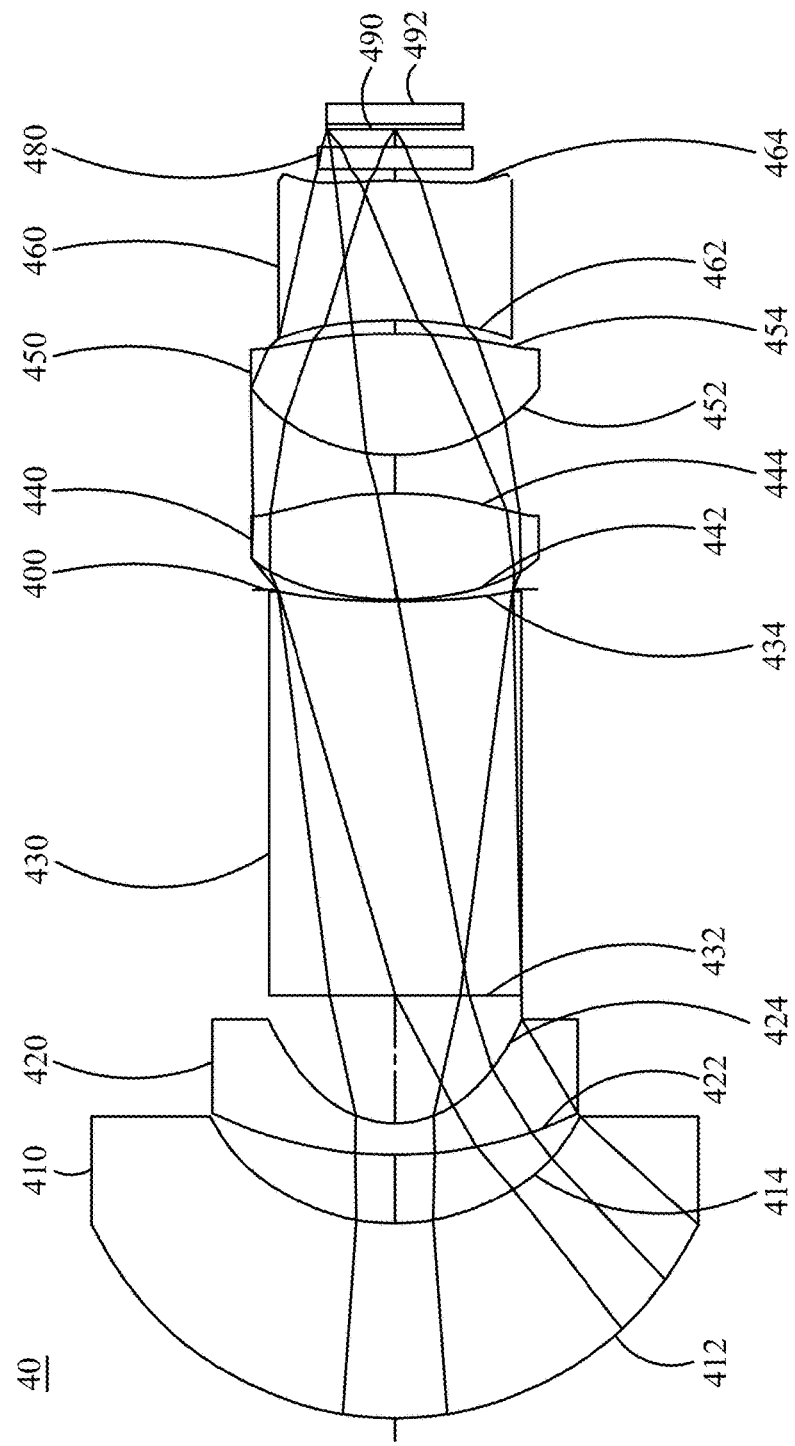
FIG. 4A is a schematic view of the optical image capturing system according to the fourth embodiment of the present invention.
Figure 4B:
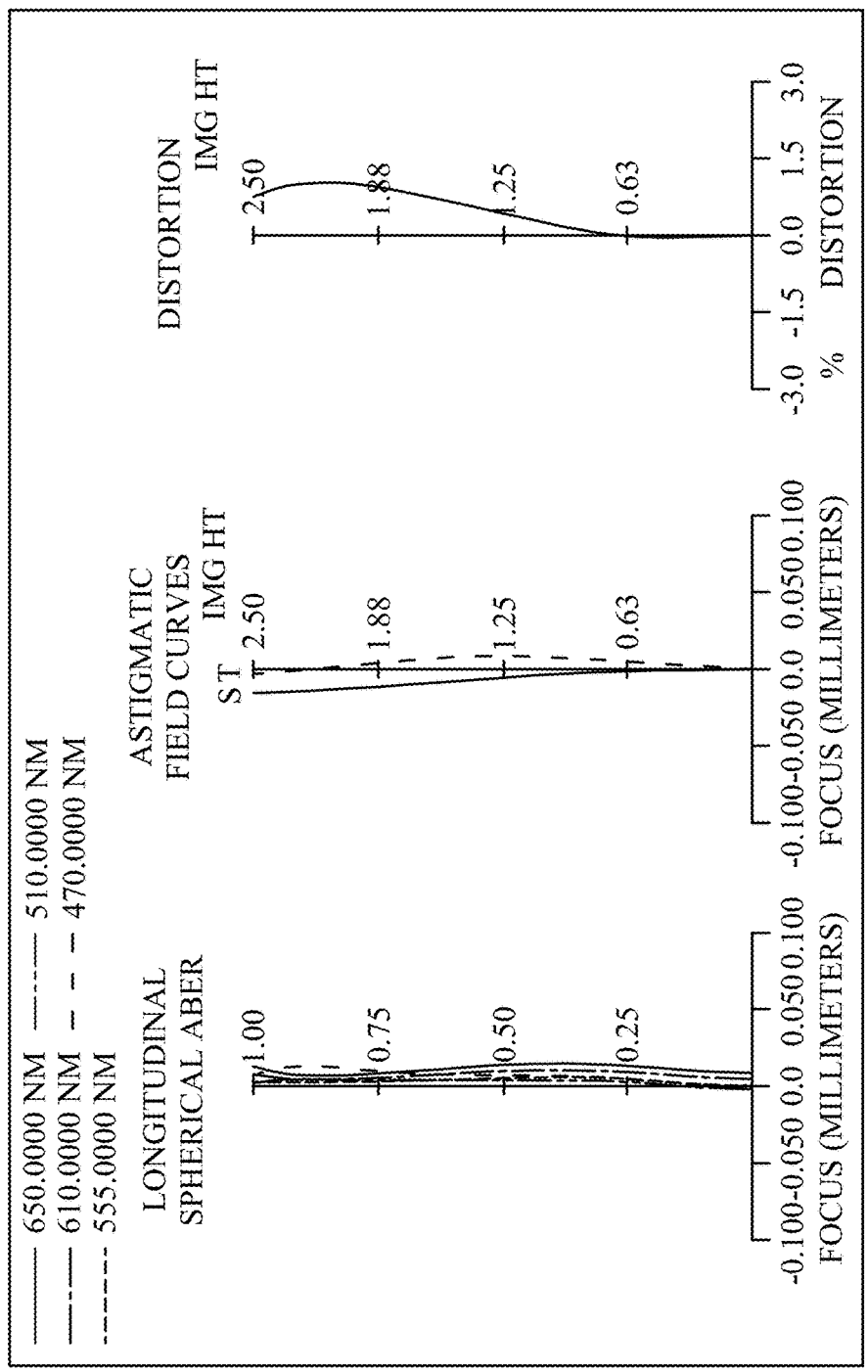
FIG. 4B shows the longitudinal spherical aberration curves, astigmatic field curves, and the optical distortion curve of the optical image capturing system in the order from left to right according to the fourth embodiment of the present invention.
Figure 4C:
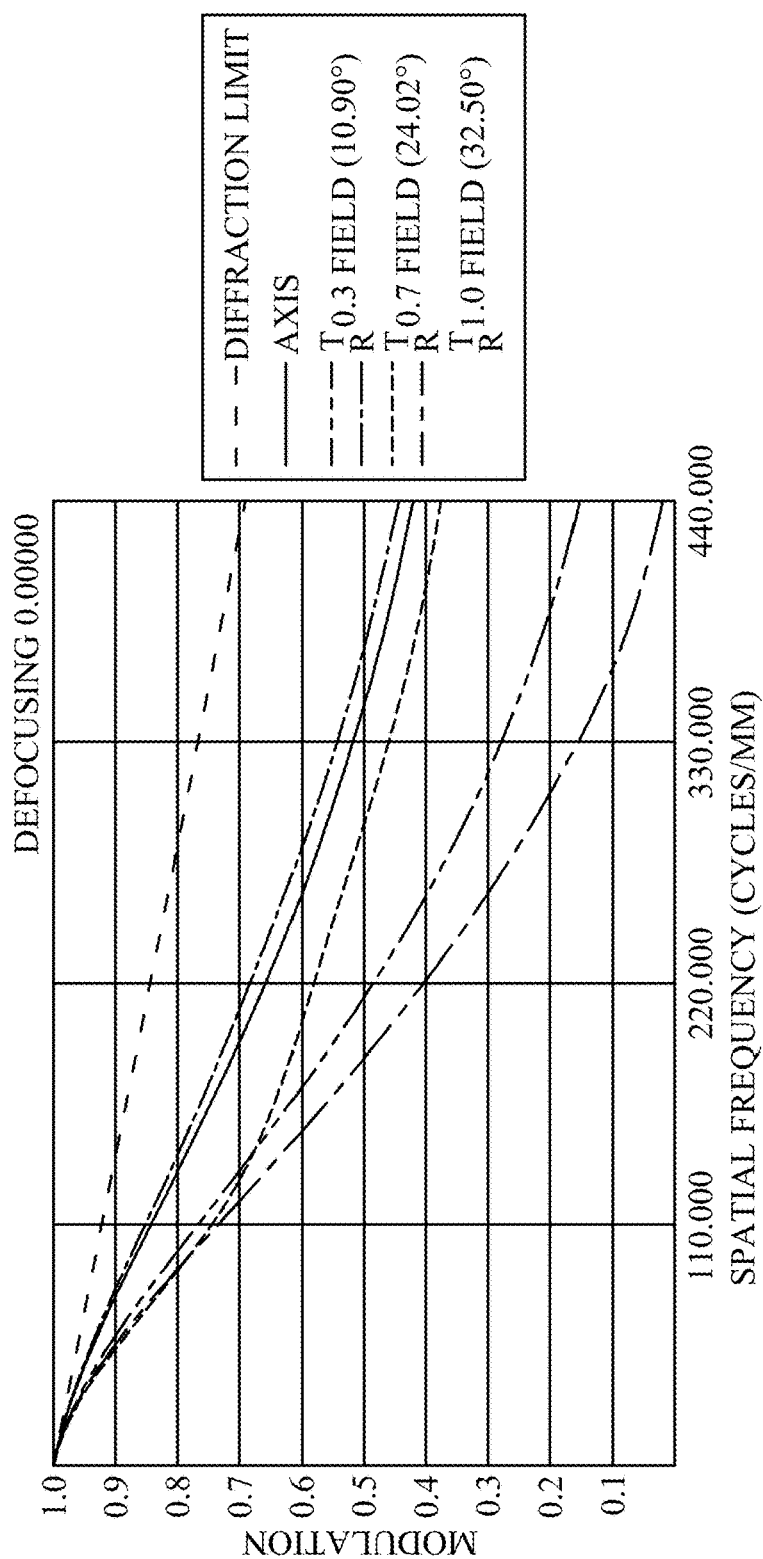
FIG. 4C is a characteristic diagram of modulation transfer of the visible light according to the fourth embodiment of the present application.

Please refer to FIG. 4A, FIG. 4B and FIG. 4C. FIG. 4A is a schematic view of the optical image capturing system according to the fourth embodiment of the present invention. FIG. 4B shows the longitudinal spherical aberration curves, astigmatic field curves, and optical distortion curve of the optical image capturing system of the fourth embodiment, in the order from left to right. FIG. 4C is a characteristic diagram of the modulation transfer of visible light for the optical image capturing system of the fourth embodiment of the present invention. As shown in FIG. 4A, in the order from an object side to an image side, the optical image capturing system includes a first lens element 410, a second lens element 420, a third lens element 430, an aperture stop 400, a fourth lens element 440, a fifth lens element 450, a sixth lens element 460, an IR-bandstop filter 480, an image plane 490, and an image sensing device 492.

The first lens element 410 has negative refractive power and is made of plastic material. The first lens element 410 has a convex object-side surface 412 and a concave image-side surface 414, and both object-side surface 412 and image-side surface 414 are aspheric.

The second lens element 420 has negative refractive power and is made of plastic material. The second lens element 420 has a convex object-side surface 422 and a concave image-side surface 424, and both object-side surface 422 and image-side surface 424 are aspheric. The object-side surface 422 has one inflection point.

The third lens element 430 has negative refractive power and is made of plastic material. The third lens element 430 has a convex object-side surface 432 and a concave image-side surface 434, and both object-side surface 432 and image-side surface 434 are aspheric. The object-side surface 432 has one inflection point.

The fourth lens element 440 has positive refractive power and is made of plastic material. The fourth lens element 440 has a convex object-side surface 442 and a convex image-side surface 444, and both object-side surface 442 and image-side surface 444 are aspheric. The object-side surface 442 has one inflection point.

The fifth lens element 450 has positive refractive power and is made of plastic material. The fifth lens element 450 has a convex object-side surface 452 and a convex image-side surface 454, and both object-side surface 452 and image-side surface 454 are aspheric. The image-side surface 454 has one inflection point.

The sixth lens element 460 has positive refractive power and is made of plastic material. The sixth lens element 460 has a concave object-side surface 462 and a convex image-side surface 464. As a result, the back focal length thereof can be reduced, such that the size of the optical image capturing system can be kept small. In addition, the image-side surface 464 thereof has one inflection point, so the incident angle of the off-axis rays can be reduced. Therefore, the off-axis aberration can be mitigated.

The IR-bandstop filter 480 is made of glass material and is disposed between the sixth lens element 460 and the image plane 490. The IR-bandstop filter 480 does not affect the focal length of the optical image capturing system.

The contents in Tables 7 and 8 below should be incorporated into the reference of the present embodiment.

TABLE 7

Lens Parameters for the Fourth Embodiment
f(focal length) = 3.894 mm; f/HEP = 1.0; HAF(half angle of view) = 32.500 deg

| Surface No. | | Curvature Radius | Central Thickness (mm) | Material | Refractive Index | Abbe Number | Focal Length |
|---|---|---|---|---|---|---|---|
| 0 | Object | 1E+18 | 1E+18 | | | | |
| 1 | Lens 1 | 11.43957089 | 7.551 | Plastic | 1.661 | 20.40 | −108.84 |
| 2 | | 7.272587395 | 2.689 | | | | |
| 3 | Lens 2 | 15.77329662 | 1.204 | Plastic | 1.565 | 58.00 | −8.70 |
| 4 | | 3.652720789 | 4.945 | | | | |
| 5 | Lens 3 | 250.2993495 | 15.319 | Plastic | 1.661 | 20.40 | −52.79 |
| 6 | | 30.10406714 | 0.443 | | | | |
| 7 | Aperture Stop | 1E+18 | −0.392 | | | | |
| 8 | Lens 4 | 11.10344619 | 4.121 | Plastic | 1.565 | 58.00 | 11.00 |
| 9 | | −12.30274886 | 1.489 | | | | |
| 10 | Lens 5 | 6.804270353 | 4.696 | Plastic | 1.565 | 58.00 | 9.47 |
| 11 | | −19.11884977 | 0.533 | | | | |
| 12 | Lens 6 | −19.53609373 | 5.418 | Plastic | 1.661 | 20.40 | 151.26 |
| 13 | | −18.18195851 | 0.450 | | | | |
| 14 | IR-bandstop Filter | 1E+18 | 0.850 | BK_7 | 1.517 | 64.13 | |
| 15 | | 1E+18 | 0.680 | | | | |
| 16 | Image Plane | 1E+18 | 0.003 | | | | |

Reference wavelength = 555 nm;
Shield position: none

TABLE 8

Aspheric Coefficients

| Surface No | 1 | 2 | 3 | 4 | 5 | 6 | 8 |
|---|---|---|---|---|---|---|---|
| k | −3.742203E−01 | −3.317222E−01 | 1.098683E+00 | −1.247371E+00 | 2.479424E+01 | 1.668624E+01 | −1.210325E+01 |
| $A_4$ | −1.134993E−05 | −2.972451E−04 | 2.881603E−05 | 2.408402E−03 | −1.081163E−04 | −1.771239E−04 | 8.607320E−04 |
| $A_6$ | 2.143383E−07 | 2.667301E−06 | 7.230043E−08 | 1.548620E−05 | 1.702964E−06 | 2.140118E−05 | −7.321599E−06 |
| $A_8$ | −2.208273E−09 | 5.98777 1E−0S | −3.681970E−08 | −6.379421E−07 | 1.054936E−07 | −3.068005E−07 | 2.655294E−07 |
| $A_{10}$ | 2.834721E−11 | 9.966839E−10 | 1.018979E−10 | 1.207509E−09 | −4.275267E−09 | −7.184557E−09 | −1.851160E−10 |
| $A_{12}$ | 0.000000E+00 | 0.000000E+00 | 0.000000E+00 | 0.000000E+00 | 0.000000E+00 | 0.000000E+00 | 0.000000E+00 |

| Surface No | 9 | 10 | 11 | 12 | 13 |
|---|---|---|---|---|---|
| k | −6.073039E+00 | −2.364919E−01 | 6.688469E+00 | 1.278124E+01 | 1.769843E+01 |
| $A_4$ | −3.880301E−04 | −6.788786E−05 | 2.161091E−04 | −5.862967E−04 | 2.908874E−03 |
| $A_6$ | 1.104175E−05 | 1.138287E−06 | −2.819064E−05 | 5.421206E−06 | −2.877374E−05 |
| $A_8$ | −2.678925E−07 | 2.125748E−08 | 1.839307E−06 | 3.945899E−07 | 7.152595E−06 |
| $A_{10}$ | 1.854784E−08 | 6.449161E−09 | −2.390240E−08 | 1.223898E−08 | −1.897115E−07 |
| $A_{12}$ | 0.000000E+00 | 0.000000E+00 | 0.000000E+00 | 0.000000E+00 | 0.000000E+00 |

In the fourth embodiment, the form of the aspheric surface equation is similar to that in the first embodiment. Besides, the definitions of parameters in following tables are similar to those in the first embodiment, so the repetitive details will not be given here.

The following values for the parameters of the optical image capturing system can be obtained from the data in Table 7 and Table 8.

Fourth Embodiment (Primary Reference Wavelength = 555 nm)

| ETP1 | ETP2 | ETP3 | ETP4 | ETP5 | ETP6 |
|---|---|---|---|---|---|
| 7.644 | 1.627 | 15.376 | 3.797 | 4.315 | 5.458 |

| ETP1/TP1 | ETP2/TP2 | ETP3/TP3 | ETP4/TP4 | ETP5/TP5 | ETP6/TP6 |
|---|---|---|---|---|---|
| 1.012 | 1.352 | 1.004 | 0.921 | 0.919 | 1.007 |

-continued

Fourth Embodiment (Primary Reference Wavelength = 555 nm)

| ETL | EBL | EIN | EIR | PIR | EIN/ETL |
|---|---|---|---|---|---|
| 9.352 | 2.503 | 6.849 | 0.884 | 1.367 | 0.732 |

| SETP/EIN | EIR/PIR | SETP | STP | SETP/STP | BL |
|---|---|---|---|---|---|
| 0.800 | 1.153 | 38.217 | 38.310 | 0.998 | 1.983 |

| ED12 | ED23 | ED34 | ED45 | ED56 | EBL/BL |
|---|---|---|---|---|---|
| 0.210 | 0.410 | 0.418 | 0.380 | 0.957 | 1.2622 |

| SED | SIN | SED/SIN | ED12/ED23 | ED23/ED34 | ED34/ED45 |
|---|---|---|---|---|---|
| 9.565 | 9.707 | 0.985 | 0.579 | 27.760 | 0.082 |

-continued

| Fourth Embodiment (Primary Reference Wavelength = 555 nm) | | | | | |
|---|---|---|---|---|---|
| ED12/IN12 | ED23/IN23 | ED34/IN34 | ED45/ IN45 | ED56/ IN56 | ED45/ ED56 |
| 0.949 | 0.891 | 3.100 | 1.293 | 0.982 | 3.679 |
| \|f/f1\| | \|f/f2\| | \|f/f3\| | \|f/f4\| | \|f/f5\| | \|f/f6\| |
| 0.03578 | 0.44764 | 0.07377 | 0.35409 | 0.41099 | 0.02574 |
| ΣPPR | ΣNPR | ΣPPR/ΣNPR\| | IN12/f | IN56/f | TP4/(IN34 + TP4 + IN45) |
| 0.87463 | 0.47338 | 1.84763 | 0.69059 | 0.13682 | 0.72793 |
| \|f1/f2\| | \|f2/f3\| | (TP1 + IN12)/TP2 | | (TP6 + IN56)/TP5 | |
| 12.51181 | 0.16480 | 8.50831 | | 1.26722 | |
| HOS | InTL | HOS/HOI | InS/HOS | ODT % | TDT % |
| 50.00000 | 48.01690 | 20.00000 | 0.35699 | 1.03029 | 0.38760 |
| HVT51 | HVT52 | HVT61 | HVT62 | HVT62/HOI | HVT62/HOS |
| 0.54634 | 0.11867 | 0.13165 | 0.00725 | 1.03029 | 0.38760 |
| HVT21 | HVT22 | HVT31 | HVT32 | HVT41 | HVT42 |
| 0.000 | 0.000 | 4.228 | 0.000 | 0.000 | 5.166 |
| TP2/TP3 | TP3/TP4 | InRS61 | InRS62 | \|InRS61\|/ TP6 | \|InRS62\|/ TP6 |
| 0.07857 | 3.71689 | −0.71333 | −0.03931 | 0.13165 | 0.00725 |
| MTFE0 | MTFE3 | MTFE7 | MTFQ0 | MTFQ3 | MTFQ7 |
| 0.94 | 0.92 | 0.89 | 0.84 | 0.77 | 0.75 |
| OD | ID | OD/ID | OT | IT | OT/IT |
| 11.4 mm | 3.519 mm | 3.2396 | 0.7 mm | 0.1 mm | 7 |

The following values for the parameters of the optical image capturing system can be obtained from the data in Table 7 and Table 8.

| Values Related to Inflection Points of Fourth Embodiment (Primary Reference Wavelength = 555 nm) | | | | | |
|---|---|---|---|---|---|
| HIF211 | 6.7010 | HIF211/HOI | 2.6804 | SGI211 | 1.5256 | \|SGI211\|/(\|SGI211\| + TP2) | 0.5590 |
| HIF311 | 1.9689 | HIF311/HOI | 0.7876 | SGI311 | 0.0062 | \|SGI311\|/(\|SGI311\| + TP3) | 0.0004 |
| HIF421 | 3.9093 | HIF421/HOI | 1.5637 | SGI421 | −0.6075 | \|SGI421\|/(\|SGI421\| + TP4) | 0.1285 |
| HIF521 | 3.9199 | HIF521/HOI | 1.5680 | SGI521 | −0.4101 | \|SGI521\|/(\|SGI521\| + TP5) | 0.0803 |
| HIF621 | 1.3722 | HIF621/HOI | 0.5489 | SGI621 | −0.0430 | \|SGI621\|/(\|SGI621\| + TP6) | 0.0079 |

Fifth Embodiment

Figure 5A:
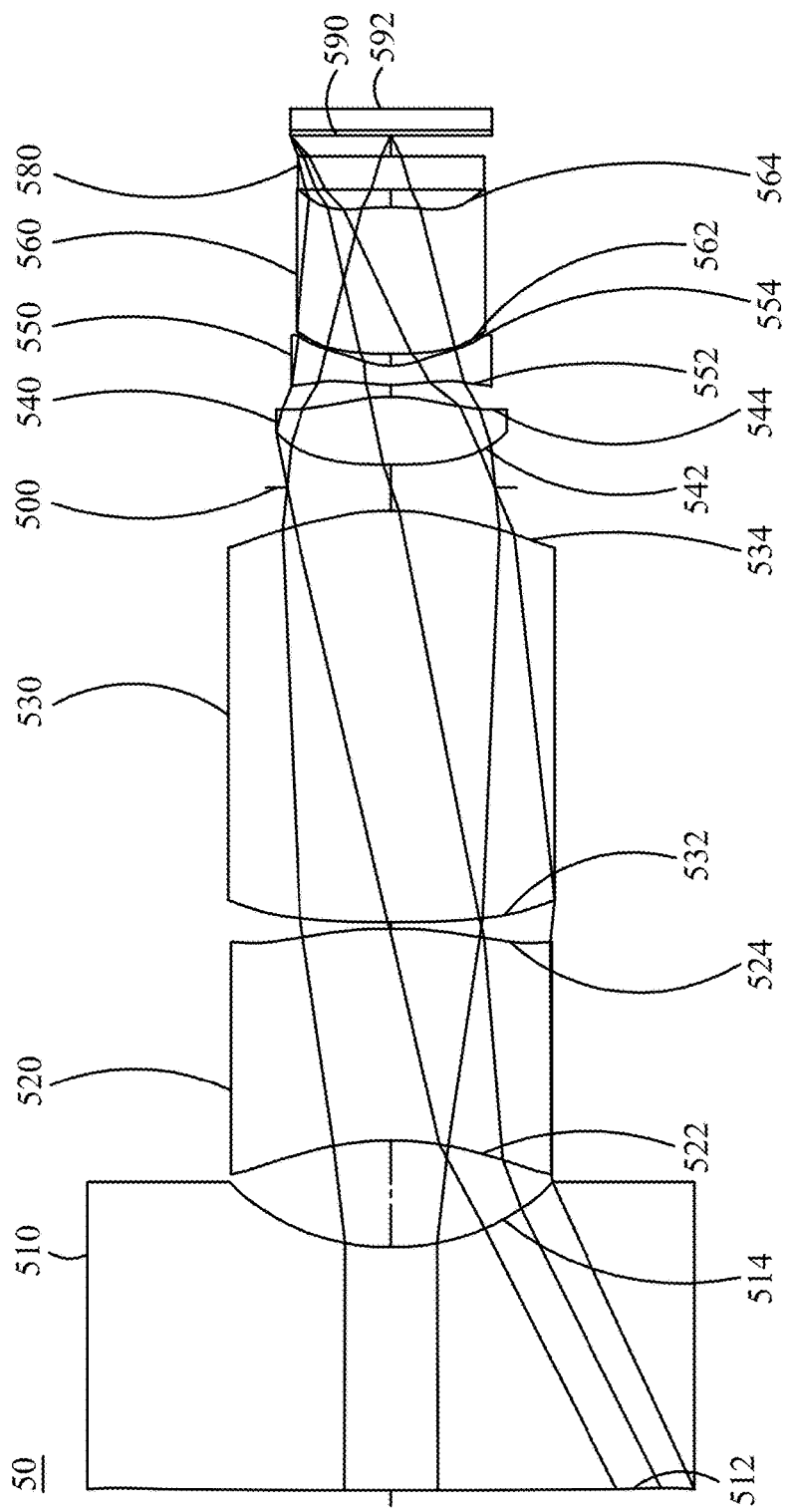
FIG. 5A is a schematic view of the optical image capturing system according to the fifth embodiment of the present invention.
Figure 5B:
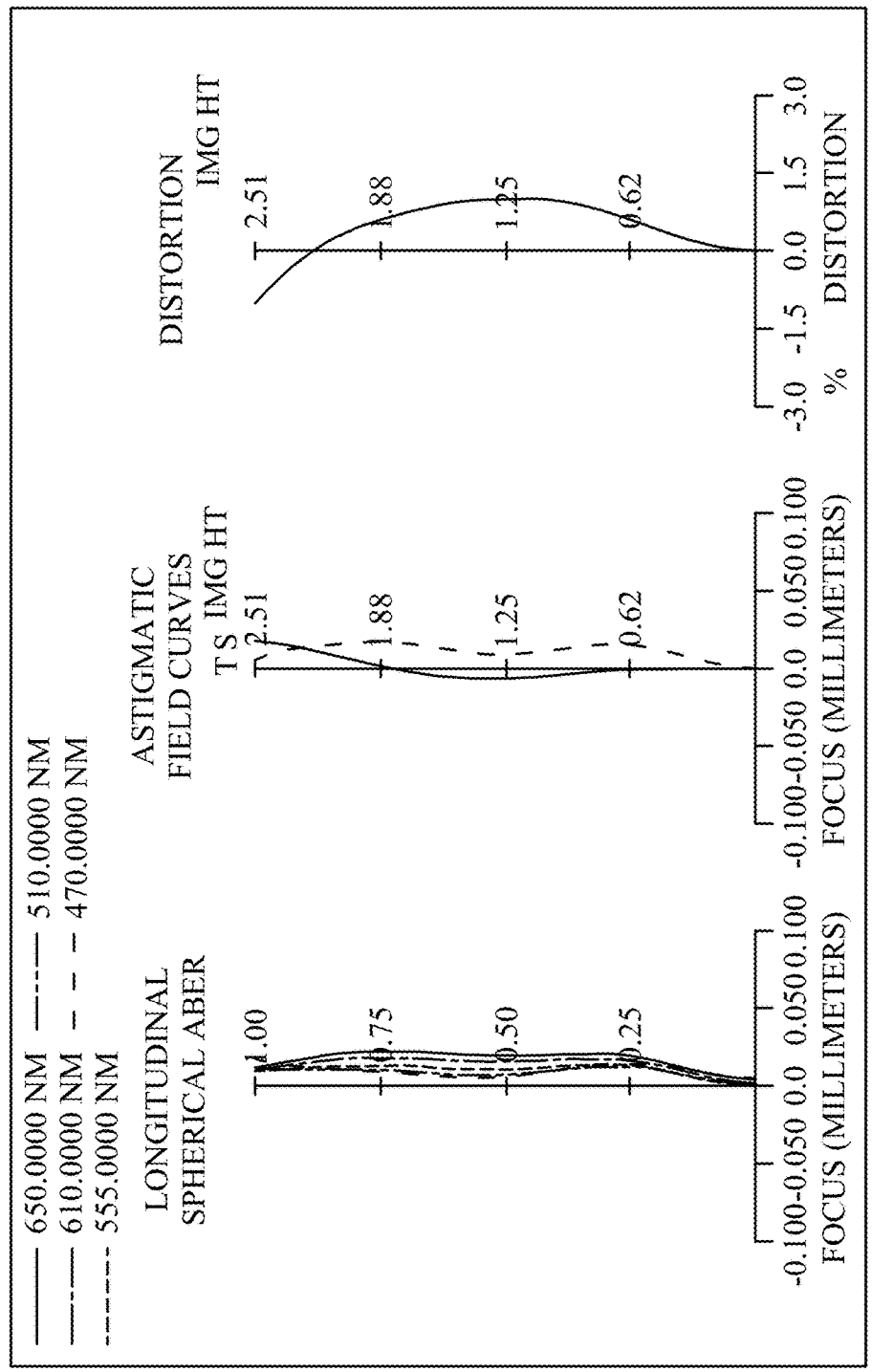
FIG. 5B shows the longitudinal spherical aberration curves, astigmatic field curves, and the optical distortion curve of the optical image capturing system in the order from left to right according to the fifth embodiment of the present invention.
Figure 5C:
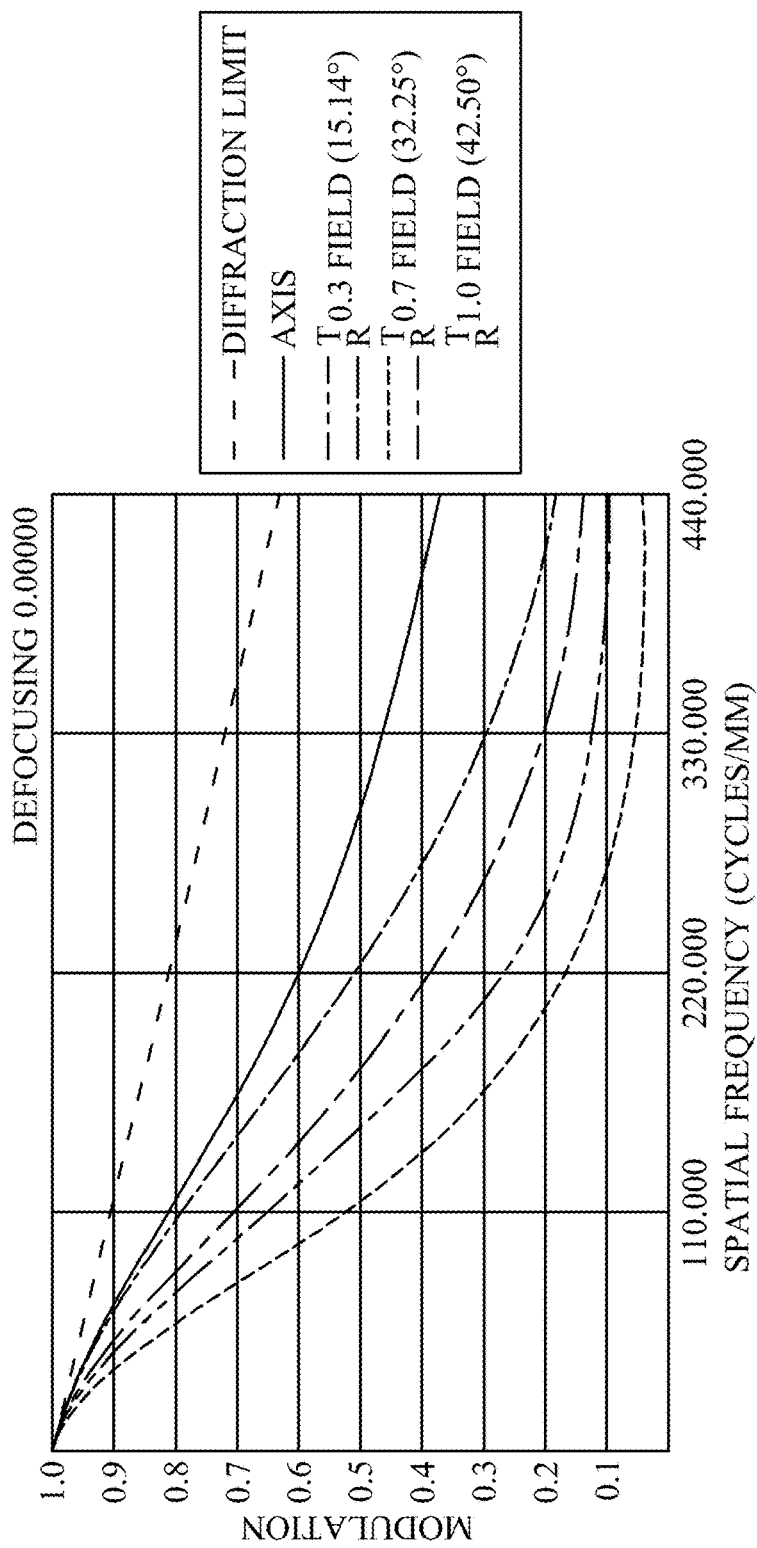
FIG. 5C is a characteristic diagram of modulation transfer of the visible light according to the fifth embodiment of the present application.

Please refer to FIG. 5A, FIG. 5B and FIG. 5C. FIG. 5A is a schematic view of the optical image capturing system according to the fifth embodiment of the present invention. FIG. 5B shows the longitudinal spherical aberration curves, astigmatic field curves, and optical distortion curve of the optical image capturing system of the fifth embodiment, in the order from left to right. FIG. 5C is a characteristic diagram of the modulation transfer of visible light for the optical image capturing system of the fifth embodiment of the present invention. As shown in FIG. 5A, in the order from an object side to an image side, the optical image capturing system includes a first lens element 510, a second lens element 520, a third lens element 530, an aperture stop 500, a fourth lens element 540, a fifth lens element 550, a sixth lens element 560, an IR-bandstop filter 580, an image plane 590, and an image sensing device 592.

The first lens element 510 has negative refractive power and is made of plastic material. The first lens element 510 has a convex object-side surface 512 and a concave image-side surface 514, and both object-side surface 512 and image-side surface 514 are aspheric. The object-side surface 512 has one inflection point.

The second lens element 520 has negative refractive power and is made of plastic material. The second lens element 520 has a concave object-side surface 522 and a convex image-side surface 524, and both object-side surface 522 and image-side surface 524 are aspheric. The object-side surface 522 and the image-side surface 524 both have two inflection points.

The third lens element 530 has positive refractive power and is made of plastic material. The third lens element 530 has a convex object-side surface 532 and a convex image-side surface 534, and both object-side surface 532 and image-side surface 534 are aspheric.

The fourth lens element 540 has positive refractive power and is made of plastic material. The fourth lens element 540 has a convex object-side surface 542 and a convex image-side surface 544, and both object-side surface 542 and image-side surface 544 are aspheric. The image-side surface 544 has one inflection point.

The fifth lens element 550 has negative refractive power and is made of plastic material. The fifth lens element 550 has a convex object-side surface 552 and a concave image-side surface 554, and both object-side surface 552 and image-side surface 554 are aspheric. The object-side surface 552 has one inflection point, while the image-side surface 554 has two inflection points.

The sixth lens element 560 has positive refractive power and is made of plastic material. The sixth lens element 560 has a convex object-side surface 562 and a convex image-side surface 564. As a result, the back focal length thereof can be reduced, such that the size of the optical image capturing system can be kept small. In addition, the image-side surface 564 thereof has one inflection point, so the incident angle of the off-axis rays can be reduced, and the off-axis aberration can be mitigated.

The IR-bandstop filter 580 is made of glass material and is disposed between the sixth lens element 560 and the image plane 590. The IR-bandstop filter 580 does not affect the focal length of the optical image capturing system.

The contents in Tables 9 and 10 below should be incorporated into the reference of the present embodiment.

TABLE 9

Lens Parameters for the Fifth Embodiment
f(focal length) = 2.748 mm; f/HEP = 1.2; HAF(half angle of view) = 42.502 deg

| Surface No. | | Curvature Radius | Central Thickness (mm) | Material | Refractive Index | Abbe Number | Focal Length |
|---|---|---|---|---|---|---|---|
| 0 | Object | 1E+18 | 1E+18 | | | | |
| 1 | Lens 1 | 301.1005645 | 6.269 | Plastic | 1.565 | 58.00 | −10.41 |
| 2 | | 5.745752053 | 2.723 | | | | |
| 3 | Lens 2 | −7.005570118 | 5.462 | Plastic | 1.607 | 26.60 | −209.59 |
| 4 | | −9.60247717 | 0.168 | | | | |
| 5 | Lens 3 | 33.6103138 | 10.572 | Plastic | 1.565 | 58.00 | 9.60 |
| 6 | | −5.750317233 | 0.626 | | | | |
| 7 | Aperture Stop | 1E+18 | 0.583 | | | | |
| 8 | Lens 4 | 16.70367554 | 1.739 | Plastic | 1.565 | 58.00 | 4.86 |
| 9 | | −3.174828555 | 0.306 | | | | |
| 10 | Lens 5 | 4.155376012 | 0.494 | Plastic | 1.661 | 20.40 | −4.24 |
| 11 | | 1.603432149 | 0.299 | | | | |
| 12 | Lens 6 | 14.30984853 | 3.790 | Plastic | 1.565 | 58.00 | 7.67 |
| 13 | | −5.64744044 | 0.450 | | | | |
| 14 | IR-bandstop Filter | 1E+18 | 0.850 | BK_7 | 1.517 | 64.13 | |
| 15 | | 1E+18 | 0.525 | | | | |
| 16 | Image Plane | 1E+18 | 0.011 | | | | |

Reference wavelength = 555 nm;
Shield position: none

TABLE 10

The Aspheric Coefficients of the Fifth Embodiment
Table 10: Aspheric Coefficients

| Surface No. | 1 | 2 | 3 | 4 | 5 | 6 | 8 |
|---|---|---|---|---|---|---|---|
| k | −5.000000E+01 | −2.176461E+00 | −3.642330E+00 | −9.521802E+00 | 5.000000E+01 | −8.665822E+00 | 2.591089E+01 |
| $A_4$ | −1.314860E−05 | 1.259804E−03 | 2.856209E−05 | 3.016340E−04 | 4.718922E−04 | −1.233495E−03 | 8.275085E−03 |
| $A_6$ | −3.368157E−07 | −1.652464E−05 | −1.275345E−05 | 6.088444E−05 | 3.896370E−05 | 2.950482E−04 | −3.162059E−04 |
| $A_8$ | 3.136086E−08 | 2.866786E−06 | 7.268180E−07 | −3.856433E−07 | 1.349286E−06 | −2.720709E−05 | 5.164484E−05 |
| $A_{10}$ | −4.570991E−10 | 6.786929E−09 | 8.281181E−08 | 2.383510E−08 | −1.195769E−07 | 7.861083E−07 | −2.673381E−06 |
| $A_{12}$ | 0.000000E+00 | 0.000000E+00 | 0.000000E+00 | 0.000000E+00 | 0.000000E+00 | 0.000000E+00 | 0.000000E+00 |

| Surface No. | 9 | 10 | 11 | 12 | 13 |
|---|---|---|---|---|---|
| k | −1.213131E+01 | −2.169093E+01 | −4.504733E+00 | −4.902239E+01 | −2.490490E+01 |
| $A_4$ | 4.713512E−03 | −2.158061E−02 | −2.440822E−02 | 1.307025E−02 | 1.829504E−02 |
| $A_6$ | −1.890321E−04 | 1.930925E−04 | 4.584204E−03 | 1.111520E−03 | 1.381955E−03 |
| $A_8$ | 7.746840E−05 | 5.233327E−04 | 2.340526E−05 | 8.634561E−06 | 1.157153E−03 |
| $A_{10}$ | −7.069370E−06 | −4.512367E−05 | −1.934626E−05 | −2.523925E−05 | −2.153835E−04 |
| $A_{12}$ | 0.000000E+00 | 0.000000E+00 | 0.000000E+00 | 0.000000E+00 | 0.000000E+00 |

In the fifth embodiment, the form of the aspheric surface equation is similar to that in the first embodiment. Besides, the definitions of parameters in following tables are similar to those in the first embodiment, so the repetitive details will not be given here.

The following values for the parameters of the optical image capturing system can be obtained from the data in Table 9 and Table 10:

Fifth Embodiment (Primary Reference Wavelength = 555 nm)

| ETP1 | ETP2 | ETP3 | ETP4 | ETP5 | ETP6 |
|---|---|---|---|---|---|
| 6.382 | 5.488 | 10.444 | 1.532 | 0.683 | 3.663 |

| ETP1/TP1 | ETP2/TP2 | ETP3/TP3 | ETP4/TP4 | ETP5/TP5 | ETP6/TP6 |
|---|---|---|---|---|---|
| 1.018 | 1.005 | 0.988 | 0.881 | 1.382 | 0.967 |

-continued

Fifth Embodiment (Primary Reference Wavelength = 555 nm)

| ETL | EBL | EIN | EIR | PIR | EIN/ETL |
|---|---|---|---|---|---|
| 34.864 | 1.895 | 32.969 | 0.509 | 0.450 | 0.946 |

| SETP/EIN | EIR/PIR | SETP | STP | SETP/STP | BL |
|---|---|---|---|---|---|
| 0.855 | 1.132 | 28.191 | 28.326 | 0.995 | 1.836 |

| ED12 | ED23 | ED34 | ED45 | ED56 | EBL/BL |
|---|---|---|---|---|---|
| 0.210 | 0.410 | 0.418 | 0.380 | 0.957 | 1.0321 |

| SED | SIN | SED/SIN | ED12/ED23 | ED23/ED34 | ED34/ED45 |
|---|---|---|---|---|---|
| 4.778 | 4.705 | 1.016 | 9.895 | 0.185 | 2.518 |

-continued

Fifth Embodiment (Primary Reference Wavelength = 555 nm)

| ED12/IN12 | ED23/IN23 | ED34/IN34 | ED45/IN45 | ED56/IN56 | ED45/ED56 |
|---|---|---|---|---|---|
| 0.924 | 1.514 | 1.134 | 1.782 | 0.307 | 5.947 |
| \|f/f1\| | \|f/f2\| | \|f/f3\| | \|f/f4\| | \|f/f5\| | \|f/f6\| |
| 0.26388 | 0.01311 | 0.28640 | 0.56540 | 0.64753 | 0.35825 |
| ΣPPR | ΣNPR | ΣPPR/ΣNPR\| | IN12/f | IN56/f | TP4/(IN34 + TP4 + IN45) |
| 1.47681 | 0.65776 | 2.24520 | 0.99093 | 0.10866 | 0.53449 |
| \|f1/f2\| | \|f2/f3\| | (TP1 + IN12)/TP2 | | (TP6 + IN56)/TP5 | |
| 0.04969 | 21.84148 | 1.64640 | | 8.27509 | |
| HOS | InTL | HOS/HOI | InS/HOS | ODT % | TDT % |
| 34.86630 | 33.03060 | 13.94652 | 0.25944 | 1.01209 | 1.92208 |
| HVT51 | HVT52 | HVT61 | HVT62 | HVT62/HOI | HVT62/HOS |
| 1.35856 | 0 | 0.00000 | 1.14818 | 0.45927 | 0.03293 |
| HVT21 | HVT22 | HVT31 | HVT32 | HVT41 | HVT42 |
| 0.000 | 3.524 | 0.000 | 0.000 | 0.000 | 2.444 |
| TP2/TP3 | TP3/TP4 | InRS61 | InRS62 | \|InRS61\|/TP6 | \|InRS62\|/TP6 |
| 0.51660 | 6.07854 | 0.60164 | 0.24258 | 0.15876 | 0.06401 |
| MTFE0 | MTFE3 | MTFE7 | MTFQ0 | MTFQ3 | MTFQ7 |
| 0.93 | 0.86 | 0.83 | 0.82 | 0.65 | 0.53 |
| OD | ID | OD/ID | OT | IT | OT/IT |
| 7.6 mm | 2.532 mm | 3.0016 | 0.7 mm | 0.1 mm | 7 |

The following values for the parameters of the optical image capturing system can be obtained from the data in Table 9 and Table 10.

Values Related to Inflection Points of Fifth Embodiment
(Primary Reference Wavelength = 555 nm)

| HIF111 | 5.8471 | HIF111/HOI | 2.3388 | SGI111 | 0.0492 | \|SGI111\|/(\|SGI111\| + TP1) | 0.0078 |
|---|---|---|---|---|---|---|---|
| HIF211 | 3.1388 | HIF211/HOI | 1.2555 | SGI211 | −0.6235 | \|SGI211\|/(\|SGI211\| + TP2) | 0.1025 |
| HIF221 | 2.2065 | HIF221/HOI | 0.8826 | SGI221 | −0.2160 | \|SGI221\|/(\|SGI221\| + TP2) | 0.0380 |
| HIF421 | 1.1833 | HIF421/HOI | 0.4733 | SGI421 | −0.1609 | \|SGI421\|/(\|SGI421\| + TP4) | 0.0847 |
| HIF511 | 0.6962 | HIF511/HOI | 0.2785 | SGI511 | 0.0467 | \|SGI511\|/(\|SGI511\| + TP5) | 0.0863 |
| HIF521 | 1.0537 | HIF521/HOI | 0.4215 | SGI521 | 0.2440 | \|SGI521\|/(\|SGI521\| + TP5) | 0.3306 |
| HIF522 | 1.3251 | HIF522/HOI | 0.5300 | SGI522 | 0.3348 | \|SGI522\|/(\|SGI522\| + TP5) | 0.4039 |
| HIF621 | 0.6750 | HIF621/HOI | 0.2700 | SGI621 | −0.0334 | \|SGI621\|/(\|SGI621\| + TP6) | 0.0087 |

Sixth Embodiment

Figure 6A:
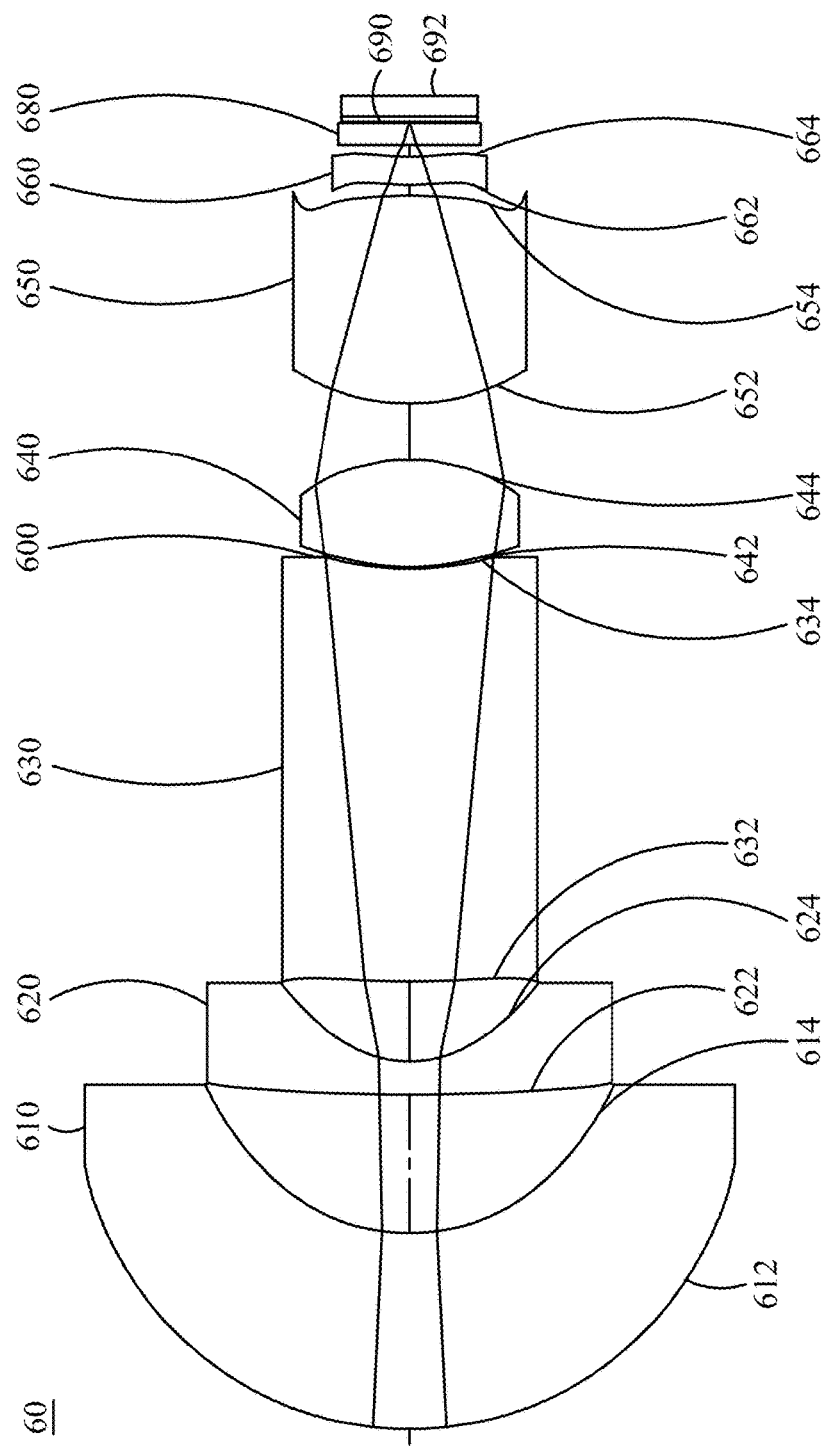
FIG. 6A is a schematic view of the optical image capturing system according to the sixth embodiment of the present invention.
Figure 6B:
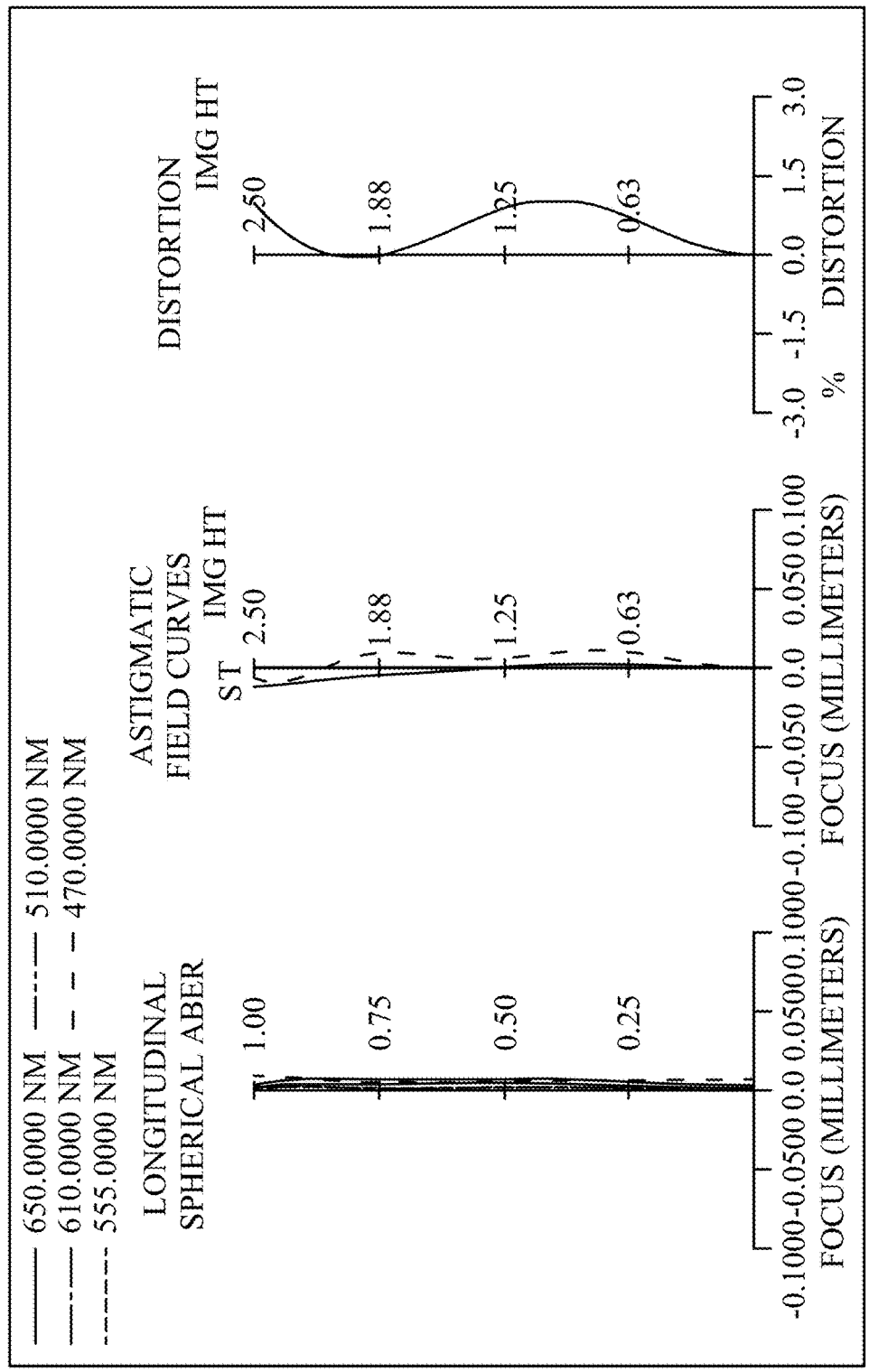
FIG. 6B shows the longitudinal spherical aberration curves, astigmatic field curves, and the optical distortion curve of the optical image capturing system in the order from left to right according to the sixth embodiment of the present invention.
Figure 6C:
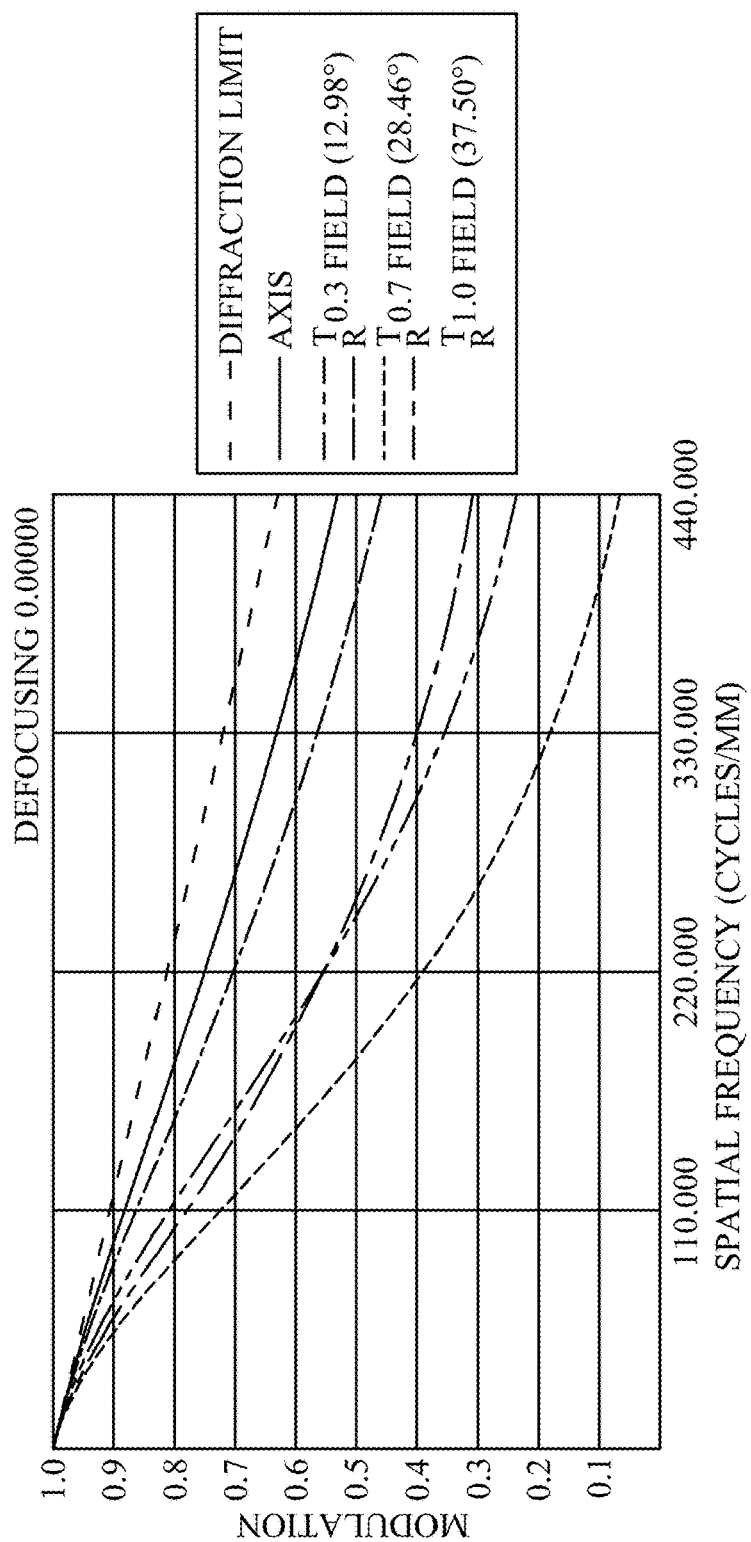
FIG. 6C is a characteristic diagram of modulation transfer of the visible light according to the sixth embodiment of the present application.

Please refer to FIG. 6A, FIG. 6B and FIG. 6C. FIG. 6A is a schematic view of the optical image capturing system according to the sixth embodiment of the present invention. FIG. 6B shows the longitudinal spherical aberration curves, astigmatic field curves, and optical distortion curve of the optical image capturing system of the sixth embodiment, in the order from left to right. FIG. 6C is a characteristic diagram of the modulation transfer of visible light for the optical image capturing system of the sixth embodiment of the present invention. As shown in FIG. 6A, in the order from an object side to an image side, the optical image capturing system includes a first lens element 610, a second lens element 620, a third lens element 630, an aperture stop 600, a fourth lens element 640, a fifth lens element 650, a sixth lens element 660, an IR-bandstop filter 680, an image plane 690, and an image sensing device 692.

The first lens element 610 has negative refractive power and is made of plastic material. The first lens element 610 has a convex object-side surface 612 and a concave image-side surface 614, and both object-side surface 612 and image-side surface 614 are aspheric.

The second lens element 620 has negative refractive power and is made of plastic material. The second lens element 620 has a convex object-side surface 622 and a concave image-side surface 624, and both object-side surface 622 and image-side surface 624 are aspheric.

The third lens element 630 has negative refractive power and is made of plastic material. The third lens element 630 has a convex object-side surface 632 and a concave image-side surface 634, and both object-side surface 632 and image-side surface 634 are aspheric. The object-side surface 632 thereof has one inflection point.

The fourth lens element 640 has positive refractive power and is made of plastic material. The fourth lens element 640 has a convex object-side surface 642 and a convex image-side surface 644, and both object-side surface 642 and image-side surface 644 are aspheric.

The fifth lens element 650 has positive refractive power and is made of plastic material. The fifth lens element 650 has a convex object-side surface 652 and a convex image-side surface 654, and both object-side surface 652 and image-side surface 654 are aspheric.

The sixth lens element 660 has negative refractive power and is made of plastic material. The sixth lens element 660 has a convex object-side surface 662 and a concave image-side surface 664. The object-side surface 662 and the image-side surface 664 thereof both have two inflection points. As a result, the back focal length thereof can be reduced, such that the size of the optical image capturing system can be kept small. In addition, the incident angle of the off-axis rays can be reduced, and the off-axis aberration can be mitigated.

The IR-bandstop filter 680 is made of glass material and is disposed between the sixth lens element 660 and the image plane 690. The IR-bandstop filter 680 does not affect the focal length of the optical image capturing system.

The contents in Tables 11 and 12 below should be incorporated into the reference of the present embodiment.

TABLE 11

Lens Parameters for the Sixth Embodiment
f(focal length) = 3.225 mm; f/HEP = 1.2; HAF(half angle of view) = 37.500 deg

| Surface No. | | Curvature Radius | Central Thickness (mm) | Material | Refractive Index | Abbe Number | Focal Length |
|---|---|---|---|---|---|---|---|
| 0 | Object | 1E+18 | 1E+18 | | | | |
| 1 | Lens 1 | 12.31185772 | 7.502 | Plastic | 1.661 | 20.40 | −74.61 |
| 2 | | 7.463590564 | 5.278 | | | | |
| 3 | Lens 2 | 83.06630897 | 1.268 | Plastic | 1.565 | 58.00 | −7.25 |
| 4 | | 3.895236001 | 3.078 | | | | |
| 5 | Lens 3 | 29.67245586 | 15.771 | Plastic | 1.661 | 20.40 | −34.99 |
| 6 | | 10.28422833 | 0.445 | | | | |
| 7 | Aperture Stop | 1E+18 | −0.395 | | | | |
| 8 | Lens 4 | 7.569163454 | 4.107 | Plastic | 1.565 | 58.00 | 6.88 |
| 9 | | −6.459440511 | 2.168 | | | | |
| 10 | Lens 5 | 7.958298001 | 7.923 | Plastic | 1.565 | 58.00 | 10.59 |
| 11 | | −15.62497503 | 0.424 | | | | |
| 12 | Lens 6 | 11.57798646 | 1.088 | Plastic | 1.607 | 26.60 | −34.13 |
| 13 | | 7.179551234 | 0.450 | | | | |
| 14 | IR-bandstop Filter | 1E+18 | 0.850 | BK_7 | 1.517 | 64.13 | |
| 15 | | 1E+18 | 0.041 | | | | |
| 16 | Image Plane | 1E+18 | 0.002 | | | | |

Reference wavelength = 555 nm;
Shield position: none

TABLE 12

The Aspheric Coefficients of the Sixth Embodiment
Table 12: Aspheric Coefficients

| Surface No. | 1 | 2 | 3 | 4 | 5 | 6 | 8 |
|---|---|---|---|---|---|---|---|
| k | 2.454951E−02 | −3.675013E−01 | 4.837454E+01 | −1.340629E+00 | −2.961382E+01 | −3.323318E+01 | −1.769298E+01 |
| $A_4$ | 4.179710E−05 | 3.904135E−04 | 1.855671E−06 | 5.979660E−04 | −3.751922E−04 | 2.137938E−03 | 2.398557E−03 |
| $A_6$ | −1.573750E−07 | −1.655580E−06 | −3.827298E−07 | 1.766548E−05 | −6.171281E−07 | −9.820087E−05 | −1.802233E−04 |
| $A_8$ | 5.716278E−10 | −1.108715E−08 | 1.730880E−09 | 3.197844E−08 | −1.748656E−07 | 3.992700E−07 | 3.500377E−06 |
| $A_{10}$ | −5.736341E−12 | 9.177271E−11 | 1.968384E−10 | −1.108824E−08 | −1.905137E−08 | 2.746124E−07 | 8.176164E−08 |
| $A_{12}$ | 0.000000E+00 | 0.000000E+00 | 0.000000E+00 | 0.000000E+00 | 0.000000E+00 | 0.000000E+00 | 0.000000E+00 |

| Surface No. | 10 | 11 | 12 | 13 | 14 |
|---|---|---|---|---|---|
| k | 4.582609E−01 | −1.075606E+00 | 8.662679E+00 | −4.856837E+01 | 2.327291E+00 |
| $A_4$ | 9.582553E−04 | 9.082603E−04 | 2.230223E−03 | −3.215776E−03 | −1.085740E−02 |
| $A_6$ | −4.123740E−05 | −4.079009E−05 | −1.620592E−04 | 1.495148E−05 | −1.211607E−04 |
| $A_8$ | 1.642442E−06 | 1.525297E−06 | −3.323095E−05 | −2.106397E−04 | −3.431911E−05 |
| $A_{10}$ | −6.905582E−08 | −4.032515E−08 | 2.387815E−06 | 1.809508E−05 | 8.619341E−06 |
| $A_{12}$ | 0.000000E+00 | 0.000000E+00 | 0.000000E+00 | 0.000000E+00 | 0.000000E+00 |

In the sixth embodiment, the form of the aspheric surface equation is similar to that in the first embodiment. Besides, the definitions of parameters in following tables are similar to those in the first embodiment, so the repetitive details will not be given here.

The following values for the parameters of the optical image capturing system can be obtained from the data in Table 11 and Table 12:

Sixth Embodiment (Primary Reference Wavelength = 555 nm)

| ETP1 | ETP2 | ETP3 | ETP4 | ETP5 | ETP6 |
|---|---|---|---|---|---|
| 7.551 | 1.489 | 15.827 | 3.854 | 7.754 | 1.125 |

| ETP1/TP1 | ETP2/TP2 | ETP3/TP3 | ETP4/TP4 | ETP5/TP5 | ETP6/TP6 |
|---|---|---|---|---|---|
| 1.007 | 1.174 | 1.004 | 0.938 | 0.979 | 1.034 |

Sixth Embodiment (Primary Reference Wavelength = 555 nm)

| ETL | EBL | EIN | EIR | PIR | EIN/ETL |
|---|---|---|---|---|---|
| 49.926 | 1.250 | 48.676 | 0.357 | 0.450 | 0.975 |

| SETP/EIN | EIR/PIR | SETP | STP | SETP/STP | BL |
|---|---|---|---|---|---|
| 0.772 | 0.793 | 37.600 | 37.659 | 0.998 | 1.344 |

| ED12 | ED23 | ED34 | ED45 | ED56 | EBL/BL |
|---|---|---|---|---|---|
| 5.166 | 2.875 | 0.079 | 2.423 | 0.533 | 0.9301 |

| SED | SIN | SED/SIN | ED12/ED23 | ED23/ED34 | ED34/ED45 |
|---|---|---|---|---|---|
| 11.076 | 10.997 | 1.007 | 1.797 | 36.431 | 0.033 |

-continued

Sixth Embodiment (Primary Reference Wavelength = 555 nm)

| ED12/IN12 | ED23/IN23 | ED34/IN34 | ED45/IN45 | ED56/IN56 | ED45/ED56 |
|---|---|---|---|---|---|
| 0.979 | 0.934 | 1.578 | 1.118 | 1.257 | 4.548 |
| \|f/f1\| | \|f/f2\| | \|f/f3\| | \|f/f4\| | \|f/f5\| | \|f/f6\| |
| 0.04323 | 0.44471 | 0.09218 | 0.46898 | 0.30457 | 0.09451 |

| ΣPPR | ΣNPR | ΣPPR/ΣNPR\| | IN12/f | IN56/f | P4/(IN34 + TTP4 + IN45) |
|---|---|---|---|---|---|
| 0.81678 | 0.63140 | 1.29359 | 1.63643 | 0.13138 | 0.64936 |
| \|f1/f2\| | \|f2/f3\| | (TP1 + IN12)/TP2 | | (TP6 + IN56)/TP5 | |
| 10.28701 | 0.20728 | 10.07973 | | 0.19082 | |

| HOS | InTL | HOS/HOI | InS/HOS | ODT % | TDT % |
|---|---|---|---|---|---|
| 50.00000 | 48.65630 | 20.00000 | 0.33316 | 1.03980 | 1.05058 |
| HVT51 | HVT52 | HVT61 | HVT62 | HVT62/HOI | HVT62/HOS |
| 0 | 0 | 1.67318 | 1.86052 | 0.74421 | 0.03721 |
| HVT21 | HVT22 | HVT31 | HVT32 | HVT41 | HVT42 |
| 0.000 | 0.000 | 3.593 | 0.000 | 0.000 | 0.000 |

| TP2/TP3 | TP3/TP4 | InRS61 | InRS62 | \|InRS61\|/TP6 | \|InRS62\|/TP6 |
|---|---|---|---|---|---|
| 0.08040 | 3.84011 | −0.23854 | 0.04413 | 0.21923 | 0.04056 |
| MTFE0 | MTFE3 | MTFE7 | MTFQ0 | MTFQ3 | MTFQ7 |
| 0.95 | 0.92 | 0.88 | 0.88 | 0.82 | 0.73 |
| OD | ID | OD/ID | OT | IT | OT/IT |
| 12 mm | 3.209 mm | 3.7395 | 0.3 mm | 0.15 mm | 2 |

The following values for the parameters of the optical image capturing system can be obtained from the data in Table 11 and Table 12:

Values Related to Inflection Point of Sixth Embodiment (Primary Reference Wavelength = 555 nm)

| HIF311 | 2.2838 | HIF311/HOI | 0.9135 | SGI311 | 0.0740 | \|SGI311\|/(\|SGI311\| + TP3) | 0.0047 |
|---|---|---|---|---|---|---|---|
| HIF611 | 1.0355 | HIF611/HOI | 0.4142 | SGI611 | 0.0387 | \|SGI611\|/(\|SGI611\| + TP6) | 0.0343 |
| HIF612 | 2.7568 | HIF612/HOI | 1.1027 | SGI612 | −0.1985 | \|SGI612\|/(\|SGI612\| + TP6) | 0.1543 |

Although the present invention is disclosed by the aforementioned embodiments, those embodiments do not serve to limit the scope of the present invention. A person skilled in the art could perform various alterations and modifications to the present invention, without departing from the spirit and the scope of the present invention. Hence, the scope of the present invention should be defined by the following appended claims.

Despite the fact that the present invention is specifically presented and illustrated with reference to the exemplary embodiments thereof, it should be apparent to a person skilled in the art that, various modifications could be performed to the forms and details of the present invention, without departing from the scope and spirit of the present invention defined in the claims and their equivalence.

What is claimed is:

1. An optical image capturing system, from an object side to an image side, comprising:
    a first lens element with refractive power;
    a second lens element with refractive power;
    a third lens element with refractive power;
    a fourth lens element with refractive power;
    a fifth lens element with refractive power;
    a sixth lens element with refractive power;
    an image plane; and
    a lens positioning element;
    wherein the lens positioning element is hollow in order to accommodate any lens elements and align the lens elements along an optical axis; the lens positioning element comprises an object-side end and an image-side end; the object-side end is adjacent to the object side and is disposed with a first opening; the image-side end is adjacent to the image side and is disposed with a second opening; an outer wall of the lens positioning element comprises at least two tangent planes, and each of the tangent planes is disposed with at least one sprue mark; at least one lens element among the first through sixth lens elements has positive refractive power; focal lengths of the first through sixth lens elements are f1, f2, f3, f4, f5 and f6, respectively; a focal length of the optical image capturing system is f, an entrance pupil diameter of the optical image capturing system is HEP, and a distance on the optical axis from an object-side surface of the first lens element to the image plane is HOS; a distance on the optical axis from the object-side surface of the first lens element to an image-side surface of the sixth lens element is InTL; half of a maximum angle of view of the optical image capturing system is HAF; thicknesses of the first through sixth lens elements at a height of ½ HEP and in parallel with the optical axis are ETP1, ETP2, ETP3, ETP4, ETP5 and ETP6, respectively; a sum of ETP1 to ETP6 described above is SETP, thicknesses of the first through sixth lens elements on the optical axis are TP1, TP2, TP3, TP4, TP5 and TP6, respectively; a sum of TP1 to TP6 described above is STP, and the following relations are satisfied: 1.0≤f/HEP≤10.0, 0 deg<HAF≤150 deg and 0.5≤SETP/STP<1.

2. The optical image capturing system of claim 1, wherein the outer wall of the lens positioning element comprises at least three tangent planes, and each of the tangent planes has at least one sprue mark.

3. The optical image capturing system of claim 2, wherein a horizontal distance paralleling the optical axis from a coordinate point on the object-side surface of the first lens element at the height of ½ HEP to a coordinate point on the image-side surface of the sixth lens element at the height of ½ HEP is EIN; the following conditions are satisfied: 0.2≤SETP/EIN<1.

4. The optical image capturing system of claim 1, wherein an inner diameter of the first opening is OD, an inner diameter of the second opening is ID, and the following conditions are satisfied: 0.1≤OD/ID≤10.

5. The optical image capturing system of claim 1, wherein a minimum thickness of the object-side end is OT and a minimum thickness of the image-side end is IT, and the following condition is satisfied: 0.1≤OT/IT≤10.

6. The optical image capturing system of claim 1, wherein the optical image capturing system comprises a light filter, which is disposed between the sixth lens element and the image plane, a distance in parallel with the optical axis from a coordinate point on the image-side surface of the sixth lens element to the light filter at the height of ½ HEP is EIR; a distance in parallel with the optical axis from an axial point on the image-side surface of the sixth lens element to the light filter is PIR; the following condition is satisfied: 0.1≤EIR/PIR≤1.1.

7. The optical image capturing system of claim 1, wherein the optical image capturing system has a maximum image height HOI on the image plane perpendicular to the optical axis; modulation transfer rates of visible light at spatial frequency of 55 cycles/mm at positions of the optical axis, 0.3 HOI and 0.7 HOI on the image plane are respectively denoted by MTFE0, MTFE3 and MTFE7, and conditions as follows are satisfied: MTFE0≥0.2, MTFE3≥0.01, and MTFE7≥0.01.

8. The optical image capturing system of claim 1, wherein a horizontal distance paralleling the optical axis from a coordinate point on the image-side surface of the sixth lens element at the height of ½ HEP to the image plane is EBL, a horizontal distance paralleling the optical axis from an axial point on the image-side surface of the sixth lens element to the image plane is BL, and conditions as follows are satisfied: 0.1≤EBL/BL≤1.5.

9. The optical image capturing system of claim 1, further comprising an aperture stop, wherein a distance on the optical axis from the aperture stop to the image plane is InS, and condition as follows is satisfied: 0.2≤InS/HOS≤1.1.

10. An optical image capturing system, from an object side to an image side, comprising:
a first lens element with refractive power;
a second lens element with refractive power;
a third lens element with refractive power;
a fourth lens element with refractive power;
a fifth lens element with refractive power;
a sixth lens element with refractive power;
an image plane; and
a lens positioning element;
wherein the lens positioning element is hollow to accommodate any lens elements and align the lens elements along an optical axis; the lens positioning element comprises an object-side end and an image-side end; the object-side end is adjacent to the object side and is disposed with a first opening, and the image-side end is adjacent to the image side and is disposed with a second opening; an outer wall of the lens positioning element comprises at least two tangent planes, and each of the tangent planes has at least one sprue mark; the optical image capturing system comprises six lens elements with refractive powers; at least two lens elements among the first to the sixth lens elements has at least one inflection point on at least one surface thereof; focal lengths of the first through the sixth lens elements are f1, f2, f3, f4, f5 and f6, respectively; a focal length of the optical image capturing system is f, an entrance pupil diameter of the optical image capturing system is HEP, and a distance on the optical axis from the object-side surface of the first lens element to the image plane is HOS; a distance on the optical axis from the object-side surface of the first lens element to the image-side surface of the sixth lens element is InTL; half of a maximum angle of view of the optical image capturing system is HAF; a horizontal distance paralleling the optical axis from a coordinate point on the object-side surface of the first lens element at a height of ½ HEP to the image plane is ETL; a horizontal distance paralleling the optical axis from the coordinate point on the object-side surface of the first lens element at the height of ½ HEP to a coordinate point on the image-side surface of the sixth lens element at height of ½ HEP is EIN; and condition as follows is satisfied: 1.0≤f/HEP≤10.0, 0 deg<HAF≤150 deg and 0.2≤EIN/ETL<1.

11. The optical image capturing system of claim 10, wherein the outer wall of the lens positioning element comprises at least three tangent planes, and each of the tangent planes has at least one sprue mark.

12. The optical image capturing system of claim 10, wherein an inner diameter of the first opening is OD, an inner diameter of the second opening is ID, and the following conditions are satisfied: 0.1≤OD/ID≤10.

13. The optical image capturing system of claim 10, wherein a minimum thickness of the object-side end is OT and a minimum thickness of the image-side end is IT, and the following condition is satisfied: 0.1≤OT/IT≤10.

14. The optical image capturing system of claim 10, wherein a horizontal distance paralleling the optical axis from a coordinate point on an image-side surface of the fifth lens element at the height of ½ HEP to a coordinate point on an object-side surface of the sixth lens element at the height of ½ HEP is ED56; a distance between the fifth lens element and the sixth lens element on the optical axis is IN56, and the condition as follows is satisfied: 0<ED56/IN56≤50.

15. The optical image capturing system of claim 10, wherein a horizontal distance paralleling the optical axis from a coordinate point on an image-side surface of the first lens element at height of ½ HEP to a coordinate point on an object-side surface of the second lens element at height of ½ HEP is ED12; a distance between the first lens element and the second lens element on the optical axis is IN12, and condition as follows is satisfied: 0<ED12/IN12≤10.

16. The optical image capturing system of claim 10, wherein a thickness of the sixth lens element at the height of ½ HEP paralleling the optical axis is ETP6, a central thickness of the sixth lens element on the optical axis is TP6, which satisfies condition as follows: 0<ETP6/TP6≤5.

17. The optical image capturing system of claim 10, wherein a distance between the first lens element and the second lens element on the optical axis is IN12, condition as follows is satisfied: 0<IN12/f≤60.

18. The optical image capturing system of claim 10, the optical image capturing system has a maximum image height HOI on the image plane perpendicular to the optical axis, modulation transfer rates of visible light at spatial frequency of 110 cycles/mm at positions of the optical axis, 0.3 HOI and 0.7 HOI on the image plane are respectively denoted by MTFQ0, MTFQ3 and MTFQ7, and conditions as follows are satisfied: MTFQ0≥0.2, MTFQ3≥0.01, and MTFQ7≥0.01.

19. The optical image capturing system of claim 10, wherein at least one lens element among the first through sixth lens elements is a filtering element of light with wavelength of less than 500 nm.

20. An optical image capturing system, from an object side to an image side, comprising:
- a first lens element with refractive power;
- a second lens element with refractive power;
- a third lens element with refractive power;
- a fourth lens element with refractive power;
- a fifth lens element with refractive power;
- a sixth lens element with refractive power;
- an image plane; and
- a lens positioning element;
- wherein the lens positioning element is hollow to accommodate any lens elements and align the lens elements along an optical axis; the lens positioning element comprises an object-side end and an image-side end; the object-side end is adjacent to the object side and is disposed with a first opening, and the image-side end is adjacent to the image side and is disposed with a second opening; an outer wall of the lens positioning element comprises at least three tangent planes, and each of the tangent planes has at least one sprue mark; the optical image capturing system comprises six lens elements with refractive powers; at least two lens elements among the first to the sixth lens elements have at least one inflection point on at least one surface thereof; focal lengths of the first through the sixth lens elements are f1, f2, f3, f4, f5 and f6, respectively; a focal length of the optical image capturing system is f, an entrance pupil diameter of the optical image capturing system is HEP, and a distance on the optical axis from the object-side surface of the first lens element to the image plane is HOS; a distance on the optical axis from the object-side surface of the first lens element to the image-side surface of the sixth lens element is InTL; half of a maximum angle of view of the optical image capturing system is HAF; a horizontal distance paralleling the optical axis from a coordinate point on the object-side surface of the first lens element at a height of ½ HEP to the image plane is ETL; a horizontal distance paralleling the optical axis from the coordinate point on the object-side surface of the first lens element at the height of ½ HEP to a coordinate point on the image-side surface of the sixth lens element at height of ½ HEP is EIN; and condition as follows is satisfied: $1 \leq f/HEP \leq 3$, $0 \deg < HAF \leq 150 \deg$ and $0.2 \leq EIN/ETL < 1$.

21. The optical image capturing system of claim 20, wherein an inner diameter of the first opening is OD, an inner diameter of the second opening is ID, and the following conditions are satisfied: $0.1 \leq OD/ID \leq 10$.

22. The optical image capturing system of claim 20, wherein a minimum thickness of the object-side end is OT and a minimum thickness of the image-side end is IT, and the following condition is satisfied: $1 \leq OT/IT \leq 10$.

23. The optical image capturing system of claim 20, wherein a horizontal distance paralleling the optical axis from a coordinate point on the image-side surface of the sixth lens element at the height of ½ HEP to the image plane is EBL, a horizontal distance paralleling the optical axis from an axial point on the image-side surface of the sixth lens element to the image plane is BL, and conditions as follows are satisfied: $0.1 \leq EBL/BL \leq 1.5$.

24. The optical image capturing system of claim 20, satisfying the following condition: $0 \text{ mm} < HOS \leq 50 \text{ mm}$.

25. The optical image capturing system of claim 20, further comprising an aperture stop, an image sensing device, and a driving module, wherein the image sensing device is disposed on the image plane, a distance on the optical axis from the aperture stop to the image plane is InS, and the driving module is capable of coupling with the six lens elements and enabling movements of those lens elements; conditions as follows are satisfied: $0.2 \leq InS/HOS \leq 1.1$.

* * * * *